(12) United States Patent
Shin et al.

(10) Patent No.: US 11,856,574 B2
(45) Date of Patent: *Dec. 26, 2023

(54) METHOD AND DEVICE FOR TRANSMITTING AND RECEIVING SIGNAL IN WIRELESS COMMUNICATION SYSTEM

(71) Applicant: LG Electronics Inc., Seoul (KR)

(72) Inventors: Seokmin Shin, Seoul (KR); Suckchel Yang, Seoul (KR); Seonwook Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,767

(22) Filed: Nov. 10, 2022

(65) Prior Publication Data

US 2023/0073774 A1    Mar. 9, 2023

Related U.S. Application Data

(63) Continuation of application No. 17/583,761, filed on Jan. 25, 2022, now Pat. No. 11,540,307, which is a
(Continued)

(30) Foreign Application Priority Data

Oct. 21, 2019    (KR) .......................... 10-2019-0130809
Nov. 8, 2019    (KR) .......................... 10-2019-0142857
(Continued)

(51) Int. Cl.
*H04W 72/00* (2023.01)
*H04W 72/1268* (2023.01)
(Continued)

(52) U.S. Cl.
CPC ....... *H04W 72/1268* (2013.01); *H04L 5/0092* (2013.01); *H04W 72/23* (2023.01)

(58) Field of Classification Search
CPC .......... H04W 72/1268; H04W 72/1289; H04L 5/0092
See application file for complete search history.

(56) References Cited

U.S. PATENT DOCUMENTS

2019/0342874 A1    11/2019    Davydov et al.
2020/0084006 A1    3/2020    Rahman et al.

FOREIGN PATENT DOCUMENTS

| EP | 2448158 | 5/2012 |
|----|---------|--------|
| WO | WO 2019160354 | 8/2019 |
| WO | WO 2019191901 | 10/2019 |

OTHER PUBLICATIONS

Ericsson, "UL signals and channels for NR-U," R1-1912708, Presented at 3GPP TSG-RAN WG1 Meeting #99, Reno, NV, USA, Nov. 18-22, 2019, 24 pages.
(Continued)

*Primary Examiner* — Khaled M Kassim
*Assistant Examiner* — Zhaohui Yang
(74) *Attorney, Agent, or Firm* — Fish & Richardson P.C.

(57) ABSTRACT

A method and a device for transmitting and receiving a signal in a wireless communication system, according to one embodiment of the present invention, comprise: receiving downlink control information (DCI) for scheduling a physical uplink shared channel (PUSCH); and transmitting the PUSCH on the basis of the DCI. The PUSCH is transmitted in a certain number of resource blocks (RB), and the certain number of RBs may be (i) at most the number of RBs allocated by the DCI, and (ii) the greatest number that is a multiple of 2, 3, and/or 5.

12 Claims, 25 Drawing Sheets

Related U.S. Application Data continuation of application No. PCT/KR2020/012044, filed on Sep. 7, 2020.

(60) Provisional application No. 63/032,718, filed on May 31, 2020, provisional application No. 63/015,662, filed on Apr. 26, 2020, provisional application No. 63/015,459, filed on Apr. 24, 2020, provisional application No. 62/938,928, filed on Nov. 21, 2019, provisional application No. 62/937,753, filed on Nov. 19, 2019, provisional application No. 62/937,122, filed on Nov. 18, 2019.

(30) Foreign Application Priority Data

Feb. 13, 2020 (KR) .................. 10-2020-0017358
May 11, 2020 (KR) .................. 10-2020-0056033

(51) Int. Cl.
*H04L 5/00* (2006.01)
*H04W 72/23* (2023.01)

(56) References Cited

OTHER PUBLICATIONS

Ericsson, "UL Signals and Channels," Tdoc R1-2002030, Presented at 3GPP TSG-RAN WG1 Meeting #100bis-e, e-Meeting, Apr. 20-30, 2020, 16 pages.
Extended European Search Report in European Appln. No. 20878648.3, dated Jun. 29, 2022, 9 pages.
Huawei et al., "UL channels and signals in NR unlicensed band," 3GPP TSG RAN WG1 Meeting #98bis, R1-1910044, Chongqing, China, Oct. 14-20, 2019, 15 pages.
International Search Report & Written Opinion in International Appln. No. PCT/KR2020/012044, dated Jan. 8, 2021, 8 pages (with English translation).
LG Electronics, "Physical layer design of UL signals and channels for NR-U," R1-1910818, Presented at 3GPP TSG RAN WG1 #98bis, Chongqing, China, Oct. 14-20, 2019, 18 pages.
Notice of Allowance in Korean Appln. No. 10-2021-7042826, dated Oct. 21, 2022, 4 pages (with English translation).
NTT Docomo, Inc., "Remaining issues on UL signals and channels for NR-U," R1-2002433, Presented at 3GPP TSG RAN WG1 #100bis-e, e-Meeting, Apr. 20-30, 2020, 5 pages.
Qualcomm Incorporated, "UL signals and channels for NR-U," R1-1911096, Presented at 3GPP TSG RAN WG1 Meeting #98bis, Chongqing, CN, Oct. 14-Oct. 20, 2019, 26 pages.
Spreadtrum Communications, "Discussion on UL Signals and Channels in NR-U," R1-1910029, Presented at 3GPP TSG RAN WG1 #98bis, Chongqing, China, Oct. 14-20, 2019, 6 pages.

Carrier aggregation between L-band and U-band

Standalone U-band(s)

An Example of carrier bandwidth and BWP for NR

An Example of RIV with or without modular operation

An Example of RIV with or without modular operation

An Example of UL resource using interlace structure 30 kHz SCS(M=5), 3 PRBs of intra guardband, 51 PRBs in RB-set 30 kHz SCS(M=5), 3 PRBs of intra guardband, 51 PRBs in RB-set PUSCH resource for example of 5-3-6-B-2

METHOD AND DEVICE FOR TRANSMITTING AND RECEIVING SIGNAL IN WIRELESS COMMUNICATION SYSTEM

CROSS-REFERENCE TO RELATED APPLICATIONS

This application is a continuation of U.S. application Ser. No. 17/583,761, filed on Jan. 25, 2022, which is a continuation of International Application No. PCT/KR2020/012044, filed on Sep. 7, 2020, which claims the benefit of U.S. Provisional Application No. 63/032,718, filed on May 31, 22020, Korean Application No. 10-2020-0056033, filed on May 11, 2020, U.S. Provisional Application No. 63/015,662, filed on Apr. 26, 2020, U.S. Provisional Application No. 63/015,459, filed on Apr. 24, 2020, Korean Application No. 10-2020-0017358, filed on Feb. 13, 2020, U.S. Provisional Application No. 62/938,928, filed on Nov. 21, 2019, U.S. Provisional Application No. 62/937,753, filed on Nov. 19, 2019, U.S. Provisional Application No. 62/937,122, filed on Nov. 18, 2019, Korean Application No. 10-2019-0142857, filed on Nov. 8, 2019, and Korean Application No. 10-2019-0130809, filed on Oct. 21, 2019. The disclosures of the prior applications are incorporated by reference in their entirety.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a method and apparatus for transmitting an uplink channel efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

According to one aspect of the present disclosure, a method of transmitting and receiving a signal by a user equipment (UE) in a wireless communication system includes receiving downlink control information (DCI) for scheduling a physical uplink shared channel (PUSCH), and transmitting the PUSCH based on the DCI. The PUSCH is transmitted in a specific number of resource blocks (RBs), and the specific number is a largest number which is (i) equal to or less than the number of RBs allocated by the DCI and (ii) a multiple of 2, 3, and/or 5.

According to another aspect of the present disclosure, a UE for transmitting and receiving a signal in a wireless communication system includes at least one transceiver, at least one processor, and at least one memory operably coupled to the at least one processor and storing instructions which, when executed, cause the at least one processor to perform specific operations. The specific operations include receiving DCI for scheduling a PUSCH, and transmitting the PUSCH based on the DCI. The PUSCH is transmitted in a specific number of RBs, and the specific number is a largest number which is (i) equal to or less than the number of RBs allocated by the DCI and (ii) a multiple of 2, 3, and/or 5.

According to another aspect of the present disclosure, an apparatus for a UE includes at least one processor, and at least one computer memory operably coupled to the at least one processor and storing instructions which, when executed, cause the at least one processor to perform operations. The operations include receiving DCI for scheduling a PUSCH, and transmitting the PUSCH based on the DCI. The PUSCH is transmitted in a specific number of RBs, and the specific number is a largest number which is (i) equal to or less than the number of RBs allocated by the DCI and (ii) a multiple of 2, 3, and/or 5.

According to another aspect of the present disclosure, a computer-readable storage medium including at least one computer program which causes at least one processor to perform operations is provided. The operations include receiving DCI for scheduling a PUSCH, and transmitting the PUSCH based on the DCI. The PUSCH is transmitted in a specific number of RBs, and the specific number is a largest number which is (i) equal to or less than the number of RBs allocated by the DCI and (ii) a multiple of 2, 3, and/or 5.

In the methods and apparatuses, the specific number of RBs may be RBs having relatively low indexes among the RBs allocated by the DCI.

In the methods and apparatuses, the specific number of RBs may form one or more interlaces.

In the methods and apparatuses, based on the DCI being received in a common search space (CSS), the PUSCH may be transmitted in (i) an RB-set having a lowest index among uplink RB-sets overlapping in a frequency domain with a control channel element (CCE) having a lowest index in which the DCI is detected, and (ii) an RB-set having a lowest index in an uplink bandwidth part (BWP) in the absence of a UL RB-set overlapping with the CCE.

In the methods and apparatuses, based on the DCI being received in a CSS, the PUSCH may be transmitted in an RB-set in which the DCI is received or an RB-set having a lowest index in a BWP.

In the methods and apparatuses, the DCI may be in a DCI format 0_0 for a fallback operation.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, a communication apparatus may transmit an uplink channel more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
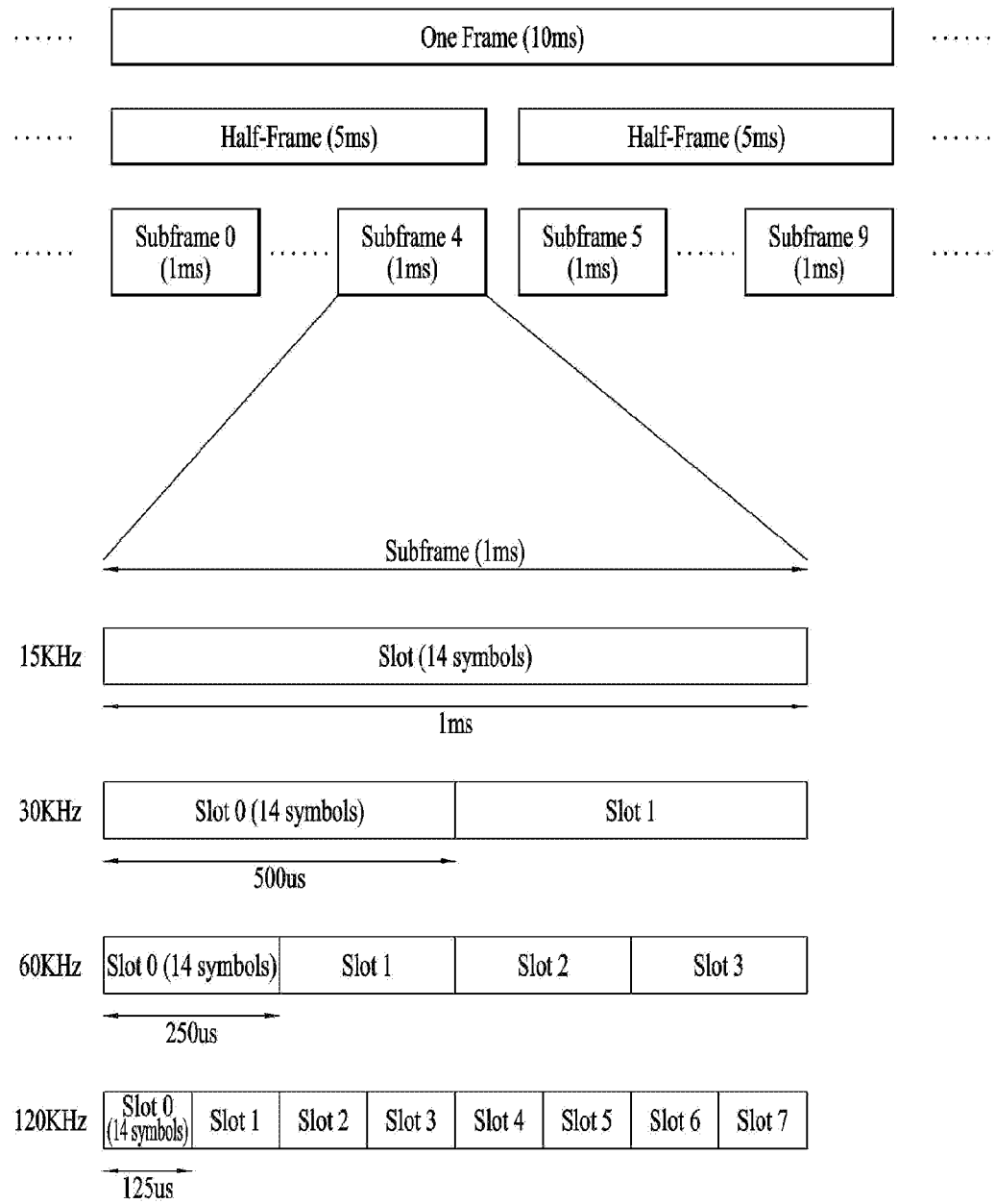
FIG. 1 illustrates a radio frame structure.

3GPP NR 38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
| --- | --- | --- |
| FR1 | 450 MHz-7125 MHz | 15, 30, 60 kHz |
| FR2 | 24250 MHz-52600 MHz | 60, 120, 240 kHz |

Figure 2:
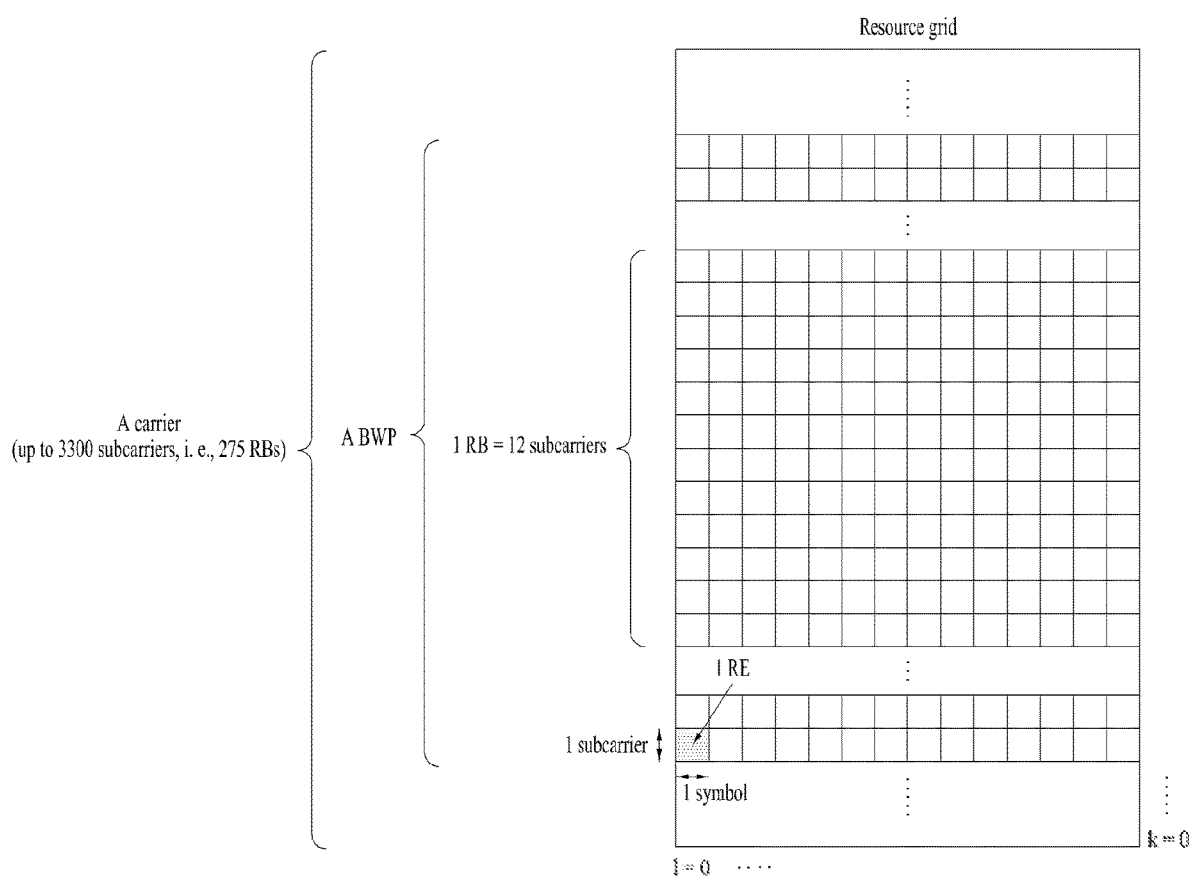
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
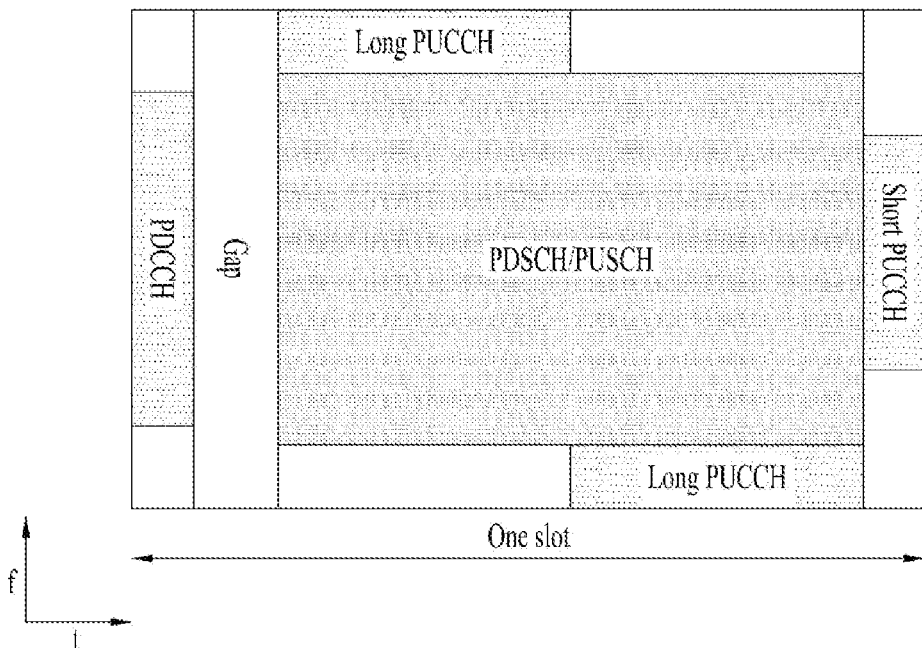
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

UL Physical Channels/Signals (1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) Pucch

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (NACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 4 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 4

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)
Supportable UCI payload size: up to K bits (e.g., K=2)
Number of OFDM symbols included in one PUCCH: 1 to X symbols (e.g., X=2)
Transmission structure: only a UCI signal is configured with no DM-RS, and a UCI state is transmitted by selecting and transmitting one of a plurality of sequences.
(1) PUCCH Format 1 (PF1)
Supportable UCI payload size: up to K bits (e.g., K=2)
Number of OFDM symbols included in one PUCCH: Y to Z symbols (e.g., Y=4 and Z=14)
Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).
(2) PUCCH Format 2 (PF2)
Supportable UCI payload size: more than K bits (e.g., K=2)
Number of OFDM symbols included in one PUCCH: 1 to X symbols (e.g., X=2)
Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT.
(3) PUCCH Format 3 (PF3)
Supportable UCI payload size: more than K bits (e.g., K=2)
Number of OFDM symbols included in one PUCCH: Y to Z symbols (e.g., Y=4 and Z=14)
Transmission structure: UCI and a DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.
(4) PUCCH Format 4 (PF4 or F4)
Supportable UCI payload size: more than K bits (e.g., K=2)
Number of OFDM symbols included in one PUCCH: Y to Z symbols (e.g., Y=4 and Z=14)
Transmission structure: UCI and a DMRS are configured/mapped in/to different symbols based on TDM. The DFT is applied to encoded UCI bits with no multiplexing between UEs.

Figure 4:
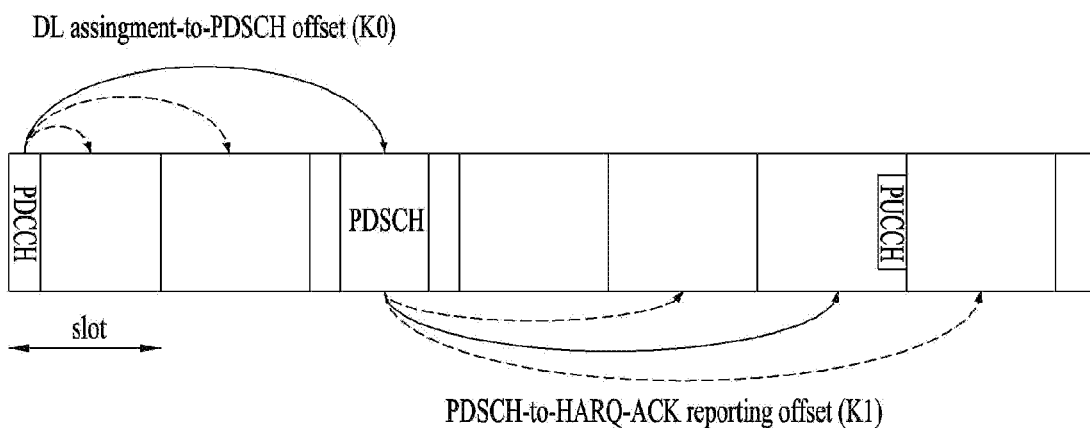
FIG. 4 illustrates an acknowledgment/negative acknowledgment (ACK/NACK) transmission process.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.
Frequency domain resource assignment: Indicates an RB set assigned to a PDSCH.
Time domain resource assignment: Indicates K0 and the starting position (e.g., OFDM symbol index) and length (e.g., the number of OFDM symbols) of the PDSCH in a slot.
PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

1. Wireless Communication System Supporting Unlicensed Band

Figure 5A:
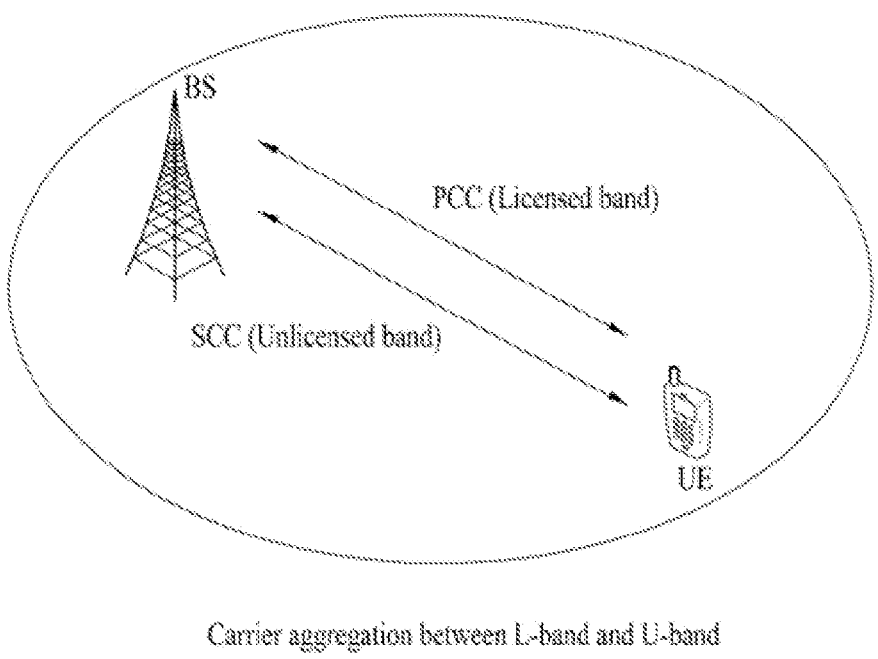
FIGS. 5A and 5B illustrate a wireless communication system supporting an unlicensed band.
Figure 5B:
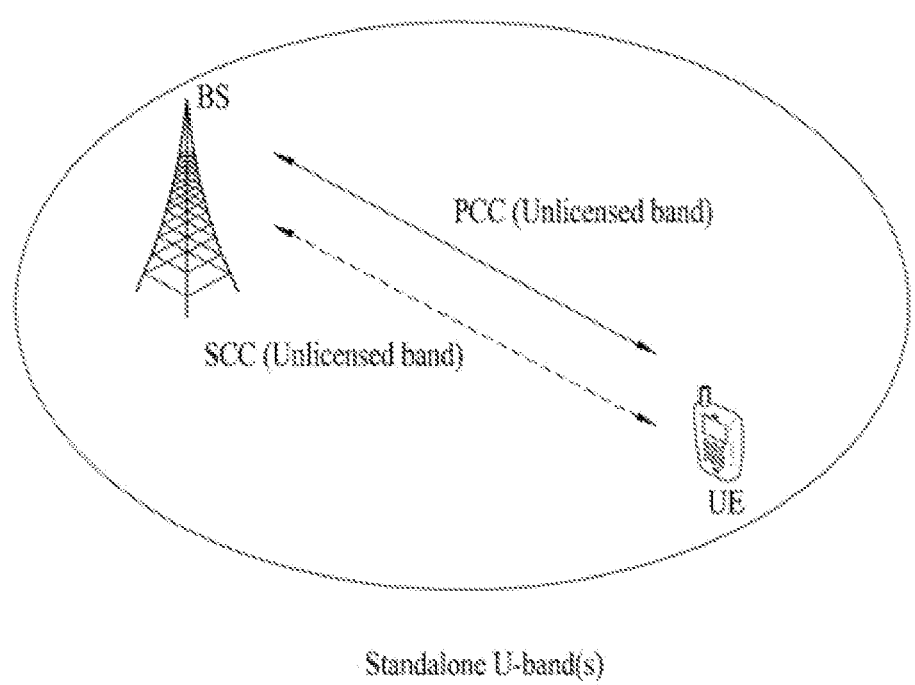

FIGS. 5A and 5B illustrate an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 5A, the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 5B. In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.
Channel: a carrier or a part of a carrier composed of a contiguous set of RBs in which a channel access procedure (CAP) is performed in a shared spectrum.
Channel access procedure (CAP): a procedure of assessing channel availability based on sensing before signal transmission in order to determine whether other communication node(s) are using a channel. A basic sensing unit is a sensing slot with a duration of $T_{sl}$=9 us. The BS or the UE senses the slot during a sensing slot duration. When power detected for at least 4 us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 6:
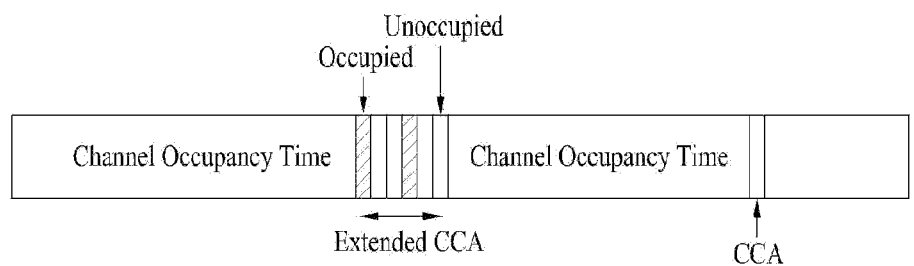
FIG. 6 illustrates an exemplary method of occupying resources in an unlicensed band.

FIG. 6 illustrates a resource occupancy method in a U-band. According to regional regulations for U-bands, a communication node in the U-band needs to determine whether a channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. The Wi-Fi standard (802.1 lac) specifies a CCA threshold of −62 dBm for non-Wi-Fi signals and a CCA threshold of −82 dBm for Wi-Fi signals. When it is determined that the channel is idle, the communication node may start the signal transmission in a UCell. The sires of processes described above may be referred to as Listen-Before-Talk (LBT) or a channel access procedure (CAP). The LBT, CAP, and CCA may be interchangeably used in this document.

Specifically, for DL reception/UL transmission in a U-band, at least one of the following CAP methods to be described below may be employed in a wireless communication system according to the present disclosure.

DL Signal Transmission Method in U-Band

The BS may perform one of the following U-band access procedures (e.g., CAPs) for DL signal transmission in a U-band.

(1) Type 1 DL CAP Method

In the Type 1 DL CAP, the length of a time duration spanned by sensing slots sensed to be idle before transmission(s) may be random. The Type 1 DL CAP may be applied to the following transmissions:

Transmission(s) initiated by the BS including (i) a unicast PDSCH with user plane data or (ii) a unicast PDCCH scheduling user plane data in addition to the unicast PDSCH with user plane data, or Transmission(s) initiated by the BS including (i) a discovery burst only or (ii) a discovery burst multiplexed with non-unicast information.

Figure 7:
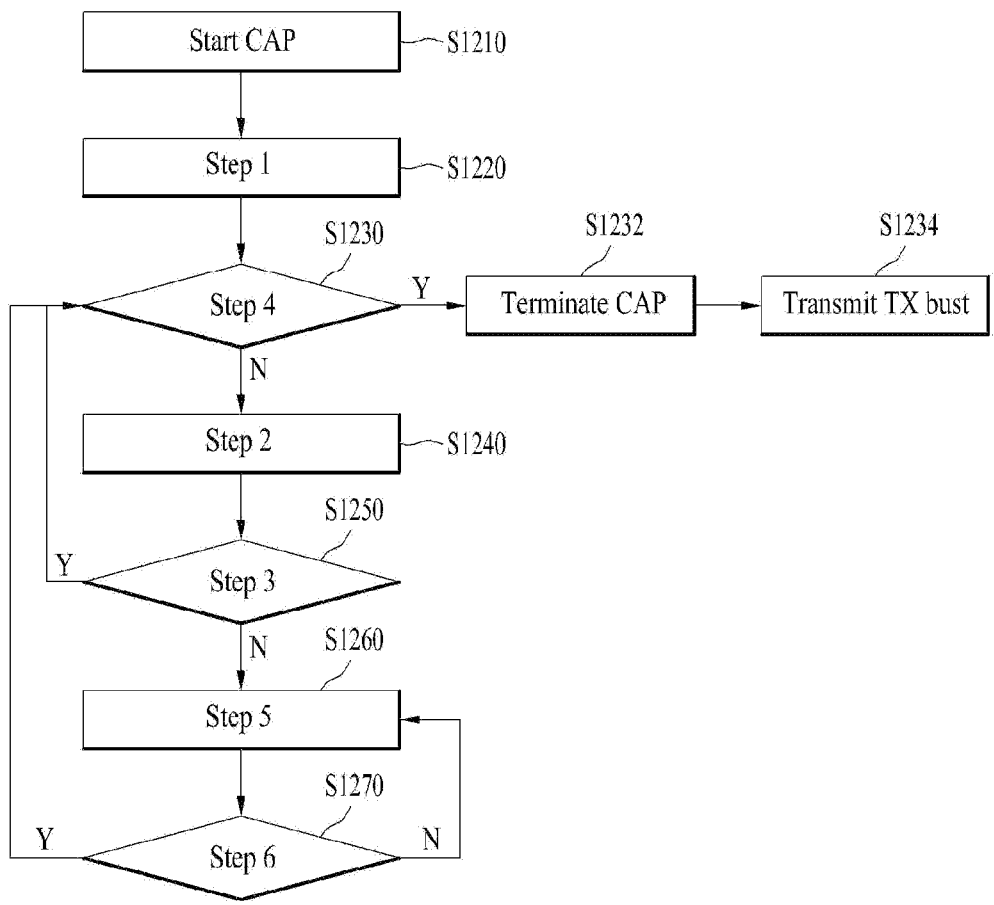
FIGS. 7 and 8 are flowcharts illustrating channel access procedures (CAPs) for signal transmission in an unlicensed band.

FIG. 7 is a flowchart illustrating CAP operations performed by a BS to transmit a DL signal in a U-band.

Referring to FIG. 7, the BS may sense whether a channel is idle for sensing slot durations of a defer duration $T_d$. Then, if a counter N is zero, the BS may perform transmission (S1234). In this case, the BS may adjust the counter N by sensing the channel for additional sensing slot duration(s) according to the following steps:

Step 1) (S1220) The BS sets N to $N_{init}$ (N=$N_{init}$), where $N_{init}$ is a random number uniformly distributed between 0 and $CW_p$. Then, step 4 proceeds.

Step 2) (S1240) If N>0 and the BS determines to decrease the counter, the BS sets N to N−1 (N=N−1).

Step 3) (S1250) The BS senses the channel for the additional sensing slot duration. If the additional sensing slot duration is idle (Y), step 4 proceeds. Otherwise (N), step 5 proceeds.

Step 4) (S1230) If N=0 (Y), the BS terminates the CAP (S1232). Otherwise (N), step 2 proceeds.

Step 5) (S1260) The BS senses the channel until either a busy sensing slot is detected within an additional defer duration $T_d$ or all the slots of the additional defer duration $T_d$ are detected to be idle.

Step 6) (S1270) If the channel is sensed to be idle for all the slot durations of the additional defer duration $T_d$ (Y), step 4 proceeds. Otherwise (N), step 5 proceeds.

Table 5 shows that $m_p$, a minimum contention window (CW), a maximum CW, a maximum channel occupancy time (MCOT), and an allowed CW size, which are applied to the CAP, vary depending on channel access priority classes.

TABLE 5

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255, 511,1023} |

The defer duration $T_d$ is configured in the following order: duration $T_f$(16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p}<=CW_p<=CW_{max,p}$. $CW_p$ may be initially configured by $CW_p=CW_{min,p}$ and updated before step 1 based on HARQ-ACK feedback (e.g., ACK or NACK) for a previous DL burst (e.g., PDSCH) (CW size update). For example, $CW_p$ may be initialized to $CW_{min,p}$ based on the HARQ-ACK feedback for the previous DL burst. Alternatively, $CW_p$ may be increased to the next highest allowed value or maintained as it is.

(2) Type 2 DL CAP Method

In the Type 2 DL CAP, the length of a time duration spanned by sensing slots sensed to be idle before transmission(s) may be determined. The Type 2 DL CAP is classified into Type 2A/2B/2C DL CAPs.

The Type 2A DL CAP may be applied to the following transmissions. In the Type 2A DL CAP, the BS may perform transmission immediately after the channel is sensed to be idle at least for a sensing duration $T_{short\_dl}$=25 us. Here, $T_{short\_dl}$ includes the duration $T_f$ (=16 us) and one sensing slot duration immediately after the duration $T_f$, where the duration $T_f$ includes a sensing slot at the beginning thereof.

Transmission(s) initiated by the BS including (i) a discovery burst only or (ii) a discovery burst multiplexed with non-unicast information, or Transmission(s) by the BS after a gap of 25 us from transmission(s) by the UE within a shared channel occupancy.

The Type 2B DL CAP is applicable to transmission(s) performed by the BS after a gap of 16 us from transmission(s) by the UE within a shared channel occupancy time. In the Type 2B DL CAP, the BS may perform transmission immediately after the channel is sensed to be idle for $T_f$=16 us. $T_f$ includes a sensing slot within 9 us from the end of the duration. The Type 2C DL CAP is applicable to
transmission(s) performed by the BS after a maximum of 16 us from transmission(s) by the UE within the shared channel occupancy time. In the Type 2C DL CAP, the BS does not perform channel sensing before performing transmission.

UL Signal Transmission Method in U-Band

The UE may perform a Type 1 or Type 2 CAP for UL signal transmission in a U-band. In general, the UE may perform the CAP (e.g., Type 1 or Type 2) configured by the BS for UL signal transmission. For example, a UL grant scheduling PUSCH transmission (e.g., DCI formats 0_0 and 0_1) may include CAP type indication information for the UE.

(1) Type 1 UL CAP Method

In the Type 1 UL CAP, the length of a time duration spanned by sensing slots sensed to be idle before transmission(s) is random. The Type 1 UL CAP may be applied to the following transmissions.

PUSCH/SRS transmission(s) scheduled and/or configured by the BS

PUCCH transmission(s) scheduled and/or configured by the BS

Transmission(s) related to a Random Access Procedure (RAP)

Figure 8:
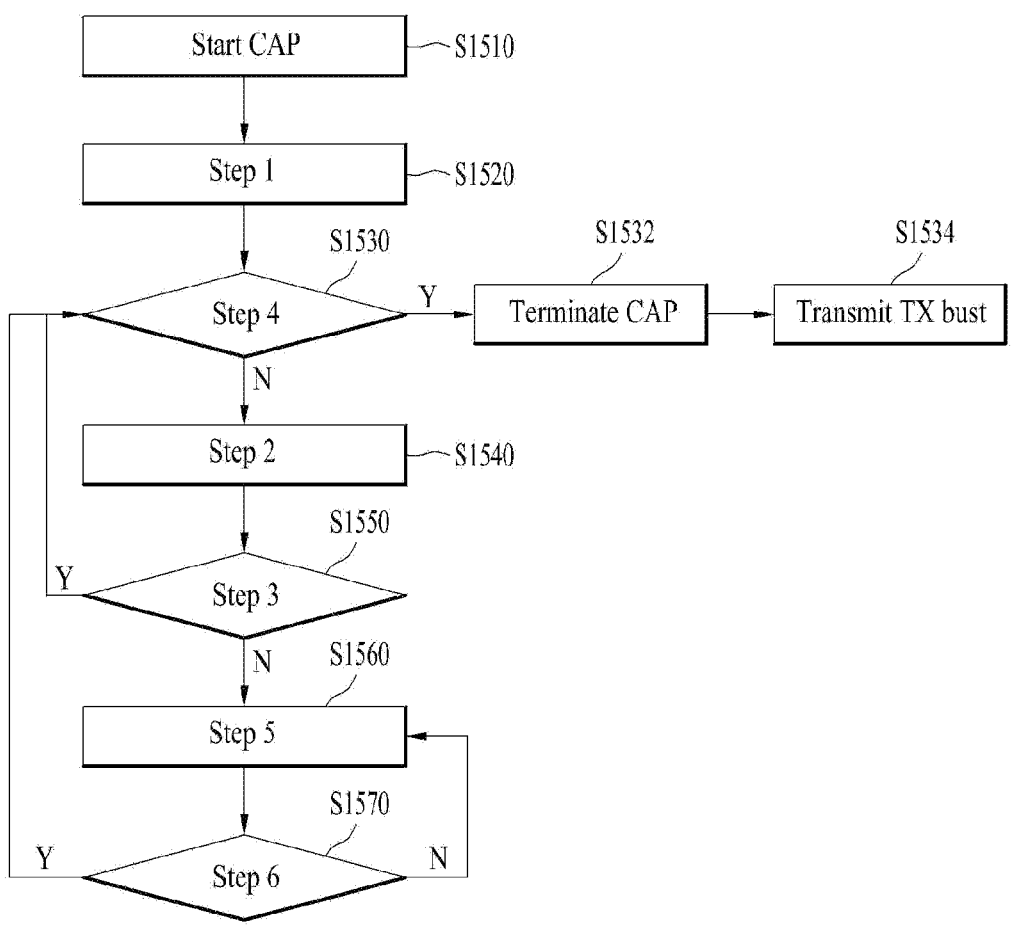

FIG. 8 is a flowchart illustrating CAP operations performed by a UE to transmit a UL signal.

Referring to FIG. 8, the UE may sense whether a channel is idle for sensing slot durations of a defer duration $T_d$. Then, if a counter N is zero, the UE may perform transmission (S1534). In this case, the UE may adjust the counter N by sensing the channel for additional sensing slot duration(s) according to the following steps:

Step 1) (S1520) The UE sets N to $N_{init}$ (N=$N_{init}$), where $N_{init}$ is a random number uniformly distributed between 0 and $CW_p$. Then, step 4 proceeds.

Step 2) (S1540) If N>0 and the UE determines to decrease the counter, the UE sets N to N−1 (N=N−1).

Step 3) (S1550) The UE senses the channel for the additional sensing slot duration. If the additional sensing slot duration is idle (Y), step 4 proceeds. Otherwise (N), step 5 proceeds.

Step 4) (S1530) If N=0 (Y), the UE terminates the CAP (S1532). Otherwise (N), step 2 proceeds.

Step 5) (S1560) The UE senses the channel until either a busy sensing slot is detected within an additional defer duration $T_d$ or all the slots of the additional defer duration $T_d$ are detected to be idle.

Step 6) (S1570) If the channel is sensed to be idle for all the slot durations of the additional defer duration $T_d$ (Y), step 4 proceeds. Otherwise (N), step 5 proceeds.

Table 6 shows that $m_p$, a minimum CW, a maximum CW, an MCOT, and an allowed CW size, which are applied to the CAP, vary depending on channel access priority classes.

TABLE 6

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6 ms or 10 ms | {15,31,63,127, 255,511,1023} |
| 4 | 7 | 15 | 1023 | 6 ms or 10 ms | {15,31,63,127 ,255,511,1023} |

The defer duration $T_d$ is configured in the following order: duration $T_f$(16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p}<=CW_p<=CW_{max,p}$. $CW_p$ may be initially configured by $CW_p=CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next highest allowed value or maintained as it is.

(2) Type 2 UL CAP Method

In the Type 2 UL CAP, the length of a time duration spanned by sensing slots sensed to be idle before transmission(s) may be determined. The Type 2 UL CAP is classified into Type 2A/2B/2C UL CAPs. In the Type 2A UL CAP, the UE may perform transmission immediately after the channel is sensed to be idle at least for a sensing duration $T_{short\_dl}$=25 us. Here, $T_{short\_dl}$ includes the duration $T_f$(=16 us) and one sensing slot duration immediately after the duration $T_f$. In the Type 2A UL CAP, $T_f$ includes a sensing slot at the beginning thereof. In the Type 2B UL CAP, the UE may perform transmission immediately after the channel is sensed to be idle for the sensing duration $T_f$=16 us. In the Type 2B UL CAP, $T_f$ includes a sensing slot within 9 us from the end of the duration. In the Type 2C UL CAP, the UE does not perform channel sensing before performing transmission.

RB Interlace

Figure 9:
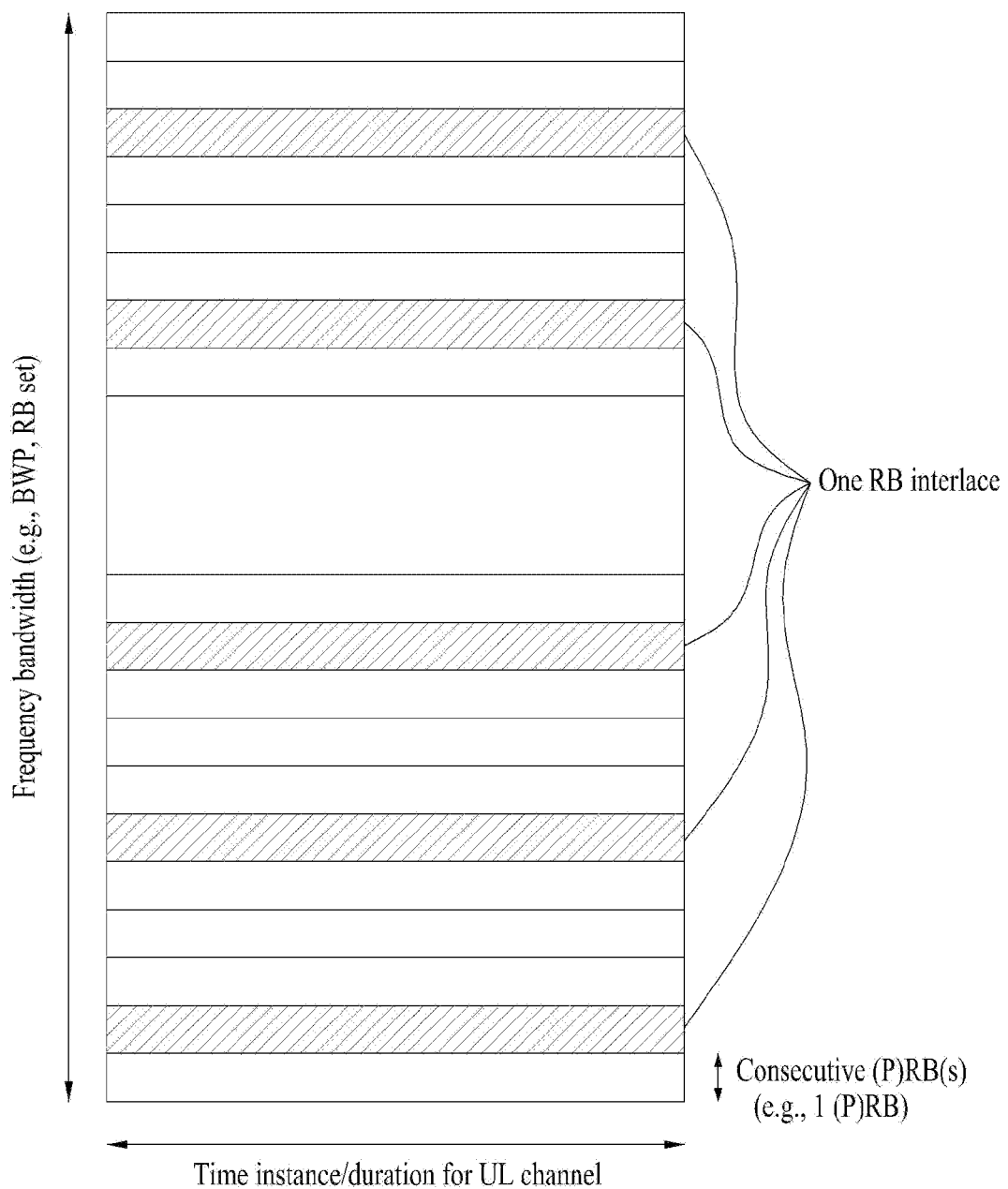
FIG. 9 illustrates a resource block (RB) interlace.

FIG. 9 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). Such a set of inconsecutive RBs is defined as the RB interlace (or interlace) for convenience.

Referring to FIG. 9, a plurality of RB interlaces (interlaces) may be defined in a frequency bandwidth. Here, the frequency bandwidth may include a (wideband) cell/CC/BWP/RB set, and the RB may include a PRB. For example, interlace #m∈{0, 1, . . . , M−1} may consist of (common) RBs {m, M+m, 2M+m, 3M+m, . . . }, where M represents the number of interlaces. A transmitter (e.g., UE) may use one or more interlaces to transmit a signal/channel. The signal/channel may include a PUCCH or PUSCH.

3. PUCCH Transmission in U-Band

The above descriptions (NR frame structure, RACH, U-band system, etc.) are applicable in combination with methods proposed in the present disclosure, which will be described later. Alternatively, the descriptions may clarify the technical features of the methods proposed in the present disclosure.

In addition, PRACH preamble design methods to be described later may be related to UL transmission, and thus, the methods may be equally applied to the above-described UL signal transmission methods in U-band systems. To implement the technical idea of the present disclosure in the corresponding systems, the terms, expressions, and structures in this document may be modified to be suitable for the systems.

For example, UL transmission based on the following PUCCH transmission methods may be performed on an L-cell and/or U-cell defined in the U-band systems.

As described above, the Wi-Fi standard (802.11ac) specifies a CCA threshold of −62 dBm for non-Wi-Fi signals and a CCA threshold of −82 dBm for Wi-Fi signals. In other words, a station (STA) or access point (AP) of the Wi-Fi system may transmit no signal in a specific band if the STA or AP receives a signal from a device not included in the Wi-Fi system in the specific band at a power of −62 dBm or higher.

In this document, the term 'U-band' may be interchangeably used with the terms 'shared spectrum'.

When a specific device (and/or node) transmits a signal in the shared spectrum, there may be restrictions in terms of the PSD. For example, according to the European Telecommunications Standards Institute (ETSI) regulation, signal transmission in a specific band needs to satisfy a PSD of 10 dBm/1 MHz. When the SCS is 15 kHz, if a PUSCH is transmitted in 5 PRBs (900 kHz), the maximum allowable power for the PUSCH may be about 10 dBm. In general, the maximum power of the UE is 23 dBm, and the maximum allowable power of 10 dBm is significantly lower than 23 dBm. If the UE transmits a UL signal at 10 dBm, the maximum UL coverage supported by the UE may be reduced. If the UE transmits a PUCCH in a wide frequency domain (F-domain) to increase the transmit power, it may help to solve the problem that the UL coverage becomes small.

As regulations in the shared spectrum, there may be restrictions in terms of the OCB. For example, when a specific device transmits a signal, the signal may need to occupy at least 80% of the system bandwidth. If the system bandwidth is 20 MHz, the signal transmitted by the specific device may need to occupy more than 16 MHz, which is 80% of 20 MHz.

As a PUCCH structure in consideration of the PSD and OCB related regulations, the above-described RB interlace structure may be used. Table 7 shows the total number of PRBs in a bandwidth for each SCS.

TABLE 7

| SCS (kHz) | 5 MHZ $N_{RB}$ | 10 MHZ $N_{RB}$ | 15 MHZ $N_{RB}$ | 20 MHZ $N_{RB}$ | 25 MHZ $N_{RB}$ | 30 MHZ $N_{RB}$ | 40 MHZ $N_{RB}$ |
|---|---|---|---|---|---|---|---|
| 15 | 25 | 52 | 79 | 106 | 133 | 160 | 216 |
| 30 | 11 | 24 | 38 | 51 | 65 | 78 | 106 |
| 60 | N/A | 13 | 18 | 24 | 31 | 38 | 51 |

| SCS (kHz) | 50 MHZ $N_{RB}$ | 60 MHz $N_{RB}$ | 80 MHZ $N_{RB}$ | 90 MHZ $N_{RB}$ | 100 MHz $N_{RB}$ |
|---|---|---|---|---|---|
| 15 | 270 | N/A | N/A | N/A | NA |
| 30 | 133 | 162 | 217 | 245 | 273 |
| 60 | 65 | 79 | 107 | 121 | 135 |

Figure 10:
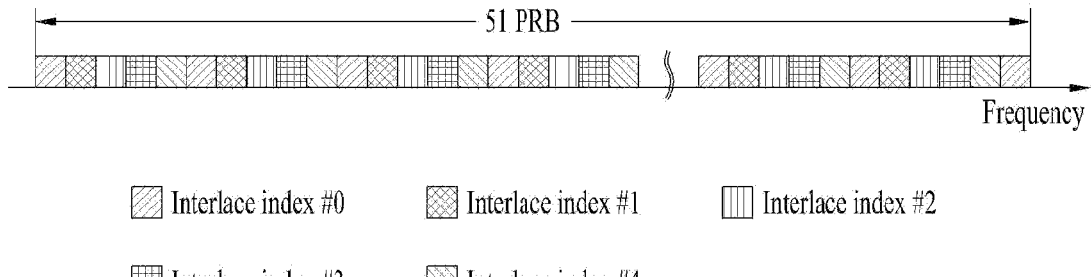
FIGS. 10 to 30 are diagrams illustrating uplink (UL) channel transmission according to the embodiments of the present disclosure.

Referring to Table 7, when the SCS is 30 kHz, the total number of PRBs in the 20 MHz bandwidth is 51. A total of five interlaces may be used in consideration of the 51 PRBs. Each interlace consists of 10 or 11 PRBs. The interval between PRBs included in each interlace is five PRBs (with respect to the starting point). FIG. 10 illustrates an example in which five interlaces are configured at 20 MHz in the 30 kHz SCS (interlace index #0 consists of 11 PRBs, and each of interlace indexes #1 to #4 consists of 10 PRBs). In this case, among the five interlaces, interlaces occupying smaller frequency bands may also occupy more than 80% of 20 MHz when a signal and/or channel is transmitted and received. For example, each of the interlaces with interlace indexes #1 to #4 also occupies 46 (PRBs)*30 (SCS)*12 (subcarriers)=16560 kHz, which exceeds 16000 kHz, i.e., 80% of 20 MHz.

Figure 11:
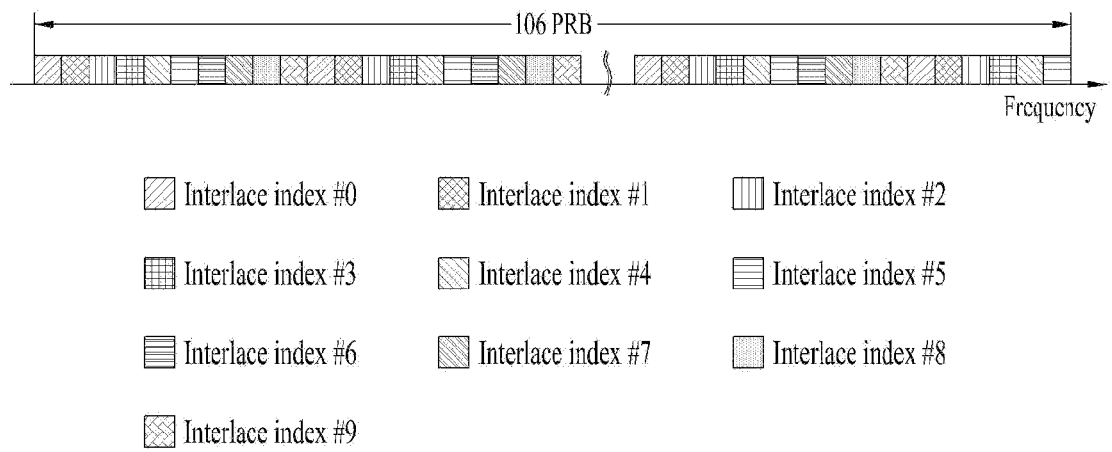

Referring to Table 7, when the SCS is 15 kHz, the total number of PRBs in the 20 MHz bandwidth is 106. A total of 10 interlaces may be used in consideration of the 106 PRBs. Each interlace consists of 10 or 11 PRBs. The interval between PRBs included in each interlace is 10 PRBs (with respect to the starting point). FIG. 11 illustrates an example in which 10 interlaces are configured at 20 MHz in the 15 kHz SCS (each of interlace indexes #0 to #5 consists of 11 PRBs, and each of interlace indexes #6 to #9 consists of 10 PRBs). In this case, among the 10 interlaces, interlaces occupying smaller frequency bands may also occupy more than 80% of 20 MHz while a signal and/or channel is transmitted and received. For example, each of the interlaces with interlace indexes #6 to #9 also occupies 91 (PRBs)*15 (SCS)*12 (subcarriers)=16380 kHz, which exceeds 16000 kHz, i.e., 80% of 20 MHz.

In the NR system, when the UE performs initial access in the U-band, the UE may not know the SCS of SS/PBCH blocks configured by the BS. Therefore, to reduce UE implementation complexity, it may be defined that the UE needs to use the 30 kHz SCS when performing initial access in the U-band.

In the conventional NR system, the SCS of CORESET #0 is indicated as either 15 kHz or 30 kHz by an MIB transmitted over a PBCH. However, in the NR U-band, it is defined that the SCS of CORESET #0 is always the same as the SCS of an SS/PBCH block (existing on the same carrier). For example, when the SCS of the SS/PBCH block is 30 kHz, the SCS of CORESET #0 becomes 30 kHz, and when the SCS of the SS/PBCH block is 15 kHz, the SCS of CORESET #0 becomes 15 kHz.

In the conventional NR system, the number of PRBs in CORESET #0 may be indicated by the MIB transmitted over the PBCH. However, in the NR U-band, the number of PRBs of CORESET #0 may be predetermined depending on the SCS of CORESET #0. That is, if the SCS of CORESET #0 is 30 kHz, the number of PRBs of CORESET #0 may be defined as 48. If the SCS of CORESET #0 is 15 kHz, the number of PRBs of CORESET #0 may be defined as 96.

In the conventional NR system, an initial active UL BWP is defined to be equal to the bandwidth of CORESET #0. In the U-band, if there are no special restrictions, the UE may operate by assuming that the size of the initial active UL BWP is equal to the number of RBs in CORESET #0 before an RRC setup.

For example, when the SCSs of the SS/PBCH block and CORESET #0 are 30 kHz, the size of the initial active UL BWP may be 48 PRBs. When the SCSs of the SS/PBCH block and CORESET #0 are 15 kHz, the size of the initial active UL BWP may be 96 PRBs. Assuming that the interlace structure defined in FIG. 10 is used as it is, if the UE intends to use some interlace indexes to transmit a signal/channel (during an initial access process), the UE may not satisfy OCB requirements. To satisfy the OCB requirements, when a specific node transmits a signal in the U-band, the signal needs to occupy more than 80% of an LBT subband bandwidth. Thus, when the UE transmits a signal/channel in a bandwidth of 20 MHz, the signal needs to occupy a bandwidth of 1.6 MHz or higher to satisfy the OCB requirements. In addition, the specific node needs to satisfy the OCB requirements at least once during a specific time window (e.g., one second). In the initial active UL BWP, the UL interlace may be used/targeted for/to a Msg3 PUSCH and/or an A/N PUCCH for Msg4.

Hereinafter, a method of newly configuring/setting/transmitting a UL interlace when a predefined interlace structure does not satisfy the OCB requirements on the assumption that the (initial) active UL BWP is less than 51 (51 PRBs) at the 30 kHz SCS and/or less than 106 (106 PRBs) at the 15 kHz SCS will be described.

Hereinafter, UE operations for performing UL transmission based on the UL interlace proposed in the present disclosure will be described.

(1) First, the UE may receive UL interlace configuration information for UL transmission from the BS. Here, the UL interlace configuration information may include the UL interlace indexes of UL interlaces that satisfy the defined OCB requirements for each SCS. (2) Second, the UE may determine at least one UL interlace based on the UL interlace configuration information. (3) Then, the UE may perform UL transmission to the BS based on the determined at least one UL interlace.

More specific details will be described with reference to the following embodiments.

3.1. Embodiment 1

Embodiment 1 relates to methods in which the BS indicates interlace indexes that satisfy specific conditions (e.g., OCB requirements) while maintaining the predefined interlace structure. The UE may transmit a signal and/or channel in the interlace with the indicated index.

Specifically, although the interlace structure described above with reference to FIGS. 10 to 11 is used, the BS may set interlaces satisfying the OCB requirements to available (valid) interlaces in the initial active UL BWP. That is, the BS may set interlace indexes satisfying the OCB requirements to interlace indexes available in the initial active UL BWP. In this case, other interlaces that do not satisfy the OCB requirements may be used by UEs that have already established RRC connections (only in specific cases where the OCB requirements do not need to be satisfied).

Figure 12:
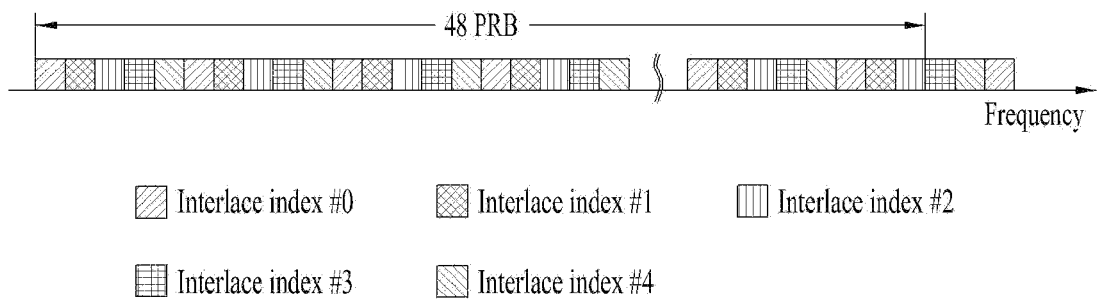

For example, if the SCS of CORESET #0 is 30 kHz, the initial active UL BWP is set to 48 PRBs. If the initial active UL BWP is 48 PRBs, each of the interlaces with indexes #0, #1, and #2 consists of 10 PRBs, and each of the interlaces with indexes #3 and #4 consists of 9 PRBs as shown in FIG. 12. That is, if the UE uses an interlace consisting of only 9 PRBs, the UE may transmit a signal and/or channel by occupying 41 (PRBs)*30 (SCS)*12 (subcarriers)=14760 kHz only so that the OCB requirements may not be satisfied. Here, 41 PRBs may be calculated as follows. For the interlace consisting of 9 PRBs, since the interval between PRBs is five PRBs (with respect to the starting point), one PRB may be included in the interlace for every five PRBs. Assuming that the first PRB (e.g., PRB index #3) of the interlace consisting of the 9 PRBs is included in an interlace with index #3, the total number of PRBs included in the interlace with index #3 among first 40 consecutive PRBs is 8. That is, PRBs with indexes #3, #8, #13, #18, #23, #28, #33, and #38 are included in the interlace with index #3. A PRB (i.e., PRB index #43) apart from five PRBs from the PRB with index #38 is also included in the interlace with index #3. Thus, the frequency band occupied by the interlace with index #3 is a total of 41 PRBs: PRBs with indexes #3 to #43. If the number of PRBs included in the interlace with index #3 is 10, the next PRB (i.e., PRB index #48) needs to be included, which is a value out of the bandwidth size of the initial active UL BWP. Therefore, the interlace with index #3 may consist of only the 9 PRBs.

Three interlaces (interlace indexes #0, #1, and #2) that satisfy the OCB requirements, each of which consists of 10 PRBs, may be used by UEs performing random access in the initial active UL BWP (i.e., UEs in the RRC-idle mode and/or RRC-connected mode). The three interlaces (interlace indexes #0, #1, and #2) that satisfy the OCB requirements, each of which consists of 10 PRBs, may be used by UEs that have established no RRC connection and/or no separate (UE-specific) UL BWP configuration. For example, the UEs that have established no RRC connection and/or no separate (UE-specific) UL BWP configuration may use the interlaces for Msg3 PUSCH transmission and/or HARQ-ACK feedback transmission for Msg4 reception. Two interlaces with indexes #3 and #4 that do not satisfy the OCB requirements, each of which consists of 9 PRBs, may be used by UEs that have established RRC connections (only in specific cases where the OCB requirements do not need to be satisfied). The two interlaces with indexes #3 and #4 that do not satisfy the OCB requirements may not be used by UEs performing random access. In addition, the two interlaces with indexes #3 and #4 that do not satisfy the OCB requirements may not be used by UEs that have established no RRC connection and/or no UL BWP configuration.

Figure 13:
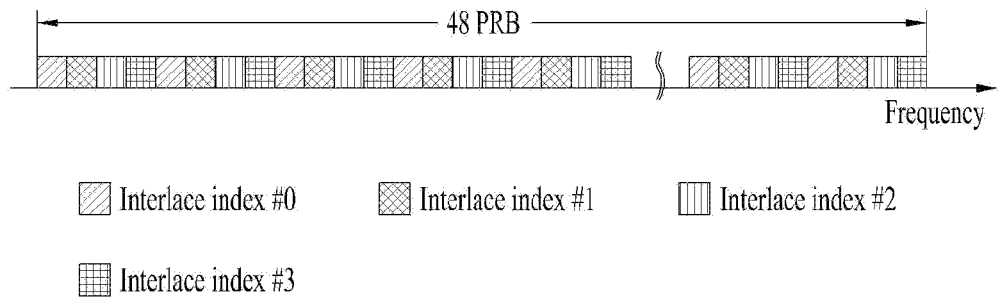

As another example, if the SCS of CORESET #0 is 15 kHz, the initial active UL BWP is set to 96 PRBs. In this case, each of the interlaces with indexes #0 to #5 consists of 10 PRBs, and each of the interlaces with indexes #6 to #9 consists of 9 PRBs as shown in FIG. 13. That is, if the UE uses an interlace consisting of only 9 PRBs, the UE may transmit a signal and/or channel by occupying 81 (PRBs)*15 (SCS)*12 (subcarriers)=14580 kHz only so that the OCB requirements may not be satisfied.

In this case, the 6 interlaces (interlace indexes #0 to #5) that satisfy the OCB requirements, each of which consists of 10 PRBs, may be used by UEs performing random access in the initial active UL BWP (i.e., UEs in the RRC-idle mode and/or RRC-connected mode). The 6 interlaces (interlace indexes #0 to #5) that satisfy the OCB requirements, each of which consists of 10 PRBs, may be set to interlaces available (valid) for UEs that have established no RRC connection and/or no separate (UE-specific) UL BWP configuration. For example, the UEs that have established no RRC connection and/or no separate (UE-specific) UL BWP configuration may use an interlace available for Msg3 PUSCH transmission and/or HARQ-ACK feedback transmission for Msg4 reception. Four interlaces (interlace indexes #6 to #9) that do not satisfy the OCB requirements, each of which consists of 9 PRBs, may be used by UEs that have established RRC connections (only in specific cases where the OCB requirements do not need to be satisfied). The four interlaces (interlace indexes #6 to #9) that do not satisfy the OCB requirements may not be used by UEs performing random access. In addition, the four interlaces (interlace indexes #6 to #9) that do not satisfy the OCB requirements may not be used by UEs that have established no RRC connection and/or no UL BWP configuration.

The method of Embodiment 1 will be further described in terms of signaling between the BS and UE. As described in the proposed method, the BS may inform the UE of one or multiple UL interlaces that satisfy the OCB requirements and instruct the UE to transmit the Msg3 PUSCH and/or A/N PUCCH for Msg4. That is, the UE may be configured to expect that the BS will indicate one or multiple UL interlaces that satisfy the OCB requirements. In other words, the UE may expect that an UL interlace that does not satisfy the OCB requirements will not be indicated for use in the Msg3 PUSCH or A/N PUCCH for Msg4. If the UL interlace that does not satisfy the OCB requirements is indicated, the UE may determine that an error occurs. The proposed method has a disadvantage in that the number of UL interlaces available for the initial access process is limited in terms of resource utilization of the BS.

In addition to the proposed method, the following method may also be considered. When the BS informs one UE of a plurality of UL interlaces including one or more UL interlaces that satisfy the OCB requirements, the UE may use the plurality of interlaces to transmit the Msg3 PUSCH and/or A/N PUCCH for Msg4. If the UE transmits one signal and/or channel in the plurality of indicated UL interlaces, the UE may satisfy the OCB requirements. In this case, the UE may expect that at least one UL interface satisfying the OCB requirements is indicated. For example, when one UE is configured with interlace index #0 and interlace index #4 of FIG. 12, the UE may perform UL transmission satisfying the OCB requirements by transmitting one channel in the two interlaces. When the UE transmits one channel in a plurality of UL interlaces, there is an advantage in that the number of UL interlaces available for the initial access process increases.

Additionally, the BS may inform one UE of a plurality of UL interlaces including only UL interlaces that do not satisfy the OCB requirements, and the UE may transmit the Msg3 PUSCH or A/N PUCCH for Msg4 in the indicated interlaces. To this end, the BS needs to first determine whether a combination of UL interlaces that do not satisfy the OCB requirements are capable of meeting the OCB requirements. If the combination of UL interlaces that do not satisfy the OCB requirements meet the OCB requirements, the BS may indicate the combination of UL interlaces to the UE. The UE may transmit the Msg3 PUSCH or A/N PUCCH for Msg4 in the indicated combination of UL interlaces. Since the UE performs UL transmission based on the interlaces that do not satisfy the OCB requirements, there is an advantage that the number of UL interlaces available for the initial access process is the largest, compared to the proposed methods.

The following UE operations may be added to the above-described proposal/configuration methods. In the current NR system, the BS may indicate a PUCCH resource list to the UE through higher layer signaling (e.g., PUCCH-Config) or a predefined configuration (e.g., Table 9.2.1-1 in TS 38.213). Thereafter, the BS may provide a PUCCH resource index to the UE in a 3-bit (or 4-bit) field of remaining minimum system information (RMSI) and/or DCI formats. Based on this, the following BS/UE operations may be defined in the NR-U system.

First, when the BS configures the PUCCH resource list, the BS may include only UL interlace indexes that satisfy the OCB requirements in the PUCCH resource list. That is, when the BS configures the PUCCH resource list, the BS may exclude UL interlace indexes that do not satisfy the OCB requirements from the PUCCH resource list. In particular, when the PUCCH resource list is configured, the PUCCH resource list may not be fully filled with only a single UL interlace and initial CS indexes.

In this case, (1) the BS may indicate PUCCH resources to the UE by leaving some indexes of the PUCCH resource list empty. The UE may expect that empty indexes are not indicated. If the BS indicates the empty indexes of the PUCCH resource list as PUCCH resource indexes, the UE may ignore the PUCCH resource indexes.

Alternatively, (2) the BS may configure the empty indexes of the PUCCH resource list as a combination of multiple UL interlaces. That is, the BS may configure a combination of multiple UL interlaces including at least one UL interlace satisfying the OCB requirements and add the combination of multiple UL interlaces to the PUCCH resource list. Alternatively, the BS may configure a combination of multiple UL interlaces among UL interlaces that do not satisfy the OCB requirements such that the combination of multiple UL interlaces satisfy the OCB requirements and add the combination of multiple UL interlaces to the PUCCH resource list. The UE may determine that all PUCCH resource indexes are meaningful and follow the instructions of the BS.

Alternatively, (3) when the BS fills the empty indexes of the PUCCH resource list, the BS may use a symbol next to the current PUCCH symbol. That is, the BS may fill the PUCCH resource list by configuring a single UL interlace satisfying the OCB requirements to be transmitted in symbol(s) next to the current PUCCH symbol.

Alternatively, (4) the BS may fill the empty indexes of the PUCCH resource list by reusing previously used PUCCH resources. That is, the same PUCCH resource may be indicated by a plurality of indexes. The UE may determine that all PUCCH resource indexes are meaningful and follow the instructions of the BS.

For example, if the SCS of CORESET #0 is 30 kHz, the initial UL BWP is set to 48 PRBs. In this case, each of the interlaces with indexes #0, #1, and #2 consists of 10 PRBs, and each of the interlaces with indexes #3 and #4 consists of only 9 PRBs as shown in FIG. 12. That is, the interlaces with indexes #3 and #4 do not satisfy the OCB requirements. If the BS intends to set 8 PUCCH resource indexes as PUCCH format 0, 6 PUCCH resource indexes among the 8 PUCCH resource indexes may be configured with combinations of three interlace indexes: #0, #1, and #2 and two starting CS offsets: #0 and #6. The remaining two PUCCH resource indexes may be configured by regarding a combination of interlace indexes #0 and #4 as one PUCCH resource and combining the combination with starting CS offsets: #0 and #6. Alternatively, the remaining two PUCCH resource indexes in the PUCCH resource list may be reconfigured from the first interlace after a symbol next to an OFDM symbol indicated by the BS.

Second, when the BS configures the PUCCH resource list, the BS may use all configured UL interlace indexes regardless of whether the OCB requirements are satisfied. That is, when the BS configures the PUCCH resource list, the BS may use all UL interlace indexes.

The following BS and UE operations may be considered. (1) The BS configures the PUCCH resource list by including all UL interlace indexes and indicates the configured PUCCH resource list to the UE. The UE determines whether the OCB requirements are satisfied based on the UL interlace indexes included in the PUCCH resource list. Thereafter, the UE may expect that a PUCCH resource index using only a UL interlace that does not satisfy the OCB requirements is not indicated. If the BS indicates the PUCCH resource index using only the UL interlace that does not satisfy the OCB requirements, the UE may ignore the PUCCH resource index.

The proposed method may be generalized as follows. When the number of bits indicating a PUCCH resource, which is signaled by a DCI field or CCE resource index in a PDCCH, is K, the maximum number of PUCCH resources configurable in a PUCCH resource set, which is configured by SIB/RMSI (based on a set of PUCCH resource related parameters), may be N=2K On the other hand, when N PUCCH resources are (virtually) configured based on the set of PUCCH resource related parameters (configured by the SIB/RMSI), if the number of resources that satisfy the OCB requirements is M and the number of resources that do not satisfy the OCB requirements is L (that is, N=M+L), a PUCCH resource set allocated/available to the UE may be configured as follows.

Method (1): A PUCCH resource set may be configured with a total of N PUCCH resources including both M PUCCH resources satisfying the OCB requirements and L PUCCH resources not satisfying the OCB requirements. In other words, the PUCCH resource set may include PUCCH resources corresponding to a total of N PUCCH resource indexes including M PUCCH resource indexes satisfying the OCB requirements and L PUCCH resource indexes not satisfying the OCB requirements. In this case, the UE may operate on the assumption that only the M PUCCH resource indexes satisfying the OCB requirements are indicated by the gNB (or only the M PUCCH resource indexes satisfying the OCB requirements are available/transmittable).

Method (2): A PUCCH resource set having a total of N PUCCH resource indexes may be configured by mapping only M PUCCH resources satisfying the OCB requirements to the N PUCCH resource indexes. In this case, the actual number of allocated PUCCH resources may be M. Some (e.g., L) PUCCH resource indexes may indicate the same PUCCH resources.

Method (3): A PUCCH resource set may be configured to have a total of N PUCCH resources including M PUCCH resources satisfying the OCB requirements and additional L PUCCH resources. In other words, the PUCCH resource set may include PUCCH resources corresponding to a total of N PUCCH resource indexes including M PUCCH resource indexes satisfying the OCB requirements and additional L PUCCH resource indexes. The additional PUCCH resource may be obtained by configuring a single PUCCH resource in the form of multiple interlaces (or interlaces having multiple indexes). Additionally/alternatively, the additional PUCCH resource may be a PUCCH resource configured by applying a value other than configured PUCCH resource related parameters (e.g., different starting symbol index).

Hereinafter, a PUCCH resource set and a PUCCH resource indicator (PRI) will be briefly reviewed before describing the methods proposed in the present disclosure in detail.

If the UE does not have a dedicated PUCCH resource configuration provided by PUCCH-ResourceSet in PUCCH-config, a PUCCH resource set is provided by pucch-ResourceCommon. The PUCCH resource set indicated by pucch-ResourceCommon may be determined based on the index of one row of Tables 8 to 34 for transmission of HARQ-ACK information on a PUCCH in an initial UL BWP of $N_{BW}^{size}$ RBs. The PUCCH resource set includes 16 resources. For each PUCCH resource, a PUCCH format, a first symbol for PUCCH transmission, a PUCCH duration, a PRB offset ($RB_{BWP}^{offset}$) for PUCCH transmission, and a CS index set for PUCCH transmission are configured. The UE transmits the PUCCH based on frequency hopping. An OCC with index 0 is used for PUCCH resources with PUCCH format 1 in Table 8. The UE transmits the PUCCH by using the same spatial domain transmission filter as for a PUSCH scheduled by an RAR UL grant, as described in clause 8.3 of 3GPP Rel-16 38.214. If the UE is not provided with pdsch-HARQ-ACK-Codebook, the UE generates at most one HARQ-ACK information bit.

If the UE needs to provide HARQ-ACK information in the PUCCH transmission in response to detection of DCI format 1_0 or DCI format 1_1, the UE determines a PUCCH resource. The index of the PUCCH resource is $r_{PUCCH}$, where $0 \leq r_{PUCCH} \leq 15$ and $$r_{PUCCH} = \left\lfloor \frac{2 \cdot n_{CCE,0}}{N_{CCE}} \right\rfloor + 2 \cdot \Delta_{PRI}.$$

$N_{CCE}$ is the number of CCEs in a CORESET for PDCCH reception with DCI format 1_0 or DCI format 1_1, $n_{CCE,0}$ is the index of a first CCE for the PDCCH reception, and $\Delta_{PRI}$ is the value of a PRI field in DCI format 1_0 or DCI format 1_1.

If $\lfloor r_{PUCCH}/8 \rfloor = 0$, the UE determines the PRB index of the PUCCH transmission in the first hop as $RB_{BWP}^{offset} + \lfloor r_{PUCCH}/N_{CS} \rfloor$ and the PRB index of the PUCCH transmission in the second hop as $N_{BWP}^{size} - 1 - RB_{BWP}^{offset} - \lfloor r_{PUCCH}/$ $N_{CS}$], where $N_{CS}$ is the total number of initial CS indexes in a set of initial cyclic shift indexes. In addition, the UE determines the initial cyclic shift index in the initial cyclic shift index set as $r_{PUCCH}$ mod $N_{CS}$.

If $\lfloor r_{PUCCH}/8 \rfloor$, the UE determines the PRB index of the PUCCH transmission in the first hop as $N_{BWP}^{size}-1-RB_{BWP}^{offset}-\lfloor(r_{PUCCH}-8)/N_{CS}\rfloor$ and the PRB index of the PUCCH transmission in the second hop as $RB_{BWP}^{offset}+\lfloor(r_{PUCCH}-8)N_{CS}\rfloor$. The UE determines the initial cyclic shift index in the initial cyclic shift index set as $(r_{PUCCH}-8)$ mod $N_{CS}$.

$\lfloor x \rfloor$ is a symbol denoting the floor operation and means the greatest natural number or integer that does not exceed x.

TABLE 8

| Index | PUCCH format | First symbol | Number of symbols | PRB offset $RB_{BWP}^{offset}$ | Set of intial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | [$N_{BWP}^{size}/4$] | {0, 3, 6, 9} |

The PRI may be included in DCI format 1_0 and DCI format 1_1. The PUCCH resource of the UE may be determined based on the PRI.

As defined in Table 9, PRI field values are mapped to values of a set of PUCCH resource indexes. The set of PUCCH resource indexes is provided by ResourceList for PUCCH resources from a set of PUCCH resources provided by PUCCH-RsourceSet including a maximum of 8 PUCCH resources

TABLE 9

| PUCCH resource indicator | PUCCH resource |
|---|---|
| '000' | 1$^{st}$ PUCCH resource provided by pucch-ResourceId obtained from the 1$^{st}$ value of resourceList |
| '001' | 2$^{nd}$ PUCCH resource provided by pucch-ResourceId obtained from the 2$^{nd}$ value of resourceList |
| '010' | 3$^{rd}$ PUCCH resource provided by pucch-ResourceId obtained from the 3$^{rd}$ value of resourceList |
| '011' | 4$^{th}$ PUCCH resource provided by pucch-ResourceId obtained from the 4$^{th}$ value of resourceList |
| '100' | 5$^{th}$ PUCCH resource provided by pucch-ResourceId obtained from the 5$^{th}$ value of resourceList |
| '101' | 6$^{th}$ PUCCH resource provided by pucch-ResourceId obtained from the 6$^{th}$ value of resourceList |
| '110' | 7$^{th}$ PUCCH resource provided by pucch-ResourceId obtained from the 7$^{th}$ value of resourceList |
| '111' | 8$^{th}$ PUCCH resource provided by pucch-ResourceId obtained from the 8$^{th}$ value of resourceList |

The methods proposed in Embodiment 1 will be described in more detail. The following three major approaches may be considered.

[1] Approach 1: A table configured with 8 PUCCH resource sets is defined without configuring any cell-specific PRB (interlace) offsets. Each PUCCH resource set may include 16 PUCCH resources. One of the PUCCH resource sets may be indicated through 3-bit signaling in RMSI. Specifically, the PUCCH resource may be indicated by 3-bit PRI+1-bit CCE (=16 states).

[2] Approach 2: A table consisting of 16 PUCCH resource sets is defined with cell-specific PRB (interlace) offsets. Each PUCCH resource set includes 8 PUCCH resources. One of the PUCCH resource sets may be indicated through 4-bit signaling in RMSI. Specifically, the PUCCH resource may be indicated by a 3-bit PRI (=8 states).

[3] Approach 3: A table consisting of 16 PUCCH resource sets is defined with cell-specific PRB (interlace) offsets. Each PUCCH resource set includes 16 PUCCH resources. One of the PUCCH resource sets may be indicated through 4-bit signaling in RMSI. Specifically, the PUCCH resource may be indicated by 3-bit PRI+1-bit CCE (=16 states).

The RMSI may mean an SIB. The 3-bit PRI may be signaled in a specific field of DL grant DCI. The 1-bit CCE may be determined based on a CCE index used for transmission of a PDCCH carrying the DL grant DCI.

The RMSI may mean the SIB. The 3-bit PRI may be signaled in the specific field of the DL grant DCI. The 1-bit CCE may be determined based on the CCE index used for transmission of the PDCCH carrying the DL grant DCI.

Approach 1 may have the following three options in using UL interlace indexes in an initial UL BWP. Since the UE expects that the initial UL BWP will operate at the 30 kHz SCS, these options will be described based on the 30 kHz SCS.

(1) Option 1: Three interlace indexes (e.g., interlace indexes #0, #1, and #2 in FIG. 12) satisfying the OCB requirements may be used in the previously defined interlace structure.

(2) Option 2: Five interlace indexes may be used in the previously defined interlace structure, regardless of whether the OCB requirements are satisfied.

(3) Option 3: Four interlace indexes may be used irrespective of whether the previously defined interlace structure or an interlace structure to be newly introduced in Embodiment 2 is used.

According to Approach 1, a 3-bit RMSI signaling based PUCCH resource set table without no cell-specific interlace offsets may be defined as shown in Table 10. In NR-U, since a UL resource for transmission of PUCCH format 0/1 is one interlace consisting of multiple PRBs rather than one PRB, no cell-specific PRB offset may need to be configured in consideration of the effects of interference between adjacent cells. Therefore, an existing PUCCH resource set table based on 4-bit RMSI signaling may be modified into the 3-bit RMSI signaling based PUCCH resource set table as shown in Table 10.

TABLE 10

| Index | PUCCH format | First symbol | Number of symbols | Set of intial CS indexes |
|---|---|---|---|---|
| 0 | 0 | 12 | 2 | {0, 3} |
| 1 | 0 | 12 | 2 | {0, 4, 8} |
| 2 | 1 | 10 | 4 | {0, 6} |
| 3 | 1 | 10 | 4 | {0, 3, 6, 9} |
| 4 | 1 | 4 | 10 | {0, 6} |
| 5 | 1 | 4 | 10 | {0, 3, 6, 9} |
| 6 | 1 | 0 | 14 | {0, 6} |
| 7 | 1 | 0 | 14 | {0, 3, 6, 9} |

In this case, according to the number of interlaces defined in each option, methods and operations of indicating PUCCH resources with 3-bit PRI+1-bit CCE (=16 states)

may be configured as follows. The capacity of OCC indexes described in this document may be based on the number of PUCCH symbols. That is, if the number of symbols is 14, a maximum of 7 OCC indexes may be used. If the number of symbols is 10, a maximum of five OCC indexes may be used. If the number of symbols is 4, a maximum of two OCC indexes may be used.

Proposal 1) Cases in which among the five interlaces of FIG. 12, three interlaces are used as in Option 1 will be described.

A. For (RMSI values) indexes 3, 5, and 7 of Table 10, a combination of one of the three interlace indexes and one of four CS indexes (i.e., 0, 3, 6, and 9) is indicated. OCC index #0 is applied. Therefore, 3*4=12 states are configured for PUCCH resources. Since the number of PUCCH resources ($r_{PUCCH}$) needs to be 16, the remaining four states are used to indicate one of four PUCCH resources based on other OCC indexes (e.g., #1). For example, a combination of one interlace (e.g., interlace index #0) and one of four CSs is indicated. OCC index #1 is applied to the remaining four states.

B. For (RMSI values) indexes 4 and 6 of Table 10, a combination of one of the three interlace indexes, one of two CS indexes (i.e., 0 and 6), and one of two OCC indexes (e.g., indexes 0 and 1) is indicated. Therefore, 3*2*2=12 states are configured for PUCCH resources. The remaining four states are used to indicate one of four PUCCH resources based on other OCC indexes (e.g., #2). For example, a combination of one of two interlace indexes (e.g., interlace indexes #0 and #1) and one of two CS indexes is indicated. OCC index #2 is applied to the remaining four states.

C. For (RMSI value) index 2 of Table 10, a combination of one of the three interlace indexes, one of two CS indexes (i.e., 0 and 6), and one of two OCC indexes (e.g., indexes 0 and 1) is indicated. The starting symbol index is 10. Therefore, 3*2*2=12 states are configured for PUCCH resources. The remaining four states are used to indicate one of four PUCCH resources based on other starting symbols (e.g., index 4 or 5). For example, a combination of one of two interlace indexes (e.g., interlace indexes #0 and #1) and one of two CS indexes is indicated. If the combination of one of the two interlace indexes and one of the two CS indexes is indicated, OCC index #0 is applied. As another example, a combination of one of two CS indexes (i.e., 0 and 6) and one of two OCC indexes (e.g., #0 and #1) may be indicated. If the combination of one of the two CS indexes and one of the two OCC indexes is indicated, interlace index #0 is applied.

D. For (RMSI value) index 0 of Table 10, a combination of one of the three interlace indexes, one of two CS indexes (i.e., 0 and 3) and one of two starting symbols (e.g., indexes 12 and 8 or 9) is indicated. Therefore, 3*2*2=12 states are configured for PUCCH resources. The remaining four states may be used to indicate one of four PUCCH resources based on other starting symbols (e.g., index 4 or 6). For example, a combination of one of two interlace indexes (e.g., interlace indexes #0 and #1) and one of two CS indexes is indicated. Starting symbol index #4 or #6 is applied to the remaining four states.

E. For (RMSI value) index 1 of Table 10, a combination of one of the three interlace indexes and one of three CS indexes (i.e., 0, 4, and 8) is indicated. Therefore, 3*3=9 states are configured for PUCCH resources. The remaining 7 states are used to indicate one of 7 PUCCH resources based on other starting symbols (e.g., index 8 or 9). For example, a combination of one of the three interlace indexes (e.g., interlace indexes #0, #1, and #2) and one of three CS indexes is indicated, but for a specific interlace index (e.g., #0), only one CS (e.g., #0) may be used. The two CS indexes (e.g., #4 and #8) may be used for the two interlace indexes (e.g., #1 and #2) except for the specific interlace index. Starting symbol index 8 or 9 is applied to the remaining 7 states.

Proposal 2) Cases in which all five interlaces of FIG. 12 are used as in Option 2 will be described.

A. For (RMSI values) indexes 3, 5, and 7 of Table 10, a combination of one of the five interlace indexes and one of four CS indexes (i.e., 0, 3, 6, and 9) is indicated. OCC index #0 is applied. Therefore, 5*4=20 states are configured for PUCCH resources. Since the number of PUCCH resources ($r_{PUCCH}$) needs to be 16, four extra states are excluded from the configuration of PUCCH resources. For example, combinations of one interlace (e.g., interlace index #4) and four CSs are excluded.

B. For (RMSI values) indexes 2, 4, and 6 of Table 10, a combination of one of the five interlace indexes and one of two CS indexes (i.e., 0 and 6) is indicated. OCC index #0 is applied. Therefore, 5*2=10 states are configured for PUCCH resources. The remaining 6 states are used to indicate one of 6 PUCCH resources based on other OCC indexes (e.g., #1). For example, a combination of one of three interlace indexes (e.g., interlace indexes #0, #1, and #2) and one of two CS indexes is indicated. OCC index #1 is applied to the remaining 6 states.

C. For (RMSI value) index 0 of Table 10, a combination of one of the five interlace indexes and one of two CS indexes (i.e., 0 and 3) is indicated. Starting symbol index 12 is applied. Therefore, 5*2=10 states are configured for PUCCH resources. The remaining 6 states are used to indicate one of 6 PUCCH resources based on other starting symbols (e.g., index 8 or 9). For example, a combination of one of three interlace indexes (e.g., interlace indexes #0, #1, and #2) and one of the two CS indexes is indicated. Starting symbol index 8 or 9 is applied to the remaining 6 states.

D. For (RMSI value) index 1 of Table 10, a combination of one of the five interlace indexes and one of three CS indexes (i.e., 0, 4, and 8) is indicated. Starting symbol index 12 is applied. Therefore, 5*3=15 states are configured for PUCCH resources. The remaining one state is used to indicate one PUCCH resource based on other starting symbols (e.g., index 8 or 9). For example, a combination of one interlace index (e.g., interlace index #0) and one CS (e.g., #0) is indicated. Starting symbol index 8 or 9 is applied to the remaining one state.

Proposal 3) Cases in which four interlace indexes are used as in Option 3 will be described.

A. For (RMSI values) indexes 3, 5, and 7 of Table 10, a combination of one of the four interlace indexes and one of four CS indexes (i.e., 0, 3, 6, and 9) is indicated. OCC index #0 is applied. Therefore, 4*4=16 states are configured for PUCCH resources.

B. For (RMSI values) indexes 2, 4, and 6 of Table 10, a combination of one of the four interlace indexes, one of two CS indexes (i.e., 0 and 6), and one of two OCC indexes (e.g., 0 and 1) is indicated. Therefore, 4*2*2=16 states are configured for PUCCH resources.

C. For (RMSI value) index 0 of Table 10, a combination of one of the four interlace indexes, one of two CS indexes (i.e., 0 and 3), and one of two starting symbol indexes (e.g., 12 and 8 or 9) is indicated. Therefore, 4*2*2=16 states are configured for PUCCH resources.

D. For (RMSI value) index 1 of Table 10, a combination of one of the four interlace indexes and one of three CS indexes (i.e., 0, 4, and 8) is indicated. Starting symbol index 12 is applied. Therefore, 4*3=12 states are configured for PUCCH resources. The remaining four states are used to indicate one of four PUCCH resources based on other starting symbols (e.g., index 8 or 9). For example, a combination of one of the four interlace indexes and one CS (e.g., #0) is indicated. Starting symbol index 8 or 9 is applied to the remaining four states.

As another method, PUCCH resource sets based on combinations of Table 11 may be at least included in an RMSI signaling based PUCCH resource set table. When one of the combinations of Table 11 is configured through RMSI signaling, Method D or E of Proposal 1), Method of C or D of Proposal 2), and/or Method of C or D of Proposal 3) may be applied to indicate a specific PUCCH resource in a PUCCH resource set based on the combination.

TABLE 11

| PUCCH format | First symbol | Number of symbols | Set of initial CS indexes |
|---|---|---|---|
| 0 | 12 | 2 | {0, 3} |
| 0 | 12 | 2 | {0, 4, 8} |

As another method, PUCCH resource sets based on combinations of Table 12 may be at least included in an RMSI signaling based PUCCH resource set table. When one of the combinations of Table 12 is configured through RMSI signaling, Method A or C of Proposal 1), Method A or B of Proposal 2), and/or Method A or B of Proposal 3) may be applied to indicate a specific PUCCH resource in a PUCCH resource set based the combination.

TABLE 12

| PUCCH format | First symbol | Number of symbols | Set of initial CS indexes |
|---|---|---|---|
| 1 | 10 | 4 | {0, 6} |
| 1 | 10 | 4 | {0, 3, 6, 9} |

As another method, PUCCH resource sets based on combinations of Table 13 may be at least included in an RMSI signaling based PUCCH resource set table. When one of the combinations of Table 13 is configured through RMSI signaling, Method A or B of Proposal 1), Method A or B of Proposal 2), and/or Method A or B of Proposal 3) may be applied to indicate a specific PUCCH resource in a PUCCH resource set based the combination.

TABLE 13

| PUCCH format | First symbol | Number of symbols | Set of initial CS indexes |
|---|---|---|---|
| 1 | 4 | 10 | {0, 6} |
| 1 | 4 | 10 | {0, 3, 6, 9} |

As another method, PUCCH resource sets based on combinations of Table 14 may be at least included in an RMSI signaling based PUCCH resource set table. When one of the combinations of Table 14 is configured through RMSI signaling, Method A or B of Proposal 1), Method A or B of Proposal 2), and/or Method A or B of Proposal 3) may be applied to indicate a specific PUCCH resource in a PUCCH resource set based the combination.

TABLE 14

| PUCCH format | First symbol | Number of symbols | Set of initial CS indexes |
|---|---|---|---|
| 1 | 0 | 14 | {0, 6} |
| 1 | 0 | 14 | {0, 3, 6, 9} |

Next, according to Approach 2 described above, a 4-bit RMSI signaling based PUCCH resource set table to which cell-specific interlace (index) offsets are added may be defined as shown in Table 15. In NR-U, since a UL resource for transmission of PUCCH formats 0 and 1 is changed to one interlace consisting of multiple PRBs rather than one PRB, the 4-bit RMSI signaling based PUCCH resource set table may be configured by changing PRB offsets of the conventional system to interlace offsets. In Approach 2, since a PUCCH resource is indicated by a 3-bit PRI, a total of 8 states may be configured for PUCCH resources in one PUCCH resource set.

TABLE 15

| Index | PUCCH format | First symbol | Number of symbols | Cell-specific interlace offset | Set of initial CS indexes |
|---|---|---|---|---|---|
| 0 | 0 | 12 | 2 | 0 | {0, 3} |
| 1 | 0 | 12 | 2 | 2 | {0, 3} |
| 2 | 0 | 12 | 2 | 0 | {0, 4, 8} |
| 3 | 0 | 12 | 2 | 2 | {0, 4, 8} |
| 4 | 1 | 10 | 4 | 0 | {0, 6} |
| 5 | 1 | 10 | 4 | 2 | {0, 6} |
| 6 | 1 | 10 | 4 | 0 | {0, 3, 6 9} |
| 7 | 1 | 10 | 4 | 2 | {0, 3, 6 9} |
| 8 | 1 | 4 | 10 | 0 | {0, 6} |
| 9 | 1 | 4 | 10 | 2 | {0, 6} |
| 10 | 1 | 4 | 10 | 0 | {0, 3, 6 9} |
| 11 | 1 | 4 | 10 | 2 | {0, 3, 6 9} |
| 12 | 1 | 0 | 14 | 0 | {0, 6} |
| 13 | 1 | 0 | 14 | 2 | {0, 6} |
| 14 | 1 | 0 | 14 | 0 | {0, 3, 6 9} |
| 15 | 1 | 0 | 14 | 2 | {0, 3, 6 9} |

Based on Table 15, PUCCH resource sets may be configured according to Option 3 (where four interlace indexes are used) among Options 1 to 3 described above. In particular, an actual PUCCH interlace index to be used by the UE may be determined by the sum of a value indicated by a cell-specific interlace offset (or cell-specific interlace index offset) and a value indicated by an interlace index offset (or UE-specific interlace index offset) to be described in Proposal 4) or 5). For example, the UE-specific interlace index offset may be defined as 0 or 1. When the cell-specific interlace index offset is 0, if it is defined in Proposal 4) or Proposal 5) below that two interlace indexes (or two UE-specific interlace indexes) are used, the UE may use interlace indexes #0 and #1. For the use of interlace indexes #0 and #1, the UE-specific interlace index offset may be indicated as 0 or 1. When the cell-specific interlace index offset is 2, if it is defined in Proposal 4) or Proposal 5) that two interlace indexes (or two UE-specific interlace indexes) are used, the UE may use interlace indexes #2 and #3. For the use of interlace indexes #2 and #3, the UE-specific interlace index offset may be indicated as 0 or 1.

Proposal 4) Cases in which four interlace indexes are used as in Option 3 based on Table 15 will be described.

A. For (RMSI values) indexes 6, 7, 10, 11, 14, and 15 of Table 15, a combination of one of two interlace indexes (offset 0 or 1) and one of four CS indexes (i.e., 0, 3, 6, and 9) is indicated. OCC index #0 is applied. Therefore, 2*4=8 states are configured for PUCCH resources.

B. For (RMSI values) indexes 4, 5, 8, 9, 12, and 13 of Table 15, a combination of one of two interlace indexes (offset 0 or 1), one of two CS indexes (i.e., 0 and 6), and one of two OCC indexes (e.g., 0 and 1) is indicated. Therefore, 2*2*2=8 states are configured for PUCCH resources.

C. For (RMSI values) indexes 0 and 1 of Table 15, a combination of one of two interlace indexes (offset 0 or 1), one of two CS indexes (i.e., 0 and 3), and one of two starting symbol indexes (e.g., 12 and 8 or 9) is indicated. Therefore, 2*2*2=8 states are configured.

D. For (RMSI values) indexes 2 and 3 of Table 15, a combination of one of two interlace indexes (offset 0 or 1) and one of three CS indexes (i.e., 0, 4, and 8) is indicated. Starting symbol index 12 is applied. Therefore, 2*3=6 states are set configured for PUCCH resources. Since a total of 8 states need to be configured for the PUCCH resources, the remaining two states are used to indicate one of two PUCCH resources based on other starting symbols (e.g., index 8 or 9). For example, a combination of one of the two interlace indexes and one CS (e.g., #0) is indicated. Starting symbol index 8 or 9 may be applied to the remaining two states.

As an additional method, it may be considered that PUCCH resources are indicated by 3-bit PRI+1-bit CCE based on Table 15. Since PUCCH resources are indicated by a total of four bits, a total of 16 states may be configured for PUCCH resources in one PUCCH resource set. The 16 states may be configured as described in Proposal 5).

Proposal 5) Cases in which PUCCH resources are indicated by 3-bit PRI+1-bit CCE and four interlace indexes are used as in Option 3 will be described.

A. For (RMSI values) indexes 6, 7, 10, 11, 14, and 15 of Table 15, a combination of one of two interlace indexes (offset 0 or 1), one of four CS indexes (i.e., 0, 3, 6, and 9), and one of two OCC indexes (e.g., 0 and 1) is indicated. Therefore, 2*4*2=16 states are configured for PUCCH resources.

B. For (RMSI values) indexes 8, 9, 12, and 13 of Table 15, a combination of one of two interlace indexes (offset 0 or 1), one of two CS indexes (i.e., 0 and 6), and one of four OCC indexes (e.g., 0, 1, 2, and 3) is indicated. Therefore, 2*2*4=16 states are configured for PUCCH resources.

C. For (RMSI values) indexes 4 and 5 of Table 15, a combination of one of two interlace indexes (offset 0 or 1), one of the two CS indexes (i.e., 0 and 6), one of two OCC indexes (e.g., 0 and 1), and one of two starting symbols (e.g., indexes 10 and 4 or 5) is indicated. Therefore, 2*2*2*2=16 states are configured for PUCCH resources.

D. For (RMSI values) indexes 0 and 1 of Table 15, a combination of one of two interlace indexes (offset 0 or 1), one of two CS indexes (i.e., 0 and 3), and one of four starting symbol indexes (e.g., 12, 8 or 9, 4 or 6, and 0 or 3) is indicated. Therefore, 2*2*4=16 states are configured for PUCCH resources.

E. For (RMSI values) indexes 2 and 3 of Table 15, a combination of one of two interlace indexes (offset 0 or 1), one of three CS indexes (i.e., 0, 4, and 8) and one of two starting symbols (e.g., indexes 12 and 8 or 9) is indicated. Therefore, 2*3*2=12 states are configured for PUCCH resources. The remaining four states are used to indicate one of four PUCCH resources based on other starting symbols (e.g., index 4 or 6). For example, a combination of one of the two interlace indexes and one of two CS indexes (e.g., 0 and 4) is indicated.

As another method, PUCCH resource sets based on combinations of Table 16 may be at least included in an RMSI signaling based PUCCH resource set table. When one of the combinations of Table 16 is configured through RMSI signaling, Method C or D of Proposal 4) and/or Method D or E of Proposal 5) may be applied to indicate a specific PUCCH resource in a PUCCH resource set based the combination.

TABLE 16

| PUCCH format | First symbol | Number of symbols | Cell-specific interlace offset | Set of initial CS indexes |
| --- | --- | --- | --- | --- |
| 0 | 12 | 2 | 0 | {0, 3} |
| 0 | 12 | 2 | 2 | {0, 3} |
| 0 | 12 | 2 | 0 | {0, 4, 8} |
| 0 | 12 | 2 | 2 | {0, 4, 8} |

As another method, PUCCH resource sets based on combinations of Table 17 may be at least included in an RMSI signaling based PUCCH resource set table. When one of the combinations of Table 17 is configured through RMSI signaling, Method A or B of Proposal 4) and/or Method A or C of Proposal 5) may be applied to indicate a specific PUCCH resource in a PUCCH resource set based the combination.

TABLE 17

| PUCCH format | First symbol | Number of symbols | Cell-specific interlace offset | Set of initial CS indexes |
| --- | --- | --- | --- | --- |
| 1 | 10 | 4 | 0 | {0, 6} |
| 1 | 10 | 4 | 2 | {0, 6} |
| 1 | 10 | 4 | 0 | {0, 3, 6, 9} |
| 1 | 10 | 4 | 2 | {0, 3, 6, 9} |

As another method, PUCCH resource sets based on combinations of Table 18 may be at least included in an RMSI signaling based PUCCH resource set table. When one of the combinations of Table 18 is configured through RMSI signaling, Method A or B of Proposal 4) and/or Method A or B of Proposal 5) may be applied to indicate a specific PUCCH resource in a PUCCH resource set based the combination.

TABLE 18

| PUCCH format | First symbol | Number of symbols | Cell-specific interlace offset | Set of initial CS indexes |
| --- | --- | --- | --- | --- |
| 1 | 4 | 10 | 0 | {0, 6} |
| 1 | 4 | 10 | 2 | {0, 6} |
| 1 | 4 | 10 | 0 | {0, 3, 6, 9} |
| 1 | 4 | 10 | 2 | {0, 3, 6, 9} |

As another method, PUCCH resource sets based on combinations of Table 19 may be at least included in an RMSI signaling based PUCCH resource set table. When one of the combinations of Table 19 is configured through RMSI signaling, Method A or B of Proposal 4) and/or Method A or B of Proposal 5) may be applied to indicate a specific PUCCH resource in a PUCCH resource set based the combination.

TABLE 19

| PUCCH format | First symbol | Number of symbols | Cell-specific interlace offset | Set of initial CS indexes |
| --- | --- | --- | --- | --- |
| 1 | 0 | 14 | 0 | {0, 6} |
| 1 | 0 | 14 | 2 | {0, 6} |
| 1 | 0 | 14 | 0 | {0, 3, 6, 9} |
| 1 | 0 | 14 | 2 | {0, 3, 6, 9} |

Next, according to Approach 3 described above, a 4-bit RMSI signaling based PUCCH resource set table to which cell-specific interlace offsets (or cell-specific interlace index offsets) are added may be defined as shown in Table 20. In NR-U, since a UL resource for transmission of PUCCH formats 0 and 1 is changed to one interlace consisting of multiple PRBs rather than one PRB, the 4-bit RMSI signaling based PUCCH resource set table may be configured by changing PRB offsets of the conventional system to interlace offsets. In Approach 3, since a PUCCH resource is indicated by 3-bit PRI+1-bit CCE, a total of 16 states may be configured for PUCCH resources in one PUCCH resource set.

TABLE 20

| Index | PUCCH format | First symbol | Number of symbols | Cell-specific interlace offset | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 2 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 4 | 10 | 0 | {0, 6} |
| 7 | 1 | 4 | 10 | 0 | {0, 3, 6, 9} |
| 8 | 1 | 4 | 10 | 1 | {0, 3, 6, 9} |
| 9 | 1 | 4 | 10 | 2 | {0, 3, 6, 9} |
| 10 | 1 | 4 | 10 | 3 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 1 | {0, 3, 6, 9} |
| 14 | 1 | 0 | 14 | 2 | {0, 3, 6, 9} |
| 15 | 1 | 0 | 14 | 3 | {0, 3, 6, 9} |

Based on Table 20, PUCCH resource sets may be configured according to Option 3 (where four interlace indexes are used) among the proposed options. In particular, an actual PUCCH interlace index to be used by the UE may be determined by the sum of a value indicated by a cell-specific interlace offset (or cell-specific interlace index offset) and a value indicated by an interlace index offset (or UE-specific interlace index offset) to be described in Proposal 6). For example, the UE-specific interlace index offset may be defined as 0 or 1. When the cell-specific interlace index offset is 0, if it is defined in Proposal 6 below that two interlace indexes (or two UE-specific interlace indexes) are used, the UE may use interlace indexes #0 and #1. For the use of interlace indexes #0 and #1, the UE-specific interlace index offset may be indicated as 0 or 1. When the cell-specific interlace index offset is 2, if it is defined in Proposal 6) that two interlace indexes (or two UE-specific interlace indexes) are used, the UE may use interlace indexes #2 and #3. For the use of interlace indexes #2 and #3, the UE-specific interlace index offset may be indicated as 0 or 1.

Proposal 6) Cases in which four interlace indexes are used as in Option 3 based on Table 20 will be described.

A. For (RMSI values) indexes 7, 8, 9, 10, 12, 13, 14, and 15 of Table 20, a combination of one of four CS indexes (i.e., 0, 3, 6, and 9) and one of four OCC indexes (e.g., 0, 1, 2, and 3) is indicated. The PUCCH interlace index is determined by a cell-specific interlace offset. For example, when the cell-specific interlace offset is X, the final PUCCH interlace actually allocated to the UE is also an interlace with index X. Therefore, 4*4=16 states are configured for PUCCH resources.

B. For (RMSI values) indexes 4 and 5 of Table 20, a combination of one of two interlace indexes (offset 0 or 1), one of four CS indexes (i.e., 0, 3, 6, and 9), and one of two OCC indexes (e.g., 0 and 1) is indicated. Therefore, 2*4*2=16 states are configured for PUCCH resources. The offset value of 0 or 1 for indicating the two interlace indexes may be indicated by a UE-specific interlace offset.

C. For (RMSI value) index 3, 6, and 11 of Table 20, a combination of one of the four interlace indexes, one of two CS indexes (i.e., 0 and 6), and one of two OCC indexes (e.g., 0 and 1) is indicated. Therefore, 4*2*2=16 states are configured for PUCCH resources.

D. For (RMSI value) index 0 of Table 20, a combination of one of the four interlace indexes, one of two CS indexes (i.e., 0 and 3), and one of two starting symbol indexes (e.g., 12 and 8 or 9) is indicated. Therefore, 4*2*2=16 states are configured for PUCCH resources.

E. For (RMIS value) indexes 1 and 2 of Table 20, a combination of one of two interlace indexes (offset 0 or 1), one of three CS indexes (i.e., 0, 4, and 8), and one of two starting symbol indexes (e.g., 12 and 8 or 9) is indicated. Therefore, 2*3*2=12 states are configured for PUCCH resources. The remaining four states are used to indicate one of four PUCCH resources based on other starting symbols (e.g., index 4 or 6). For example, a combination of one of the two interlace indexes (offset 0 or 1) and one of two CS indexes (e.g., #0 and #4) is indicated. Starting symbol index 4 or 6 is applied to the remaining four states. As another example, a combination of three CS indexes may be indicated by one interlace index (e.g., offset 0), and only a specific CS index (e.g., #0) may be used by the other interlace index (e.g., offset 1).

As another method, PUCCH resource sets based on combinations of Table 21 may be at least included in an RMSI signaling based PUCCH resource set table. When one of the combinations of Table 21 is configured through RMSI signaling, Method D or E of Proposal 6) may be applied to indicate a specific PUCCH resource in a PUCCH resource set based the combination.

TABLE 22

| PUCCH format | First symbol | Number of symbols | Cell-specific interlace offset | Set of initial CS indexes |
|---|---|---|---|---|
| 1 | 10 | 4 | 0 | {0, 6} |
| 1 | 10 | 4 | 0 | {0, 3, 6, 9} |
| 1 | 10 | 4 | 2 | {0, 3, 6, 9} |

As another method, PUCCH resource sets based on combinations of Table 22 may be at least included in an RMSI signaling based PUCCH resource set table. When one of the combinations of Table 22 is configured through RMSI signaling, Method B or C of Proposal 6) may be applied to indicate a specific PUCCH resource in a PUCCH resource set based the combination.

TABLE 22

| PUCCH format | First symbol | Number of symbols | Cell-specific interlace offset | Set of initial CS indexes |
|---|---|---|---|---|
| 1 | 10 | 4 | 0 | {0, 6} |
| 1 | 10 | 4 | 0 | {0, 3, 6, 9} |
| 1 | 10 | 4 | 2 | {0, 3, 6, 9} |

As another method, PUCCH resource sets based on combinations of Table 23 may be at least included in an RMSI signaling based PUCCH resource set table. When one of the combinations of Table 23 is configured through RMSI signaling, Method A or C of Proposal 6) may be applied to indicate a specific PUCCH resource in a PUCCH resource set based the combination.

TABLE 23

| PUCCH format | First symbol | Number of symbols | Cell-specific interlace offset | Set of initial CS indexes |
|---|---|---|---|---|
| 1 | 4 | 10 | 0 | {0, 6} |
| 1 | 4 | 10 | 0 | {0, 3, 6, 9} |
| 1 | 4 | 10 | 1 | {0, 3, 6, 9} |
| 1 | 4 | 10 | 2 | {0, 3, 6, 9} |
| 1 | 4 | 10 | 3 | {0, 3, 6, 9} |

As another method, PUCCH resource sets based on combinations of Table 24 may be at least included in an RMSI signaling based PUCCH resource set table. When one of the combinations of Table 24 is configured through RMSI signaling, Method A or C of Proposal 6) may be applied to indicate a specific PUCCH resource in a PUCCH resource set based the combination.

TABLE 24

| PUCCH format | First symbol | Number of symbols | Cell-specific interlace offset | Set of initial CS indexes |
|---|---|---|---|---|
| 1 | 0 | 14 | 0 | {0, 6} |
| 1 | 0 | 14 | 0 | {0, 3, 6, 9} |
| 1 | 0 | 14 | 1 | {0, 3, 6, 9} |
| 1 | 0 | 14 | 2 | {0, 3, 6, 9} |
| 1 | 0 | 14 | 3 | {0, 3, 6, 9} |

Additionally, the following structure may be applied in consideration of 3-sector cell deployment. That is, a 4-bit RMSI signaling based PUCCH resource set table to which cell-specific interlace offsets (or cell-specific interlace index offsets) are added may be additionally defined as shown in Table 25. In NR-U, since a UL resource for transmission of PUCCH formats 0 and 1 is changed to one interlace consisting of multiple PRBs rather than one PRB, the 4-bit RMSI signaling based PUCCH resource set table may be configured by changing PRB offsets of the conventional system to interlace offsets. In addition, since a PUCCH resource is indicated by 3-bit PRI+1-bit CCE, a total of 16 states may be configured for PUCCH resources in one PUCCH resource set.

TABLE 25

| Index | PUCCH format | First symbol | Number of symbols | Cell-specific interlace offset | Set of initial CS indexes |
|---|---|---|---|---|---|
| 0 | 0 | 12 | 2 | 0 | {0, 3} |
| 1 | 0 | 12 | 2 | 2 | {0, 3} |
| 2 | 0 | 12 | 2 | 0 | {0, 4, 8} |
| 3 | 0 | 12 | 2 | 2 | {0, 4, 8} |
| 4 | 1 | 10 | 4 | 0 | {0, 6} |
| 5 | 1 | 10 | 4 | 0 | {0, 3, 6, 9} |
| 6 | 1 | 10 | 4 | 1 | {0, 3, 6, 9} |
| 7 | 1 | 10 | 4 | 2 | {0, 3, 6, 9} |
| 8 | 1 | 4 | 10 | 0 | {0, 6} |
| 9 | 1 | 4 | 10 | 0 | {0, 3, 6, 9} |
| 10 | 1 | 4 | 10 | 1 | {0, 3, 6, 9} |
| 11 | 1 | 4 | 10 | 2 | {0, 3, 6, 9} |
| 12 | 1 | 0 | 14 | 0 | {0, 6} |
| 13 | 1 | 0 | 14 | 0 | {0, 3, 6, 9} |
| 14 | 1 | 0 | 14 | 1 | {0, 3, 6, 9} |
| 15 | 1 | 0 | 14 | 2 | {0, 3, 6, 9} |

Based on Table 25, PUCCH resource sets may be configured according to Option 3 (where four interlace indexes are used) among the proposed options. In particular, an actual PUCCH interlace index to be used by the UE may be determined by the sum of a value indicated by a cell-specific interlace offset (or cell-specific interlace index offset) and a value indicated by an interlace index offset (or UE-specific interlace index offset) to be described in Proposal 7). For example, the UE-specific interlace index offset may be defined as 0 or 1. When the cell-specific interlace index offset is 0, if it is defined in Proposal 7) below that two interlace indexes (or two UE-specific interlace indexes) are used, the UE may use interlace indexes #0 and #1. For the use of interlace indexes #0 and #1, the UE-specific interlace index offset may be indicated as 0 or 1. When the cell-specific interlace index offset is 2, if it is defined in Proposal 7) that two interlace indexes (or two UE-specific interlace indexes) are used, the UE may use interlace indexes #2 and #3. For the use of interlace indexes #2 and #3, the UE-specific interlace index offset may be indicated as 0 or 1.

Proposal 7) Cases in which four interlace indexes are used as in Option 3 based on Table 25 will be described.

A. For (RMSI values) indexes 9, 10, 11, 13, 14, and 15 of Table 25, a combination of one of four CS indexes (i.e., 0, 3, 6, and 9) and one of four OCC indexes (e.g., 0, 1, 2, 3) is indicated. The PUCCH interlace index is determined by a cell-specific interlace offset. For example, when the cell-specific interlace offset is X, the final PUCCH interlace actually allocated to the UE is also an interlace with index X. Therefore, 4*4=16 states are configured for PUCCH resources.

B. For (RMSI values) indexes 5, 6, 7 of Table 25, a combination of one of four CS indexes (i.e., 0, 3, 6, and 9), one of two OCC indexes (i.e., 0 and 1), and one of two starting symbol indexes (e.g., 10 and 4 or 5) is indicated. The PUCCH interlace index is determined by a cell-specific interlace offset. For example, when the cell-specific interlace offset is X, the final PUCCH interlace actually allocated to the UE is also an interlace with index X. Therefore, 4*2*2=16 states are configured for PUCCH resources.

C. For (RMSI values) indexes 4, 8, and 12 of Table 25, a combination of one of the four interlace indexes, one of two CS indexes (i.e., 0 and 6), and one of two OCC indexes (e.g., 0 and 1) is indicated. Therefore, 4*2*2=16 states are configured for PUCCH resources.

D. For (RMSI value) indexes 0 and 1 of Table 25, a combination of one of two interlace indexes (offset 0 or 1), one of two CS indexes (i.e., 0 and 3), and one of four starting symbol indexes (e.g., 12, 8 or 9, 4 or 6, and 0, or 3) is indicated. Therefore, 2*2*4=16 states are configured for PUCCH resources. The offset value of 0 or 1 for indicating the two interlace indexes may be indicated by a UE-specific interlace offset.

E. For (RMSI value) indexes 2 and 3 of Table 25, a combination of one of two interlace indexes (offset 0 or 1), one of three CS indexes (i.e., 0, 4, and 8), and one of two starting symbol indexes (e.g., 12 and 8 or 9) is indicated. Therefore, 2*3*2=12 states are configured for PUCCH resources. The remaining four states are used to indicate one of four PUCCH resources based on other starting symbols (e.g., index 4 or 6). For example, a combination of one of the two interlace indexes (offset 0 or 1) and one of two CS indexes (e.g., #0, #4) is indicated. Starting symbol index 4 or 6 may be applied to the remaining four states. As another example, a combination of three CS indexes may be indicated by one interlace index (e.g., offset 0), and only a specific CS index (e.g., #0) may be used by the other interlace index (e.g., offset 1).

As another method, PUCCH resource sets based on combinations of Table 26 may be at least included in an RMSI signaling based PUCCH resource set table. When one of the combinations of Table 26 is configured through RMSI signaling, Method D or E of Proposal 7) may be applied to indicate a specific PUCCH resource in a PUCCH resource set based the combination.

TABLE 26

| PUCCH format | First symbol | Number of symbols | Cell-specific interlace offset | Set of initial CS indexes |
|---|---|---|---|---|
| 0 | 12 | 2 | 0 | {0, 3} |
| 0 | 12 | 2 | 2 | {0, 3} |
| 0 | 12 | 2 | 0 | {0, 4, 8} |
| 0 | 12 | 2 | 2 | {0, 4, 8} |

As another method, PUCCH resource sets based on combinations of Table 27 may be at least included in an RMSI signaling based PUCCH resource set table. When one of the combinations of Table 27 is configured through RMSI signaling, Method B or C of Proposal 7) may be applied to indicate a specific PUCCH resource in a PUCCH resource set based the combination.

TABLE 27

| PUCCH format | First symbol | Number of symbols | Cell-specific interlace offset | Set of initial CS indexes |
|---|---|---|---|---|
| 1 | 10 | 4 | 0 | {0, 6} |
| 1 | 10 | 4 | 0 | {0, 3, 6, 9} |
| 1 | 10 | 4 | 1 | {0, 3, 6, 9} |
| 1 | 10 | 4 | 2 | {0, 3, 6, 9} |

As another method, PUCCH resource sets based on combinations of Table 28 may be at least included in an RMSI signaling based PUCCH resource set table. When one of the combinations of Table 28 is configured through RMSI signaling, Method A or C of Proposal 7) may be applied to indicate a specific PUCCH resource in a PUCCH resource set based the combination.

TABLE 28

| PUCCH format | First symbol | Number of symbols | Cell-specific interlace offset | Set of initial CS indexes |
|---|---|---|---|---|
| 1 | 4 | 10 | 0 | {0, 6} |
| 1 | 4 | 10 | 0 | {0, 3, 6, 9} |
| 1 | 4 | 10 | 1 | {0, 3, 6, 9} |
| 1 | 4 | 10 | 2 | {0, 3, 6, 9} |

As another method, PUCCH resource sets based on combinations of Table 29 may be at least included in an RMSI signaling based PUCCH resource set table. When one of the combinations of Table 29 is configured through RMSI signaling, Method A or C of Proposal 7) may be applied to indicate a specific PUCCH resource in a PUCCH resource set based the combination.

TABLE 29

| PUCCH format | First symbol | Number of symbols | Cell-specific interlace offset | Set of initial CS indexes |
|---|---|---|---|---|
| 1 | 0 | 14 | 0 | {0, 6} |
| 1 | 0 | 14 | 0 | {0, 3, 6, 9} |
| 1 | 0 | 14 | 1 | {0, 3, 6, 9} |
| 1 | 0 | 14 | 2 | {0, 3, 6, 9} |

Additionally, the following structure may be applied in consideration of 3-sector cell deployment. That is, a 4-bit RMSI signaling based PUCCH resource set table to which cell-specific interlace offsets (or cell-specific interlace index offsets) are added may be additionally defined as shown in Table 30. In NR-U, since a UL resource for transmission of PUCCH formats 0 and 1 is changed to one interlace consisting of multiple PRBs rather than one PRB, the 4-bit RMSI signaling based PUCCH resource set table may be configured by changing PRB offsets of the conventional system to interlace offsets. In addition, since a PUCCH resource is indicated by 3-bit PRI+1-bit CCE, a total of 16 states may be configured for PUCCH resources in one PUCCH resource set.

TABLE 30

| Index | PUCCH format | First symbol | Number of symbols | Cell-specific interlace offset | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 1 | {0, 4, 8} |
| 3 | 0 | 12 | 2 | 2 | {0, 4, 8} |
| 4 | 1 | 10 | 4 | 0 | {0, 6} |
| 5 | 1 | 10 | 4 | 0 | {0, 3, 6, 9} |
| 6 | 1 | 10 | 4 | 1 | {0, 3, 6, 9} |
| 7 | 1 | 10 | 4 | 2 | {0, 3, 6, 9} |
| 8 | 1 | 4 | 10 | 0 | {0, 6} |
| 9 | 1 | 4 | 10 | 0 | {0, 3, 6, 9} |
| 10 | 1 | 4 | 10 | 1 | {0, 3, 6, 9} |
| 11 | 1 | 4 | 10 | 2 | {0, 3, 6, 9} |
| 12 | 1 | 0 | 14 | 0 | {0, 6} |
| 13 | 1 | 0 | 14 | 0 | {0, 3, 6, 9} |
| 14 | 1 | 0 | 14 | 1 | {0, 3, 6, 9} |
| 15 | 1 | 0 | 14 | 2 | {0, 3, 6, 9} |

Based on Table 30, PUCCH resource sets may be configured according to Option 3 (where four interlace indexes are used) among the proposed options. In particular, an actual PUCCH interlace index to be used by the UE may be determined by the sum of a value indicated by a cell-specific interlace offset (or cell-specific interlace index offset) and a value indicated by an interlace index offset (or UE-specific interlace index offset) to be described in Proposal 8). For example, the UE-specific interlace index offset may be defined as 0 or 1. When the cell-specific interlace index offset is 0, if it is defined in Proposal 8) below that two interlace indexes (or two UE-specific interlace indexes) are used, the UE may use interlace indexes #0 and #1. For the use of interlace indexes #0 and #1, the UE-specific interlace index offset may be indicated as 0 or 1. When the cell-specific interlace index offset is 2, if it is defined in Proposal 8) that two interlace indexes (or two UE-specific interlace indexes) are used, the UE may use interlace indexes #2 and #3. For the use of interlace indexes #2 and #3, the UE-specific interlace index offset may be indicated as 0 or 1.

Proposal 8) Cases in which four interlace indexes are used as in Option 3 based on Table 30 will be described.

A. For (RMSI value) indexes 9, 10, 11, 13, 14, and 15 of Table 30, a combination of one of four CS indexes (i.e., 0, 3, 6, and 9) and one of four OCC indexes (e.g., 0, 1, 2, and 3) is indicated. The PUCCH interlace index is determined by a cell-specific interlace offset. For example, when the cell-specific interlace offset is X, the final PUCCH interlace actually allocated to the UE is also an interlace with index X. Therefore, 4*4=16 states are configured for PUCCH resources.

B. For (RMSI value) index 5, 6, and 7 of Table 30, a combination of one of four CS indexes (i.e., 0, 3, 6, and 9), one of two OCC indexes (i.e., 0 and 1), and one of two symbol indexes (e.g., 10 and 4 or 5) is indicated. The PUCCH interlace index is determined by a cell-specific interlace offset. For example, when the cell-specific interlace offset is X, the final PUCCH interlace actually allocated to the UE is an interlace with index X. Therefore, 4*2*2=16 states are configured for PUCCH resources.

C. For (RMSI value) indexes 4, 8, and 12 of Table 30, a combination of one of the four interlace indexes, one of two CS indexes (i.e., 0 and 6), and one of two OCC indexes (e.g., 0 and 1) is indicated. Therefore, 4*2*2=16 states are configured for PUCCH resources.

D. For (RMSI value) index 0 of Table 30, a combination of one of the four interlace indexes, one of two CS indexes (i.e., 0 and 3), and one of two starting symbol indexes (e.g., 12 and 8 or 9) is indicated. Therefore, 4*2*2=16 states are configured for PUCCH resources.

E. For (RMSI value) indexes 1, 2, and 3 of Table 30, a combination of one of three CS indexes (i.e., 0, 4, and 8) and one of five starting symbol indexes (e.g., 12, 9, 6, 3, and 0) is indicated. The PUCCH interlace index is determined by a cell-specific interlace offset. For example, if the cell-specific interlace offset is X, the final PUCCH interlace actually allocated to the UE is also an interlace with index X. Therefore, 3*5=15 states are configured for PUCCH resources. The remaining one state is set as a reserved state.

As another method, PUCCH resource sets based on combinations of Table 31 may be at least included in an RMSI signaling based PUCCH resource set table. When one of the combinations of Table 31 is configured through RMSI signaling, Method D or E of Proposal 8) may be applied to indicate a specific PUCCH resource in a PUCCH resource set based the combination.

TABLE 31

| PUCCH format | First symbol | Number of symbols | Cell-specific interlace offset | Set of initial CS indexes |
| --- | --- | --- | --- | --- |
| 0 | 12 | 2 | 0 | {0, 3} |
| 0 | 12 | 2 | 0 | {0, 4, 8} |
| 0 | 12 | 2 | 1 | {0, 4, 8} |
| 0 | 12 | 2 | 2 | {0, 4, 8} |

As another method, PUCCH resource sets based on combinations of Table 32 may be at least included in an RMSI signaling based PUCCH resource set table. When one of the combinations of Table 32 is configured through RMSI signaling, Method B or C of Proposal 8) may be applied to indicate a specific PUCCH resource in a PUCCH resource set based the combination.

TABLE 32

| PUCCH format | First symbol | Number of symbols | Cell-specific interlace offset | Set of initial CS indexes |
| --- | --- | --- | --- | --- |
| 1 | 10 | 4 | 0 | {0, 6} |
| 1 | 10 | 4 | 0 | {0, 3, 6, 9} |
| 1 | 10 | 4 | 1 | {0, 3, 6, 9} |
| 1 | 10 | 4 | 2 | {0, 3, 6, 9} |

As another method, PUCCH resource sets based on combinations of Table 33 may be at least included in an RMSI signaling based PUCCH resource set table. When one of the combinations of Table 33 is configured through RMSI signaling, Method A or C of Proposal 8) may be applied to indicate a specific PUCCH resource in a PUCCH resource set based the combination.

TABLE 33

| PUCCH format | First symbol | Number of symbols | Cell-specific interlace offset | Set of initial CS indexes |
| --- | --- | --- | --- | --- |
| 1 | 4 | 10 | 0 | {0, 6} |
| 1 | 4 | 10 | 0 | {0, 3, 6, 9} |
| 1 | 4 | 10 | 1 | {0, 3, 6, 9} |
| 1 | 4 | 10 | 2 | {0, 3, 6, 9} |

As another method, PUCCH resource sets based on combinations of Table 34 may be at least included in an RMSI signaling based PUCCH resource set table. When one of the combinations of Table 34 is configured through RMSI signaling, Method A or C of Proposal 8) may be applied to indicate a specific PUCCH resource in a PUCCH resource set based the combination.

TABLE 34

| PUCCH format | First symbol | Number of symbols | Cell-specific interlace offset | Set of initial CS indexes |
| --- | --- | --- | --- | --- |
| 1 | 0 | 14 | 0 | {0, 6} |
| 1 | 0 | 14 | 0 | {0, 3, 6, 9} |
| 1 | 0 | 14 | 1 | {0, 3, 6, 9} |
| 1 | 0 | 14 | 2 | {0, 3, 6, 9} |

3.2. Embodiment 2

Embodiment 1 relates to methods of introducing a new interlace structure capable of satisfying the OCB requirements under specific circumstances.

Figure 14:
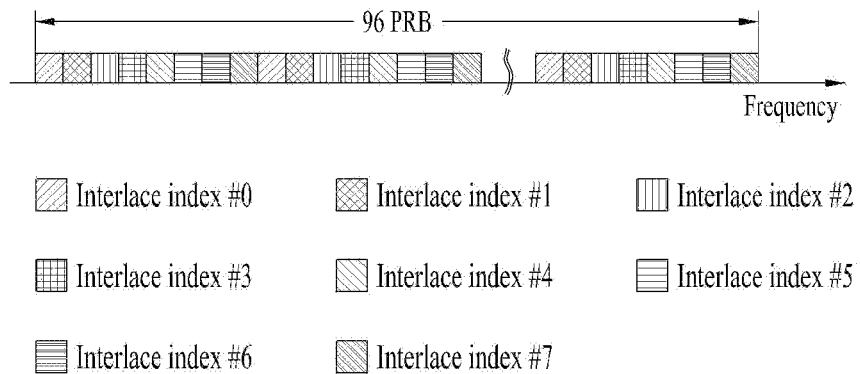

Specifically, Embodiment 2 relates to methods of introducing a new interlace structure suitable for an initial active UL BWP. For example, if the SCS of CORESET #0 is 30 kHz, the initial active UL BWP is set to 48 PRBs. Each interlace includes 12 PRBs. The interval between PRBs is determined as four PRBs (with respect to the PRB starting point). In this case, as shown in FIG. 14, each of the four interlaces (interlace indexes #0 to #3) consists of 12 PRBs. The frequency band occupied by each interlace is 45 (PRBs) *30 (SCS)*12 (subcarriers)=16200 kHz, thereby satisfying the OCB requirements.

Figure 15:
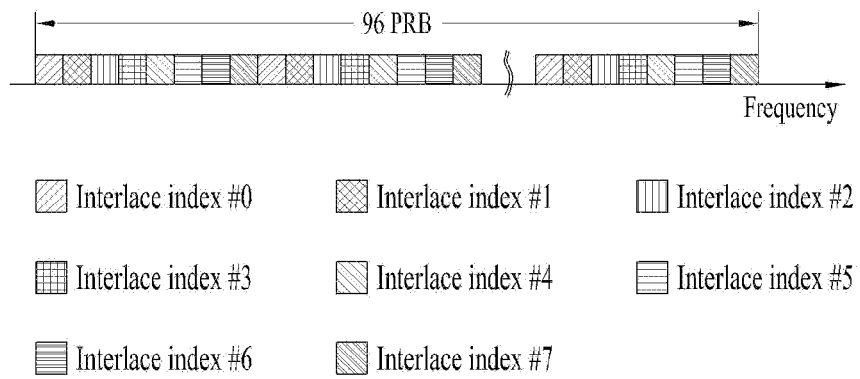

As another example, if the SCS of CORESET #0 is 15 kHz, the initial active UL BWP is set to 96 PRBs. Each interlace includes 12 PRBs. The interval between PRBs is determined as 8 PRBs (with respect to the PRB starting point). In this case, as shown in FIG. 15, each of the 8 interlaces (interlace indexes #0 to #7) consists of 12 PRBs. The frequency band occupied by each interlace is 89 (PRBs) *15 (SCS)*12 (subcarriers)=16020 kHz, thereby satisfying the OCB requirements.

In the above proposed methods, when the UE operates in the initial active UL BWP, the UE may be configured to use the proposed interlace structure where each interlace includes 12 RBs with an interval of four PRBs for the 30 kHz SCS or an interval of 8 PRBs for the 15 kHz SCS. The initial active UL BWP may include 48 PRBs for the 30 kHz SCS or 96 PRBs for the 15 kHz SCS. For example, the UE may be performing random access in the RRC-idle mode and/or RRC-connected mode. Additionally/alternatively, the UE may have established no RRC connection. Additionally/alternatively, the UE may have established no separate UE-specific UL BWP configuration. The interlace structure where each interlace consists of 12 RBs with an interval of four PRBs for the 30 kHz SCS or an interval of 8 PRBs for the 15 kHz SCS may be referred to as interlace type #1. For example, the UE may use the type #1 interlace structure for Msg3 PUSCH transmission and/or HARQ-ACK feedback transmission for Msg4 reception.

When the UE operates in another active UL BWP, the UE may be configured to use an interlace structure where each interlace includes 10 (or 11) RBs with an interval of five PRBs for the 30 kHz SCS or an interval of 10 PRBs for the 15 kHz SCS. The other active UL BWP may include 51 PRBs for the 30 kHz SCS or 106 PRBs for the 15 kHz SCS. For example, the UE may be performing random access in the RRC-idle mode and/or RRC-connected mode. Additionally/alternatively, the UE may have established no RRC connection. Additionally/alternatively, the UE may have established no separate UE-specific UL BWP configuration. The interlace structure where each interlace consists of 10 (or 11) RBs with an interval of five PRBs for the 30 kHz SCS or an interval of 10 PRBs for the 15 kHz SCS may be referred to as interlace type #2.

Additionally, the Msg3 transmission process may be performed not only by a UE performing initial access but also by a UE in the connected mode. Accordingly, there may be a situation where the UE needs to select one of the proposed interlace consisting of 12 RBs and the interlace consisting of 10 RBs. The situation in which the UE performs the above selection may be at least a contention free random access (CFRA) situation. The BS may indicate which one of interlace type #1 where each interlace consists of 12 RBs and interlace type #2 where each interlace consists of 10 RBs the UE needs to use through a UL grant indicating PUSCH (e.g., Msg3) transmission.

Embodiments 1 and 2 proposed above may be applied to the following three cases.
 a. Transmission in initial active UL BWP corresponding to CORESET (#0) configured by PBCH/SIB
 b. Transmission in initial active UL BWP corresponding to CORESET (#0) configured by RRC signaling other than PBCH/SIB
 c. Transmission in any active UL BWP established by RRC signaling

3.3. Embodiment 3

Embodiment 3 proposes new interlace structures available in other situations.

NR U-band operation in a channel bandwidth (BW) of 10 MHz is considered for the future. Accordingly, it is necessary to consider interlace structures available in the 10 MHz channel BW. According to Table 7, when the SCS is 30 kHz, the 10 MHz channel BW includes 24 PRBs. When the SCS is 15 kHz, the 10 MHz channel BW includes 52 PRBs. Hereinafter, the new interlace structures available in such a situation will be described.

(1) For 30 kHz SCS,
 A. A structure in which each interlace consists of 12 PRBs and the interval between PRBs is two PRBs (with respect to the starting point) is proposed. The total number of interlace indexes is 2. The frequency band occupied by each interlace is 23 (PRBs)*30 (SCS)*12 (subcarriers)=8280 kHz, which exceeds 80% of 10 MHz, thereby satisfying the OCB requirements.
 B. A structure in which each interlace consists of 8 PRBs and the interval between PRBs is three PRBs (with respect to the starting point) is proposed. The total number of interlace indexes is 3. The frequency band occupied by each interlace is 22 (PRBs)*30 (SCS)*12 (subcarriers)=7920 kHz.

(2) For 15 kHz SCS,
 A. A structure in which each interlace consists of 10 (or 11) PRBs and the interval between PRBs is five PRBs (with respect to the starting point) is proposed. The total number of interlace indexes is 5. The frequency band occupied by each interlace is 46 (PRBs)*15 (SCS)*12 (subcarriers)= 8280 kHz, which exceeds 80% of 10 MHz, thereby satisfying the OCB requirements.

When the SCS is 60 kHz, a BW of 20 MHz consists of 24 PRBs. Thus, proposed method (1) of Embodiment 3 may be equally applied.

4. Embodiment 4 (Indication for Type of UL Signal/Channel Transmission)

There are largely two types of UL channels and/or signals supported in NR-U (or a shared spectrum). One of the two types is a channel and/or signal based on a (PRB-level) contiguous mapping method available in an area that does not need to satisfy power spectral density (PSD) and occupied channel bandwidth (OCB) requirements (i.e., used in legacy Rel-15 NR). The other type is a channel and/or signal based on an interlaced mapping method available in an area that should satisfy PSD and OCB requirements. The interlaced mapping method may also be referred to as a wideband long sequence and/or frequency-domain (F-domain) repetition mapping method. Characteristically, when a BS is installed in one of the two areas and supports NR-U operations, it may be preferable to use an initially configured UL channel and/or signal mapping method as it is. Accordingly, the following indication methods are proposed.

[Method 4-1] Method of explicitly indicating all UL signal and/or channel mapping methods supported in a corresponding cell by 1 bit.

For example, a 1-bit parameter indicating a UL signal and/or channel mapping type may be added to higher-layer signaling (e.g., SIB1 or RMSI). When the value of the bit is 0, (PRB-level) contiguous mapping as used in the legacy Rel-15 NR system is adopted as the UL signal and/or channel mapping type of a corresponding cell. When the value of the bit is 1, interlaced (or wideband long sequence or F-domain repetition) mapping is adopted as the UL signal and/or channel mapping type of the corresponding cell. A UE transmits a UL signal and/or channel by using the indicated type according to the bit value, for communication with the corresponding cell. The UE may not expect that the indicated mapping type will be changed while the UE is connected to the cell.

[Method 4-2] Method of implicitly indicating a method of mapping the remaining UL signals and/or channels except for a PRACH (for an initial access procedure) among UL signals and/or channels supported in a corresponding cell by a PRACH sequence type.

For example, when PRACH preamble-related broadcast information transmitted by higher-layer signaling (e.g., SIB1 or RMSI) indicates a PRACH preamble used in the legacy Rel-15 NR system (e.g., in the case of a sequence length of 139), (PRB-level) contiguous mapping as used in the legacy Rel-15 NR system is adopted as the UL signal and/or channel mapping type of a corresponding cell. When the PRACH preamble-related broadcast information indicates a newly introduced PRACH preamble, interlaced mapping is adopted as the UL signal and/or channel mapping type of the corresponding cell. The newly introduced PRACH preamble may be, for example, a PRACH preamble with a sequence length (e.g., 571 or 1151) much larger than 139, a PRACH preamble repeated in the frequency domain, and/or a PRACH preamble with a repetition number of 2 or larger in the frequency domain.

[Method 4-3] Method of implicitly indicating a method of mapping the remaining UL signals and/or channels except for a PUCCH and/or a PUSCH among UL signals and/or channels supported by a corresponding channel by a PUCCH and/or PUSCH mapping type.

When PUCCH and/or PUSCH-related information transmitted by higher-layer signaling (e.g., SIB1 or RMSI) indicates (contiguous) PUCCH and/or PUSCH resource mapping used in the legacy Rel-15 NR system, (PRB-level) contiguous mapping (e.g., Rel-15 NR PRACH/PUSCH/PUCCH) as used in the legacy Rel-15 NR system is adopted as the UL signal and/or channel mapping type of a corresponding cell. For example, the PRACH is a single 139-length sequence mapped to 12 PRBs. When the PUCCH and/or PUSCH-related information indicates newly introduced interlaced mapping, the interlaced mapping is adopted as the UL signal and/or channel mapping type of the corresponding cell. For example, a wideband long sequence with a length larger than 139 may be used for the PRACH. Alternatively, for the PRACH, a plurality of 139-length sequences may be repeated in the frequency domain.

In the above methods, the BS may intentionally indicate additional information to change the UL signal and/or channel mapping type. However, once the BS starts an NR-U operation, the need to change the UL signal and/or channel mapping type is unlikely to occur unless there is a specific reason. Therefore, the UE may expect that the information will not be changed from an initially indicated value.

Additionally, the following options may be considered in relation to a UL resource mapping type and LBT sub-band configuration and/or definition.

In this specification, when it is said that a DCI format is transmitted, this may mean that DCI is transmitted in the format.

4-1-1) Temporal 2 MHz Occupied Channel Bandwidth (OCB) Requirement

Opt 4-1-1-1) When interlaced mapping is configured by an SIB or RRC signaling, contiguous mapping of at least a 2-MHz BW may be allowed and/or indicated at a specific time point (dynamically by DCI). In addition, in an area that needs to satisfy OCB requirements, the contiguous mapping of at least a 2-MHz BW may be allowed and/or indicated at a specific time point (dynamically by DCI).

When contiguous mapping is configured by an SIB or RRC signaling, contiguous mapping may be allowed and/or indicated without a constraint on a minimum BW. Further, in an area that needs to satisfy OCB requirements, contiguous mapping may be allowed and/or indicated without a constraint on a minimum BW.

Opt 4-1-1-2) When contiguous mapping is configured by an SIB or RRC signaling, it may be configured whether there is a constraint on a minimum BW (e.g., 2 MHz). In an area that does not need to satisfy OCB requirements, it may be configured whether there is a constraint on a minimum BW (e.g., 2 MHz).

When interlaced mapping is configured by an SIB or RRC signaling, the operation described in Opt 4-1-1-1 may be applied or contiguous mapping (including the minimum 2 MHz BW constraint) may not be allowed. In addition, in an area that needs to satisfy OCB requirements, the operation described in Opt 4-1-1-1 may be applied or contiguous mapping (including the minimum 2 MHz BW constraint) may not be allowed.

4-1-2) UL Resource Allocation Switching

Opt 4-1-2-1) When interlaced mapping is configured by an SIB or RRC signaling, dynamic switching between interlaced mapping and contiguous mapping may be allowed and/or indicated (by DCI). In addition, in an area that needs to satisfy OCB requirements, dynamic switching between interlaced mapping and contiguous mapping may be allowed and/or indicated (by DCI).

When contiguous mapping is configured by an SIB or RRC signaling, only contiguous mapping without dynamic switching with interlaced mapping may be allowed and/or indicated. In addition, in an area that does not need to satisfy OCB requirements, only contiguous mapping without dynamic switching with interlaced mapping may be allowed and/or indicated.

When interlaced mapping is configured by an SIB or RRC signaling, it may be configured later or at the same time whether to support only interlaced mapping or support dynamic switching. In addition, in an area that needs to satisfy OCB requirements, it may be configured whether to support only interlaced mapping or support dynamic switching.

Even when dynamic switching is configured, only interlaced mapping may be allowed and/or indicated exceptionally for a UL fallback DCI format. The UL fallback DCI format may be any DCI format or a DCI format based on a PDCCH common search space (CSS).

4-1-3) Default LBT Sub-Band

Opt 4-1-3-1) When a specific BWP includes a plurality of LBT sub-bands, a UL fallback DCI format corresponding to the BWP may schedule only a PUSCH in a specific single LBT sub-band. The UL fallback DCI format may be any DCI format or a DCI format based on a PDCCH CSS.

The single LBT sub-band may be set to an LBT sub-band having a lowest index. The LBT sub-band having the lowest index may be replaced with an LBT sub-band in a lowest frequency and/or an LBT sub-band having a lowest index in RRC. Alternatively, the single LBT sub-band may be set to an LBT sub-band for which UL fallback DCI is used by the RRC.

Opt 4-1-3-2) When a specific BWP includes a plurality of LBT sub-bands, a UL fallback DCI format corresponding to the BWP may schedule only a PUSCH over a specific LBT sub-band set or only a PUSCH within a specific single LBT sub-band. The UL fallback DCI format may be any DCI format or a DCI format based on a PDCCH CSS.

The LBT sub-band set or the single LBT sub-band may be set to an LBT sub-band set configured with a PDCCH search space (e.g., CSS) set in the UL fallback DCI format or carrying the UL fallback DCI format, or configured with a CORESET associated with the search space, or a specific single LBT sub-band in the LBT sub-band set. The specific single LBT sub-band may be set to an LBT sub-band having a lowest index among the plurality of LBT sub-bands included in the specific BWP. The LBT sub-band having the lowest index may be replaced with an LBT sub-band in a lowest frequency and/or an LBT sub-band having a lowest index in RRC. An LBT sub-band may be referred to as an RB set in that the LBT sub-band includes a plurality of RBs.

Opt 4-1-3-3) When a specific BWP includes a plurality of LBT sub-bands, a UL fallback DCI format corresponding to the BWP may schedule only a PUSCH in a specific single one of the plurality of LBT sub-bands. The UL fallback DCI format may be any DCI format or a DCI format based on a PDCCH CSS.

The single LBT sub-band in which a PUSCH is to be scheduled may be set to a specific single UL LBT sub-band among UL LBT sub-bands (or UL RB sets corresponding to the UL LBT sub-bands) overlapping in frequency with a DL LBT sub-band (or a DL RB set corresponding to the DL LBT sub-band) mapped to and/or configured with a PDCCH candidate (e.g., CCE) in which the UL fallback DCI format is transmitted and/or detected. The specific single LBT sub-band may be an LBT sub-band having a lowest index among the UL LBT sub-bands overlapping in frequency with the DL LBT subband in which the CCE is located. The LBT sub-band having the lowest index may be replaced with an LBT sub-band in a lowest frequency and/or an LBT sub-band having a lowest index in RRC.

Characteristically, CCE aggregation levels (ALs) for two PDCCH candidates, PDCCH candidate #1 and PDCCH candidate #2 available for transmission of the UL fallback DCI format may be set to X and Y, respectively. Y=2X where X=8 or 16, for example. When X ones of a total of Y CCEs in PDCCH #2 (e.g., X CCEs with starting indexes or lowest indexes) overlap with the total X CCEs of PDCCH candidate #1 (i.e., the same CCEs are overlapped), even though the UL fallback DCI format is detected and/or received in PDCCH candidate #1, the UE may assume and/or consider that the UL fallback DCI format is transmitted in PDCCH candidate #2. Subsequently, the UE may determine the DL LBT sub-band and the UL LBT sub-band overlapping with the DL LBT sub-band.

In the absence of a UL LBT sub-band overlapping with the DL LBT sub-band mapped to and/or configured with the CCE, the specific single LBT sub-band may be set to a specific single UL LBT sub-band in the BWP. The specific single UL LBT sub-band may be an LBT sub-band having a lowest index in the BWP. The LBT sub-band having the lowest index may be replaced with an LBT sub-band in a lowest frequency and/or an LBT sub-band having a lowest index in RRC.

In another method, the single LBT sub-band may be set to a specific single UL LBT sub-band among UL LBT sub-bands (or UL RB sets) overlapping in frequency with a DL LBT sub-band configured with a PDCCH search space (e.g., CSS) in which the UL fallback DCI format is transmitted and/or detected, or configured with a CORESET associated with the search space. The specific single LBT sub-band may be a UL LBT sub-band having a lowest index. The LBT sub-band having the lowest index may be replaced with an LBT sub-band in a lowest frequency and/or an LBT sub-band having a lowest index in RRC.

In the absence of any UL LBT sub-band overlapping with the DL LBT sub-band, the single LBT sub-band may be set to a specific single UL LBT in the BWP. The specific single LBT sub-band may be an LBT sub-band having a lowest index. The LBT sub-band having the lowest index may be replaced with an LBT sub-band in a lowest frequency and/or an LBT sub-band having a lowest index in RRC.

Additionally, a method of determining an RB set for transmitting a Msg. 3 PUSCH scheduled by an RAR grant in a Msg. 2 PDSCH and/or a method of determining an RB for retransmitting a Msg. 3 PUSCH scheduled by a TC-RNTI-based PDCCH may be defined/configured as follows. The Msg. 2 PDSCH may be scheduled by an RA-RNTI-based PDCCH transmitted in a CSS. The TC-RNTI-based PDCCH may be transmitted in a CSS and/or a fallback DCI format may be used for the TC-RNTI-based PDCCH.

4-2-1) Method of determining an RB set for transmitting a PUSCH scheduled by an RAR grant and/or a method of determining an RB set for transmitting a PUSCH scheduled by a TC-RNTI-based PDCCH.

4-2-1-A. When an active BWP includes an initial BWP, an RB set corresponding to the initial BWP in the active BWP is determined for PUSCH scheduling.

4-2-1-B. In the case where the active BWP does not include the initial BWP, when there is UL RB set(s) in the active BWP, which overlaps in frequency with DL RB set(s) in which an RA-RNTI-based PDCCH and/or an RAR PDSCH and/or a TC-RNTI-based PDCCH is transmitted/received, the UL RB set(s) is determined for PUSCH scheduling. In the case of a plurality of UL RB sets, a UL RB set with a lowest index among the UL RB sets may be determined for PUSCH scheduling. The DL RB set(s) in which the PDCCH is transmitted/received may be determined by applying the methods proposed in '4-1-3) Default LBT sub-band'.

In the absence of any UL RB set in the active BWP, which overlaps in frequency with the DL RB set(s) in which the RA-RNTI-based PDCCH and/or the RAR PDSCH and/or the TC-RNTI-based PDCCH is transmitted/received, a UL RB set with a lowest index in the active BWP is determined for PUSCH scheduling.

When a definition and/or a configuration is made in Embodiment 4, a method of determining an RB set for transmitting a PUSCH scheduled by a PDCCH based on a C-RNTI, a CS-RNTI, and/or an MCS-RNTI may be defined and/or configured as follows. The C-RNTI-based, CS-RNTI-based, and/or MCS-RNTI-based PDCCH may be transmitted in a fallback DCI format.

4-3-1) Method of determining an RB set for transmitting a PUSCH scheduled by a C-RNTI-based, CS-RNTI-based, and/or MCS-RNTI-based PDCCH transmitted in a CSS (hereinafter, 'C-RNTI, CS-RNTI, and/or MCS-RNTI' may be collectively referred to as 'C-RNTI').

4-3-1-A. In the presence of UL RB set(s) in the active BWP, which overlaps in frequency with DL RB set(s) in which a C-RNTI-based PDCCH is transmitted/received, the UL RB set(s) is determined for PUSCH scheduling. In the case of a plurality of corresponding UL RB sets, a UL RB set with a lowest index among the UL RB sets may be determined for PUSCH scheduling. The DL RB set(s) in which the PDCCH is transmitted/received may be determined by applying the methods proposed in '4-1-3) Default LBT sub-band'.

4-3-1-B. In the absence of any UL RB set in the active BWP, which overlaps in frequency with DL RB set(s) in which a C-RNTI-based PDCCH is transmitted/received, a UL RB set having a lowest index in the active BWP may be determined for PUCH scheduling.

Additionally, a method of determining an RB set for transmitting a Msg. 3 PUSCH scheduled by an RAR grant in a Msg. 2 PDSCH and a configuration for an RAR UL grant FDRA (Frequency Domain Resource Assignment) field may be defined/configured as follows. The Msg. 2 PDSCH may be scheduled by an RA-RNTI-based PDCCH transmitted in a CSS.

4-4-1) Configuration of FDRA field in RAR UL grant 4-4-1-A. When UL resource allocation type 2 is allocated, the FDRA field may be configured to include an X-bit part that schedules (or indicates) an interlace index and a Y-bit part that schedules (or indicates) an RB set according to one of the following options. UL resource allocation type 2 may be an interlaced PUSCH/PUCCH transmission scheme.

Opt 4-4-1-A-1) In an L-bit FDRA field, X+Y MSB bits may be used for resource allocation, and the remaining L-X-Y LSB bits may be zero-padded. L may be the total number of bits for operation with shared spectrum channel access. Specifically, X bits may be filled in the MSB part, followed by Y bits, and then the remaining LSB part is zero-padded.

Opt 4-4-1-A-2) In the L-bit FDRA field, Y+X LSB bits may be used for resource allocation, and the remaining L-Y-X MSB bits may be zero-padded. That is, X bits may be filled in the LSB part at the end, preceded by Y bits, and the remaining MSB part before the Y bits is zero-padded.

4-4-2) Method of determining an RB set for transmitting a Msg. 3 PUSCH scheduled by an RAR grant, when an FDRA field is configured as described in 4-1-1.

4-4-2-A. When the active BWP includes the initial BWP, it is defined and/or configured that the UE does not need to interpret the Y-bit part of the FDRA field. A UL RB set corresponding to the initial BWP in the active BWP is determined for Msg. 3 PUSCH scheduling.

4-4-2-B. When the active BWP does not include the initial BWP, the UE interprets the Y-bit part of the FDRA field, selects a UL RB set indicated by the Y-bit part, and determines the selected UL RB set for Msg. 3 PUSCH scheduling.

Alt 4-4-2-B-1) An RB set index indicated by the Y-bit part may be set based on an RB set index configured in an active BWP of each UE. The size of the Y bits and the RB set index are UE-specifically configured based on the active BWP.

When an active BWP of a specific UE is constructed and/or configured with one UL RB set, the UE interprets the Y-bit part of the FDRA field as zero bits. In other words, the UE ignores the value of the Y-bit part or interprets the Y-bit part as absent. The UE, which interprets the Y-bit part of the FDRA field as zero bits, always determines the one UL RB set for Msg. 3 PUSCH scheduling.

Alt 4-4-2-B-2) Further, the RB set index indicated by the Y-bit part may be configured based on total RB sets configured in an entire carrier (and/or (serving) cell). In other words, the size of the Y bits and the RB set index are configured UE-commonly (i.e., cell-specifically) based on the entre carrier.

Alt 4-4-2-B-2-1) When an RB set indicated by Y bits is not included in RB sets configured based on an entire carrier in an active BWP of a specific UE, a UL RB set with a lowest index in the active BWP is determined for Msg. 3 PUSCH scheduling.

Alt 4-4-2-B-2-2) When an RB set indicated by Y bits is not included in RB sets configured based on an entire carrier in an active BWP of a specific UE, an RAR and/or an RAR UL grant may be ignored, and a Msg. 3 PUSCH transmission may be skipped. In other words, the Msg. 3 PUSCH may be dropped.

Additionally, a method of determining an RB set for transmitting a PUSCH scheduled by a C-RNTI-based, CS-RNTI-based, and/or MCS-RNTI-based PDCCH transmitted in a CSS may be defined and/or configured as follows. The C-RNTI-based, CS-RNTI-based, and/or MCS-RNTI-based PDCCH may be transmitted in a fallback DCI format.

Alt 4-5-1: An RB set for PUSCH transmission may be determined to be UL RB set(s) intersecting with the lowest-indexed CCE of a PDCCH in which CSS DCI is detected/received, or a UL RB set with a lowest index among the UL RB sets.

Alt 4-5-2: An RB set for PUSCH transmission may be determined to be a UL RB set intersecting with the lowest-indexed PRB, lowest-indexed REG, and/or an REG with the lowest-indexed PRB of a PDCCH in which CSS DCI is detected/received.

When a part intersecting with the lowest-indexed PRB, the lowest-indexed REG, and/or the REG with the lowest-indexed PRB is an inter-RB set guard band in a UL BWP, an RB set for PUSCH transmission may be determined to be a highest RB set index including PRB indexes lower than that of the guard band or a lowest RB set index including PRB indexes higher than that of the guard band.

Alt 4-5-3: An RB set for PUSCH transmission may be determined to be a UL RB set intersecting with the lowest-indexed PRB, lowest-indexed REG, and/or an REG with the lowest-indexed PRB of a PDCCH in which CSS DCI is detected/received. A CORESET configured with the DCI transmission (or any CORESET) in a DL BWP may be configured not to overlap with an inter-RB set guard band in a UL (and/or DL) BWP.

5. Embodiment 5 (Method of Configuring Interlace Indexes in UL Interlace Structure)

Figure 16:
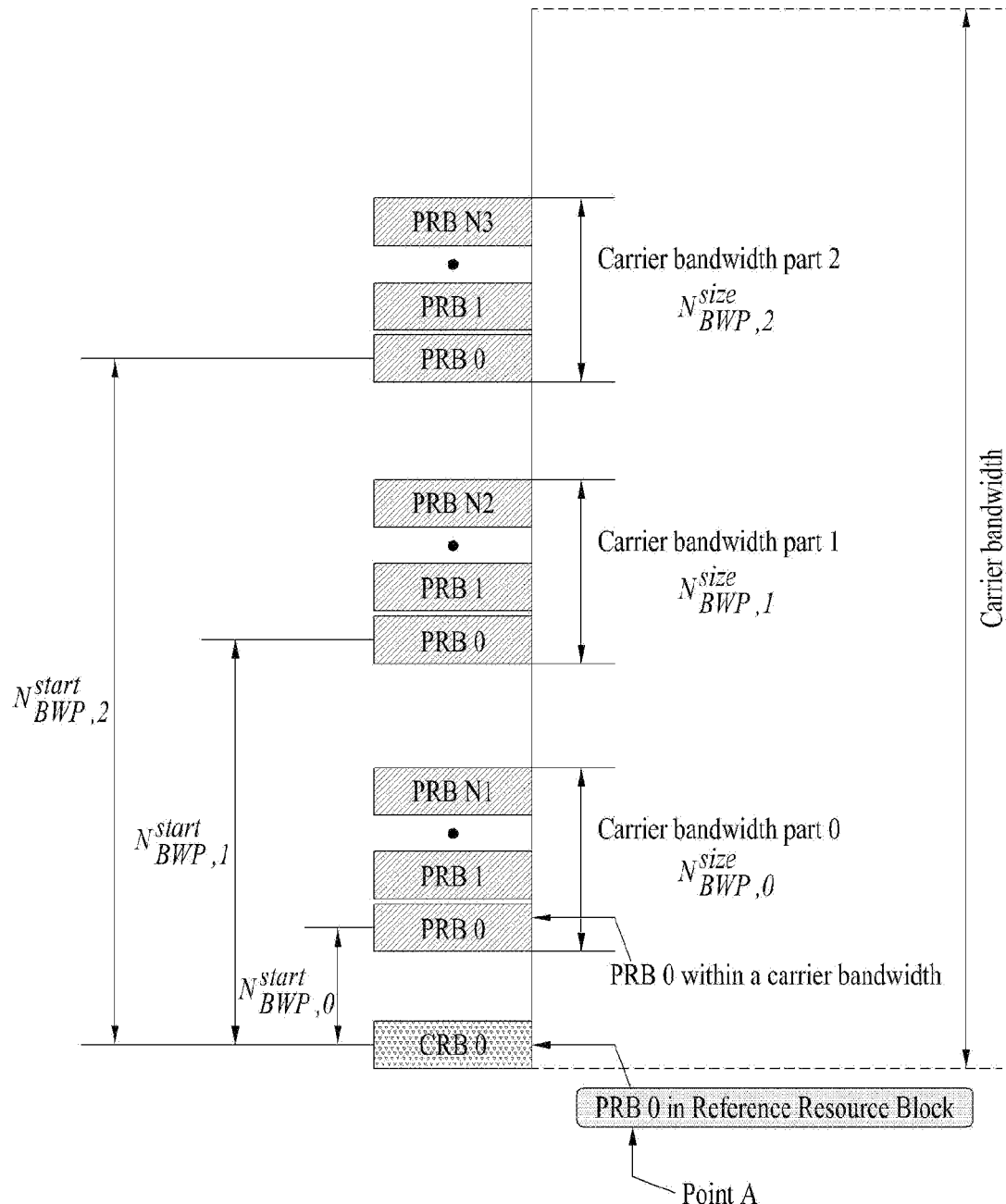

In the legacy NR system, point A may be set, and a carrier bandwidth may start at a point spaced apart from point A by an indicated value. The point at which the carrier bandwidth starts is defined as CRB0. A BWP may start at a point spaced apart from CRB0 by an indicated value. When one value is indicated, one BWP is configured. When a plurality of values are indicated, a plurality of BWPs are configured. The starting point of each BWP is defined as PRB0. This is illustrated in FIG. 16.

In the NR-U system, the concept of LBT (Listen before talk) sub-band is added to the legacy NR system. One or more LBT sub-bands may be defined in each BWP. When a UL interlace structure is configured in an LBT sub-band and each interlace is indexed, interlace indexes may be configured based on CRB (or PRB) indexes. For example, a set of non-contiguous RBs spaced apart from each other at an equal interval of a specific number of (e.g., N) RBs, starting from a point apart from CRB (PRB) index 0 by the specific number of RBs may be defined as interlace index 0. In this manner, a set of non-contiguous RBs spaced apart from each other at an equal interval of N RBs, starting from a point apart from CRB (PRB) index k by N RBs may be defined as interlace index k.

An interlace index including the first PRB of each BWP and/or each LBT sub-band (in a specific BWP) may not be set based on a CRB (or PRB) index. This is because interlace index(es) to be used for a UL transmission may be indicated with ambiguity by a ULRA field. For example, for a specific SCS (e.g., 15 kHz), the BS may indicate UL transmission resources in a resource indication value (RIV) scheme. Because the RIV scheme is a resource allocation method based on the assumption that a lowest resource index is mapped to a lowest frequency position in a given frequency band, the RIV scheme may not efficiently allocate interlace indexes (e.g., multiple contiguous interlace indexes) in a situation where an interlace index different from the lowest interlace index is mapped to the lowest frequency position in a given BWP or LBT sub-band.

Therefore, the following method is proposed to solve the problem. The UE may identify a starting interlace index $Interlace_{start}$ and an interlace length $L_{Interlaces}$ from an RIV indicated by the BS. An interlace index including the first PRB in an LBT sub-band allocated to the UE may be K. The interlace length is the number of contiguous interlaces.

UL interlace resources that the UE will actually transmit may be $L_{Interlaces}$ contiguous interlace indexes from an interlace index corresponding to a value obtained by performing a modulo operation between a value calculated by adding K to $Interlace_{start}$ and an interval M between PRBs in one interlace. M may be 10 for a 15-kHz SCS and 5 for a 30-kHz SCS. The starting interlace index for the actual transmission is given by (Interlacestart+K) mod M.

Alternatively, the UE may identify the starting interlace index Interlace$_{start}$ and the interlace length L$_{Interlaces}$ from an RIV indicated by the BS. An interlace index set indicated by a combination of {Interlace$_{start}$, L$_{Interlaces}$} may be calculated. The UE may set an interlace index including the first PRB of an allocated LBT sub-band to K.

UL interlace resources that the UE will actually transmit may be determined to be frequency resources corresponding to an interlace index set corresponding to the result of performing a modulo operation between a value calculated by adding K to each of indicated interlace indexes and M.

Figure 17:
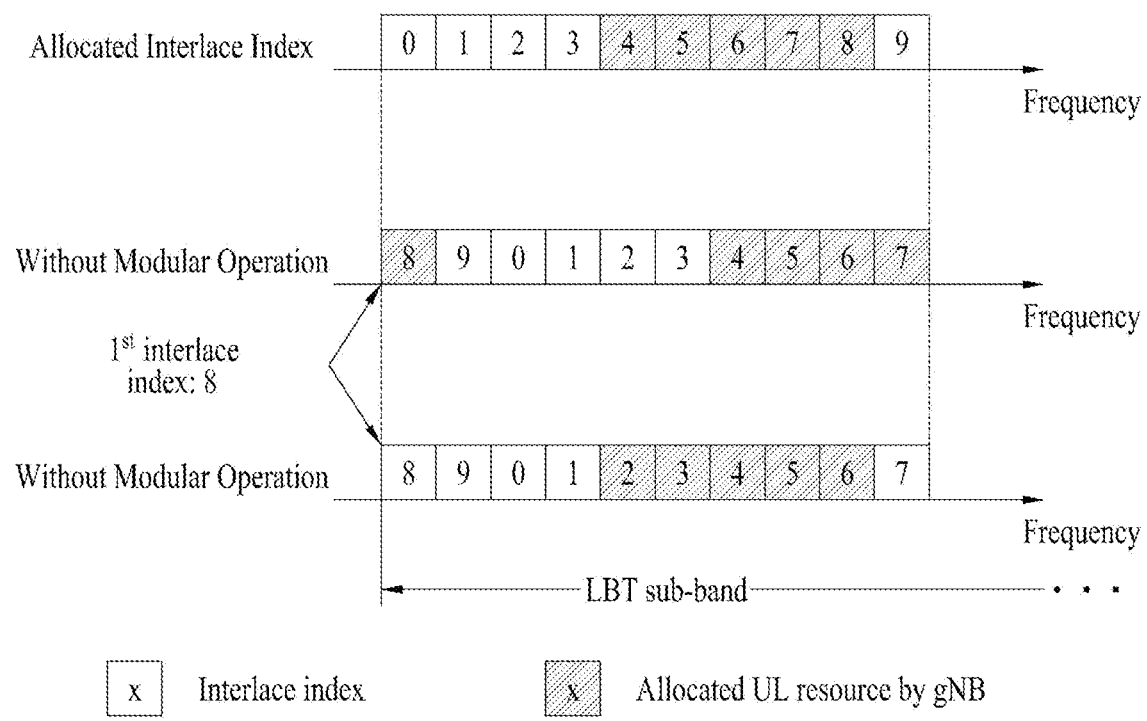

In a specific example, it may be assumed that for the 15-kHz SCS, the UE identifies interlace index 4 and an interlace length of 5 from an RIV indicated by the BS, and an interlace index including the first PRB in an LBT sub-band allocated to the UE is 8. In this case, UL interlace resources for a transmission of the UE may be resources corresponding to 5 contiguous interlace indexes from index 2(=(4+8) mod 10). The 5 contiguous interlace indexes including interlace index 2 may be {2, 3, 4, 5, 6}. This is illustrated in FIG. 17.

Further, the method may be used in a similar manner, even when the BS allocates resources by indicating each interlace index (e.g., by signaling in the form of a special RIV or a bitmap). First, resource allocation information from the BS may indicate N interlace indexes to the UE. The N interlace indexes may be Interlace$_0$, Interlace$_1$, . . . , Interlace$_n$, . . . , Interlace$_{N-1}$. An interlace index including the first PRB in an LBT sub-band allocated to the UE may be referred to as K.

In this case, the UL interlace resources for the transmission of the UE may be resources corresponding to interlace indexes corresponding to the result of performing a modulo operation between a value Interlace$_n$+K calculated by adding K to each interlace index Interlace$_n$ and the interval M between PRBs in one interlace. M may be 10 for the 15-kHz SCS and 5 for the 30-kHz SCS. The interlace indexes of actual transmission resources for the UE are given by (Interlace$_n$+K) mod M, (n=0, . . . , N−1).

Figure 18:
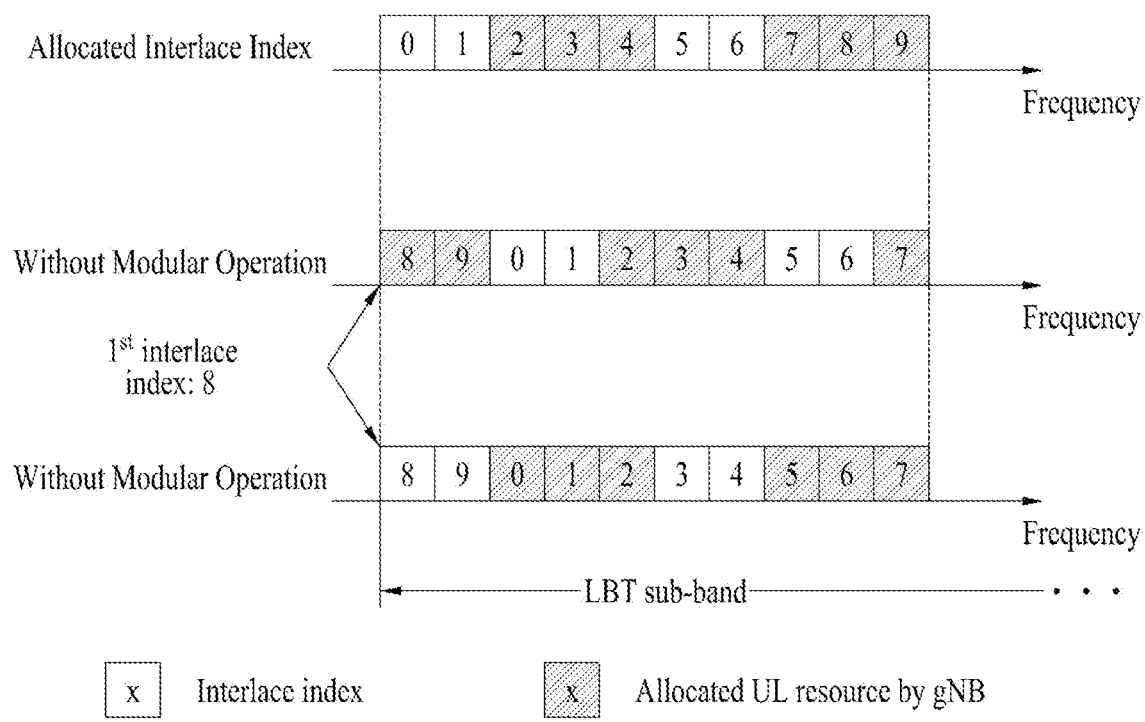

In a specific example, it may be assumed that for the 15-kHz SCS, the UE identifies {2, 3, 4, 7, 8, 9} as interlace indexes (i.e., Interlace$_n$) according to resource allocation information (e.g., a specific RIV or bitmap) indicated by the BS, and an interlace index including the first PRB in an LBT sub-band allocated to the UE is 8. In this case, the UL interlace index resources for the transmission of the UE may be resources corresponding to (2+8) mod 10=0, (3+8) mod 10=1, (4+8) mod 10=2, (7+8) mod 10=5, (8+8) mod 10=6, and (9+8) mod 10=7. A total of 6 contiguous interlace indexes including interlace index 0 may be {0, 1, 2, 5, 6, 7}. This is illustrated in FIG. 18.

Additionally, the following method may be considered together with the above proposed method.

The CRB index of the first PRB in a given RB set may be defined as N$_{RB\ set,j}^{start}$. UL interlace resources for a transmission of the UE may be L$_{Interlaces}$ contiguous interlace indexes from an interlace index corresponding to the result of performing a modulo operation between a value Interlace$_{start}$+N$_{RB\ set,j}^{start}$, calculated by adding N$_{RB\ set,j}^{start}$, to Interlace$_{start}$ and an interval M between PRBs in one interlace. M may be 10 for the 15-kHz SCS and 5 for the 30-kHz SCS. The starting interlace index for the actual transmission is given by (Interlace$_{start}$+N$_{RB\ set,j}^{start}$) mod M. Resources corresponding to L$_{Interlaces}$ interlace indexes from (Interlace$_{start}$+N$_{RB\ set,j}^{start}$) mod M are the UL interlace indexes used for the actual transmission of the UE.

Alternatively, the UE may identify Interlace$_{start}$ and L$_{Interlaces}$ from an RIV indicated by the BS. An indicated interlace index set may be calculated from a combination of {Interlace$_{start}$, L$_{Interlaces}$}. The CRB index of the first PRB of a given RB set may be defined as N$_{RB\ set,j}^{start}$.

In this case, the UL interlace resources for the actual transmission of the UE may be resources corresponding to a set of interlace indexes derived by performing a modulo operation between a value calculated by adding N$_{RB\ set,j}^{start}$ to each interlace index in the indicated interlace index set and M. M may be 10 for the 15-kHz SCS and 5 for the 30-kHz SCS.

Additionally, even when non-contiguous interlace indexes are configured by a bitmap or the like, the UL interlace resources for the actual transmission of the UE may be resources corresponding to interlace indexes corresponding to the result of performing a modulo operation between a value Interlace$_n$+Na$_{RB\ set,j}^{start}$ calculated by adding the CRB index of the first PRB of a given RB set N$_{RB\ set,j}^{start}$ to each interlace index Interlace, and the interval M between PRBs in one interlace. The interlace indexes used for the actual transmission of the UE are given by (Interlace$_n$+N$_{RB\ set,j}^{start}$) mod M, (n=0, . . . , N−1). M may be 10 for the 15-kHz SCS and 5 for the 30-kHz SCS.

Additionally, because the UE may be allocated one or more (contiguous or non-contiguous) LBT sub-bands, the methods proposed in Embodiment 5 may be used regardless of the number of LBT sub-bands allocated to the UE by applying the following proposed methods.

Proposed method 5-1-1: When the UE is allocated one or more (contiguous or non-contiguous) LBT sub-bands by the BS, an interlace index set X to be used actually is determined by configuring/applying the proposed methods of Embodiment 5 based on the interlace index configuration of an LBT sub-band located in the lowest frequency band (or having the lowest LBT sub-band index) among the allocated LBT sub-bands. Then, the same interlace index set as the set X in each allocated LBT sub-band may be determined to be actual UL transmission resources.

In the presence of a plurality of contiguous LBT sub-bands, an interlace index existing in a guard band between LBT sub-bands may also be used as UL resources. Accordingly, Method 5-1-1 may be preferably used based on the first interlace index of the LBT sub-band located in the lowest frequency band.

Proposed method 5-1-2: An interlace index set X to be actually used is determined by configuring/applying the proposed methods of Embodiment 5 based on the interlace index configuration of an LBT sub-band located in the lowest frequency band (or having the lowest LBT sub-band index) in a BWP including (one or more) LBT sub-bands allocated to the UE by the BS. Subsequently, the same interlace index set as the set X in each of the LBT sub-bands allocated to the UE may be determined as actual UL transmission resources.

Proposed method 5-1-2 may be preferable in that the same value is always used in a BWP including a specific LBT sub-band. Resources may not be allocated as intended by the BS in an LBT sub-band actually allocated to the UE.

Proposed method 5-1-2-A: An interlace index set X to be actually used is determined by configuring/applying the proposed methods of Embodiment 5 based on the interlace index configuration of an LBT sub-band located in the lowest frequency band (or having the lowest LBT sub-band index in a BWP) or the interlace index configuration of an LBT sub-band located in the lowest frequency band (or having the lowest LBT sub-band index in the BWP) among all LBT sub-bands belonging to a serving cell of the UE in a carrier bandwidth including a BWP including (one or more) LBT sub-bands allocated to the UE by the BS. Subsequently, the same interlace index set as the set X in each of the LBT sub-bands allocated to the UE may be determined as actual UL transmission resources.

Proposed method 5-1-3: When the UE is allocated a plurality of (contiguous or non-contiguous) LBT sub-bands by the BS, an interlace index set to be used as actual UL transmission resources may be determined by configuring/applying each of the proposed methods of Embodiment 5 based on the interlace index configuration of each LBT sub-band on an LBT sub-band basis.

When the UE is allocated a plurality of non-contiguous LBT sub-bands, it may be defined that an intra-carrier guard band between LBT sub-bands is not used. Accordingly, it is preferable to apply each of the proposed methods of Embodiment 5 based on the first interlace index of each LBT sub-band.

Proposed method 5-1-4: When the UE is allocated a plurality of contiguous LBT sub-bands by the BS, proposed 5-1-1 (or 5-1-2) may be applied, whereas when the UE is allocated a plurality of non-contiguous LBT sub-bands by the BS, proposed 5-1-3 (or 5-1-2) may be applied.

As described above, when the UE is allocated non-contiguous LBT sub-bands, it may be preferable to apply each of the proposed methods of Embodiment 5 based on the first interlace index of each LBT sub-band. When the UE is allocated contiguous LBT sub-bands, it is preferable to apply the proposed methods of Embodiment 5 based on the first interlace index of an LBT sub-band located in the lowest frequency band (among the allocated LBT sub-bands or among all LBT sub-bands in a BWP including the corresponding LBT sub-band).

Proposed method 5-1-5: When the UE is allocated a plurality of (contiguous or non-contiguous) LBT sub-bands by the BS, proposed 5-1-1 or proposed method 5-1-2 may be applied to the plurality of contiguous LBT sub-bands in the total allocated LBT sub-band set. Proposed 5-1-3 (or 5-1-2) may be applied for each of the non-contiguous LBT sub-bands (or a single LBT sub-band) allocated to the UE.

For example, when LBT sub-bands #0 and #1 and LBT sub-bands #3 and #4 in a BWP including a total of 5 LBT sub-bands are allocated to the UE, interlace indexing is applied to LBT sub-bands #0 and #1 based on the first interlace index of LBT sub-band #0 located in the lower frequency band between LBT sub-bands #0 and #1. Further, interlace indexing is applied to LBT sub-bands #3 and #4 based on the first interlace index of LBT sub-band #3 located in the lower frequency band between LBT sub-bands #3 and #4.

When the BS allocates resources by indicating each interlace index through signaling in the form of a bitmap, a method such as proposed method 5-1-1 to proposed method 5-1-5 (e.g., the methods of adding a starting interlace index and then applying a modulo operation) may not be applied. For example, with interlaces having the same index mapped to each bit index of the bitmap, each interlace index may be directly indicated.

Additionally, the proposed method may be applied to an initial PUCCH resource set in a similar manner. An initial PUCCH resource set in NR-U may be defined as illustrated in Table 35.

TABLE 35

| Index | PUCCH format | First symbol | Number of symbols | Starting Interlace Index Offset | Set of initial CS indexes | Comment | Available Resources |
|---|---|---|---|---|---|---|---|
| 0 | 0 | 12, 9 | 2 | 0 | {0, 3} | Add $2^{nd}$ resource in TD | 16 |
| 1 | 0 | 12, 9 | 2 | 0 | {0, 4, 8} | Add $2^{nd}$ resource in TD | 16 |
| 2 | 0 | 12, 9 | 2 | 3 | {0, 4, 8} | Add $2^{nd}$ resource in TD | 16 |
| 3 | 1 | 10 | 4 | 0 | {0, 6} | Add $2^{nd}$ OCC | 16 |
| 4 | 1 | 10 | 4 | 0 | {0, 3, 6, 9} | | 16 |
| 5 | 1 | 10 | 4 | 2 | {0, 3, 6, 9} | | 16 |
| 6 | 1 | 10 | 4 | 4 | {0, 3, 6, 9} | | 16 |
| 7 | 1 | 4 | 10 | 0 | {0, 6} | Add $2^{nd}$ OCC | 16 |
| 8 | 1 | 4 | 10 | 0 | {0, 3, 6, 9} | | 16 |
| 9 | 1 | 4 | 10 | 2 | {0, 3, 6, 9} | | 16 |
| 10 | 1 | 4 | 10 | 4 | {0, 3, 6, 9} | | 16 |
| 11 | 1 | 0 | 14 | 0 | {0, 6} | Add $2^{nd}$ OCC | 16 |
| 12 | 1 | 0 | 14 | 0 | {0, 3, 6, 9} | | 16 |
| 13 | 1 | 0 | 14 | 2 | {0, 3, 6, 9} | | 16 |
| 14 | 1 | 0 | 14 | 4 | {0, 3, 6, 9} | | 16 |
| 15 | 1 | 0 | 14 | $\lfloor N_{BWP}^{size}/4 \rfloor$ | {0, 3, 6, 9} | | N/A |

N interlace indexes available in configuring initial PUCCH resources may be sequentially defined as $Interlace_0$, $Interlace_1, \ldots, Interlace_n, \ldots, Interlace_{N-1}$. (Each interlace index is a value reflecting a starting interlace offset).

Further, an interlace index including the first PRB of an LBT sub-band allocated to the UE may be defined as K. UL interlace resources that the UE will use to configure PUCCH resources may be resources corresponding to interlace indexes derived by performing a modulo operation between a value $Interlace_n+K$ calculated by adding K to each interlace index $Interlace_n$ and an interval M between PRBs in one interlace. The UL interlace resources that the UE will use to configure the PUCCH resources are given by $(Interlace_n+K)$ mod M, (n=0, ..., N−1). M may be 10 for the 15-kHz SCS and 5 for the 30-kHz SCS.

In a specific example, for the 30-kHz SCS, the order of interlace indexes (i.e., $Interlace_n$) available for configuring the PUCCH resources, which the UE has identified based on resource allocation information (e.g., an initial PUCCH resource set index) indicated by the BS, may be {2, 3, 4, 0, 1}. It may be assumed that interlace index K including the first PRB of an LBT sub-band allocated to the UE is 3. The order of interlace indexes available for PUCCH configuration of the UE may be given as (2+3) mod 5=0, (3+3) mod 5=1, (4+3) mod 5=2, (0+3) mod 5=3, and (1+3) mod 5=4. That is, the UE may configure PUCCH resources in the order of interlace indexes 1, 2, 3, and 4, starting from interlace index 0.

Additionally, the BS may indicate the number of PRBs to be occupied by an initial active UL BWP to the UE by an SIB. When the number of PRBs is not indicated, the number of PRBs to be occupied by the initial active UL BWP may be 48 for 30 kHz and 96 for 15 kHz because the number of PRBs to be occupied by the initial active UL BWP is equal to that of an initial active DL BWP. When the BS indicates the number of PRBs to be occupied by the initial active UL BWP as 50 or larger for the 30-kHz SCS (or 100 or larger for the 15-kHz SCS), the UE may configure PUCCH resources and/or a PUCCH resource set according to a method/order defined in the conventional system because all interlaces (or interlace indexes) satisfy OCB requirements.

When the BS indicates the number of PRBs to be occupied by the initial active UL BWP as less than 50 for the 30-kHz SCS (or less than 100 for the 15-kHz SCS (or the BS does not separately indicate the number of PRBs to be occupied by the initial active UL BWP), an additional UE operation needs to be defined because there is an interlace (or interlace index) that does not satisfy OCB requirements. When the number of PRBs to be occupied by the initial active UL BWP is 50-x for the 30-kHz SCS (or 100-x for the 15-kHz SCS) (x>0), x interlaces (or interlace indexes) do not satisfy OCB requirements. Accordingly, it may be preferable to exclude the x interlaces (or interlace indexes) in configuring a PUCCH resource set. When there are a total of N interlace indexes and the index of an interlace including the first PRB of an LBT sub-band allocated to the UE is K, the UE may exclude interlaces corresponding to the last x indexes among interlace indexes derived by {K, K+1, ..., K+N−1} mod M (first of all). In other words, interlaces corresponding to the first (N−x) ones of the interlace indexes derived by {K, K+1, ..., K+N−1} mod M may be used (first).

In a specific example, on the assumption that the BS indicates the number of PRBs to be occupied by the initial active UL BWP as 48 (i.e., x=2) for the 30-kHz SCS to the UE by an SIB, and the index K of an interlace including the first PRB of an LBT sub-band allocated to the UE is 2 (K=2), the UE may use interlace indexes {2, 3, 4}, excluding interlace indexes {0, 1} among interlace indexes {2, 3, 4, 0, 1} in configuring a PUCCH resource set. For example, when index 1 of Table 35 is indicated to the UE, the UE may configure 16 PUCCH resources in the following order (i.e., CS index first, interlace index second, starting symbol last).

Resource 1-1) Starting symbol 12, interlace index 2, CS index 0

Resource 1-2) Starting symbol 12, interlace index 2, CS index 4

Resource 1-3) Starting symbol 12, interlace index 2, CS index 8

Resource 1-4) Starting symbol 12, interlace index 3, CS index 0

Resource 1-5) Starting symbol 12, interlace index 3, CS index 4

Resource 1-6) Starting symbol 12, interlace index 3, CS index 8

Resource 1-7) Starting symbol 12, interlace index 4, CS index 0

Resource 1-8) Starting symbol 12, interlace index 4, CS index 4

Resource 1-9) Starting symbol 12, interlace index 4, CS index 8

Resource 1-10) Starting symbol 9, interlace index 2, CS index 0

Resource 1-11) Starting symbol 9, interlace index 2, CS index 4

Resource 1-12) Starting symbol 9, interlace index 2, CS index 8

Resource 1-13) Starting symbol 9, interlace index 3, CS index 0

Resource 1-14) Starting symbol 9, interlace index 3, CS index 4

Resource 1-15) Starting symbol 9, interlace index 3, CS index 8

Resource 1-16) Starting symbol 9, interlace index 4, CS index 0

In another example, on the assumption that the BS indicates that the number of PRBs to be occupied by the initial active UL BWP is 48 (i.e., x=2) for the 30-kHz SCS by an SIB as in the foregoing example, and the index K of an interlace including the first PRB of an LBT sub-band allocated to the UE is 2 (K=2), the UE may use interlace indexes {2, 3, 4}, excluding interlace indexes {0, 1} among interlace indexes {2, 3, 4, 0, 1} in configuring a PUCCH resource set. Then, when index 11 of Table 35 is indicated to the UE, the UE may configure PUCCH resources in the following order (i.e., CS index first, interlace index second, OCC index last). When an interlace index that does not satisfy OCB requirements is completely excluded from the PUCCH resources, the number of PUCCH resources does not reach 16.

Resource 2-1) OCC index 0, interlace index 2, CS index 0

Resource 2-2) OCC index 0, interlace index 2, CS index 6

Resource 2-3) OCC index 0, interlace index 3, CS index 0

Resource 2-4) OCC index 0, interlace index 3, CS index 6

Resource 2-5) OCC index 0, interlace index 4, CS index 0

Resource 2-6) OCC index 0, interlace index 4, CS index 6

Resource 2-7) OCC index 1, interlace index 2, CS index 0

Resource 2-8) OCC index 1, interlace index 2, CS index 6

Resource 2-9) OCC index 1, interlace index 3, CS index 0

Resource 2-10) OCC index 1, interlace index 3, CS index 6

Resource 2-11) OCC index 1, interlace index 4, CS index 0

Resource 2-12) OCC index 1, interlace index 4, CS index 6

Resource 2-13) . . .
Resource 2-14) . . .
Resource 2-15) . . .
Resource 2-16) . . .

When 16 PUCCH resources are not configured due to interlace indexes that do not satisfy OCB requirements like Resource 2-13) to Resource 2-16), the following methods may be applied.

Method 5-2-1: Method of configuring as many PUCCH resources as possible in defined resources according to a defined method, and when the number of the configured resources is less than 16, generating no more PUCCH resources by a UE.

Despite the benefit of obviating the need for an additional UE operation, Method 5-2-1 reduces the number of PUCCH resources.

Method 5-2-2: Method of configuring as many PUCCH resources as possible in defined resources according to a defined method, and when the number of the configured resources is less than 16, returning to initial resources and additionally configuring PUCCH resources (in overlapped resources) by a UE.

Although the number of PUCCH resources may be matched, Method 5-2-2 may cause the problem of overlap between different PUCCH resources.

Method 5-2-3: Method of configuring as many PUCCH resources as possible in defined resources according to a defined method, and when the number of the configured resources is less than 16, configuring the remaining PUCCH resources according to the defined method by additionally using interlace indexes that do not satisfy OCB requirements by a UE.

The UE configures as many PUCCH resources as possible by first placing interlace indexes satisfying the OCB requirements and configures the remaining PUCCH resources with interlace indexes that do not satisfy the OCB requirements. According to Method 5-2-3, although there may be PUCCH resources that do not satisfy the OCB requirements, the problem of overlap between different PICCH resources may be solved.

In the proposed methods of Embodiment 5, let the number of contiguous interlace indexes among interlace indexes corresponding to UL resources to be transmitted by the UE be denoted by L. Then, it may be preferable that a UL transmission is performed by grouping L contiguous PRBs into a PRB group, for the PAPR/CM performance of the UE. Use of a PRB group including contiguous PRBs fewer than L together with a PRB group including L PRBs in the transmission may degrade the PAPR/CM performance.

Figure 19:
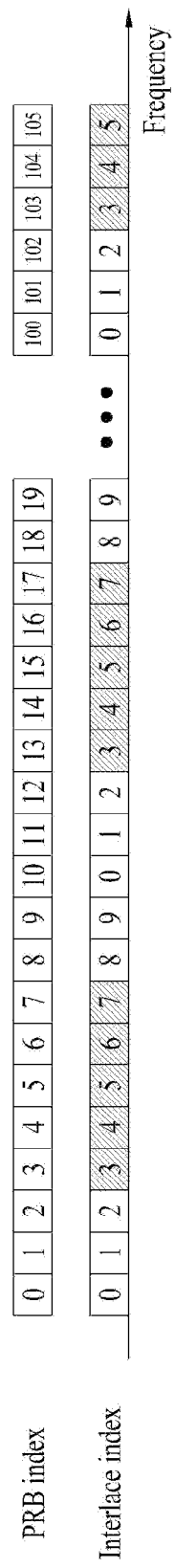

For example, it is assumed that for the 15-kHz SCS, the number of PRBs corresponding to a specific LBT sub-band is 106 (PRB index 0 to PRB index 105) and the first interlace index of the specific LBT sub-band is 0. It is also assumed that the BS allocates 5 contiguous interlaces starting from interlace index 3 to the UE. Then, UL resources available for an actual transmission of the UE are illustrated in FIG. 19.

Referring to FIG. 10, it may be noted that first 5 contiguous PRBs occur 10 times repeatedly and 3 contiguous PRBs occur at the 11$^{th}$ time. When the UE performs a UL transmission in UL resources configured as illustrated in FIG. 10, the UE may experience degradation of the PAPR/CM performance.

Accordingly, to avert this problem, the UE may puncture or rate-match PRB groups each including PRBs fewer than L not to use them in the transmission, except for PRB groups each including L contiguous PRBs among allocated UL resources. Because L is 5 in the example of FIG. 10, the UE may not use the 11th PRB group including PRBs fewer than 5 (i.e., the PRB group including 3 PRBs) in the transmission. For L=1, there is no PRB group including PRBs fewer than 1, and thus the method of not using a specific PRB group may not be applied. Further, while the method is always applicable regardless of waveforms, the method may also be applied only in the case of transmission of an DFT-s-OFDM waveform.

The proposed methods of Embodiment 5 are also applicable, when interlaces are indexed based on CRB0. Further, the proposed methods of Embodiment 5 are also applicable, when interlaces are indexed based on the starting point of each BWP, PRB0. The reason for reconfiguring interlace indexes based on the starting point of each BWP, PRB0 is that in the presence of a plurality of BWPs, an interlace index including PRB0 in each BWP may be defined differently and thus the UE needs to perform the above operation individually for each BWP. To eliminate the burden on the UE, interlaces may be re-indexed such that interlace index 0 starts in PRB0 in each BWP.

Additionally, when a DFT-s-OFDM waveform transmission is configured for a PUSCH transmission, the UE transmits a PUSCH in an interlace structure existing over one or more LBT sub-bands, and the number of PRBs included in the interlace existing over one or more LBT sub-bands is not a size (i.e., a multiple of 2 and/or 3 and/or 5) available for DFT, the UE may not determine the number of PRBs based on which DFT is to be performed, in the DFT-s-OFDM PUSCH transmission. To solve this problem, the following methods are proposed.

Proposed method 5-3-1: When the BS instructs the UE to use a DFT-s-OFDM waveform in a PUSCH transmission, the UE may be configured not to use resources existing in an intra-carrier guard band between a plurality of contiguous LBT sub-bands.

For example, N−1 (e.g., 2) intra-carrier guard bands may exist among N (e.g., N=3) contiguous LBT sub-bands, and PRBs included in the guard bands are also available for the PUSCH transmission. However, when the UE is instructed to use the DFT-s-OFDM waveform in the PUSCH transmission, the UE may be defined/configured not to transmit the PUSCH in the PRBs existing in the intra-carrier guard bands.

Further, it may be configured that among the interlaces of each LBT sub-band, only 10 PRBs of an interlace including 11 PRBs except for the lowest (or highest) one PRB are used in the PUSCH transmission.

For example, 10 or 11 PRBs may be configured for each interlace index in a specific LBT sub-band. Regarding an interlace including 11 PRBs, it may be defined/configured that only 10 PRBs of the interlace are used in the PUSCH transmission.

Proposed method 5-3-2: When the BS instructs the UE to use a DFT-s-OFDM waveform for a PUSCH transmission, the UE may determine the number of PRBs for the PUSCH transmission in the following two steps.

Step 0: When the total number of PRBs in a corresponding interlace is a multiple of 2 and/or 3 and/or 5, the UE may transmit a PUSCH in all of the RPBs. Otherwise, the UE proceeds to step 1.

Step 1: For each of one or more LBT sub-bands allocated to the UE by the BS, the UE may determine the number of PRBs included in each interlace and use only 10 PRBs except for the lowest (or highest) one PRB in the frequency domain in an LBT sub-band including 11 PRBs, for the PUSCH transmission.

Then, when the total number of PRBs in the remaining resources except for the excluded PRB in the interlace is a multiple of 2 and/or 3 and/or 5, the UE may transmit the PUSCH in all of the PRBs. Otherwise, the UE proceeds to step 2.

Step 2: Regarding PRBs included in an interlace existing in an intra-carrier guard band between contiguous LBT sub-bands among one or more LBT sub-bands allocated to the UE by the BS, the UE excludes one of the PRBs based on the lowest (or highest) CRB (or PRB) index or the lowest (or highest) frequency band from PUSCH transmission resources.

After this operation, when the total number of PRBs in the remaining resources except for the excluded PRBs in the interlace is a multiple of 2 and/or 3 and/or 5, the UE transmits the PUSCH in all of the PRBs. Otherwise, the UE repeats step 2 until there remains no more PRB of the interlace, in the intra-carrier guard band.

Proposed Method 5-3-3:

5-3-3-A. When the BS configures/indicates a CP-OFDM waveform for a PUSCH transmission, the following operation may be performed.

An interlace index including any number (e.g. 9, 10, 11, or the like) of PRBs in an LBT sub-band may be allocated. When contiguous LBT sub-bands are allocated, even a PRB belonging to a guard band between the LBT sub-bands may be used.

5-3-3-B. When the BS configures/indicates a DFT-s-OFDM waveform for a PUSCH transmission, the following operation may be performed.

Only an interlace index including a specific (the same) number of RBs (e.g. 10 RBs (or 9 RBs) or the like) may be allocated. Even though contiguous LBT sub-bands are allocated, a PRB belonging to a guard band between the LBT sub-bands is not used.

Proposed Method 5-3-4:

5-3-4-A. When the BS configures/indicates a CP-OFDM waveform for a PUSCH transmission, it is configured that a UL resource (interlace) allocation is indicated by a bitmap in UL grant DCI (for the 15-K SCS as well as for the 30-K SCS).

5-3-4-B, When the BS configures/indicates a DFT-s-OFDM waveform for a PUSCH transmission, it is configured that a UL resource (interlace) allocation is indicated by an RIV in UL grant DCI (for the 15-K SCS, whereas by a bitmap for the 30-K SCS).

Proposed Method 5-3-5:

5-3-5-A: Method of, when a UE is allocated one or more interlace indexes over one or more RB sets (or LBT sub-bands), calculating the total number of PRBs for each interlace index and, for each interlace index, dropping PRBs sequentially in a descending (or ascending) order of CRB (or PRB) indexes, sequentially in a descending (or ascending) order of frequency bands, alternately between the lowest CRB (or PRB) index and the highest CRB (or PRB) index, or alternately between the lowest frequency band and the highest frequency band, such that the number of PRBs is equal to or less than the total number of RPBs and is a multiple of the highest specific number K (e.g., K=10).

Additionally, the total number of PRBs including a PRB in an intra guard band (or a guard band between LBT sub-bands) for each allocated interlace index may be calculated. Alternatively, the total number of PRBs except for a PRB in an intra guard band may be calculated for each allocated interlace index.

5-3-5-B: Alternatively, when a UE is allocated one or more interlace indexes over one or more RB sets, the UE calculates the total number of PRBs for total allocated interlace indexes. Then, the UE may drop some of total allocated PUSCH resources such that the number of resources to be used for a PUSCH transmission is a largest specific number less than or equal to the total number of RPBs. The specific number may be a multiple of K. K may be, for example, 2 and/or 3 and/or 5. The specific number of PRBs for the PUSCH transmission is a multiple of 2, 3, and/or 5 because otherwise, a problem may occur to DFT. PUSCH resources to be dropped may be selected sequentially in a descending (or ascending) order of CRB (or PRB) indexes or sequentially in a descending (or ascending) order of frequency bands. Alternatively, PUSCH resources to be dropped may be selected alternately between the lowest CRN (or PRB) index and the highest CRB (or PRB) index. Alternatively, PUSCH resources to be dropped may be selected alternately between the lowest frequency band and the highest frequency band.

Additionally, the total number of PRBs including a PRB in an intra guard band may be calculated for the total allocated interlace indexes. Alternatively, the total number of PRBs except for a PRB in the intra guard band may be calculated for the total allocated interlace indexes.

Proposed Method 5-3-6:

When a UE is allocated one or more interlace indexes as PUSCH transmission resources over one or more RB sets (or LBT sub-bands), the UE calculates the total number of PRBs for total allocated interlace indexes and drop PRB(s) for each interlace index by the following proposed methods, such that the number of PUSCH transmission resources becomes a multiple of a specific number K (2 and/or 3 and/or 5).

5-3-6-A. For each interlace index, the positions of PRBs and the position of an RB-set may be determined in the following manner.

Specifically, when an RB-set corresponding to the lowest (or highest) frequency band among allocated RB-sets includes an RB-set including a specific interlace index with 11 PRBs, the UE selects the RB-set for each interlace index. When the selected RB-set has the lowest (or highest) index (or located in the lowest (or highest) frequency band), the UE is configured to start to drop a PRB corresponding to the lowest (or highest) CRB (or PRB) index in the RB-set.

Subsequently, when the UE should drop additional PRBs in the same interlace, the UE sequentially drops the PRBs, starting from a PRB corresponding to the lowest (highest) CRB (or PRB) index next to the dropped RPB. The RB set in which the dropped RPBs are located has the lowest (or highest) index. Alternatively, the RB set in which the dropped RPBs are located resides in the lowest (or highest) frequency band.

In the absence of an RB-set including a specific interlace index (e.g., j) with 11 PRBs in the RB-set corresponding to the lowest (or highest) frequency band among the allocated RB-sets, the UE first drops another interlace index. Subsequently, in the presence of an RB-set including another interlace index (e.g., k) with the dropped PRB, an RB-set selected by the interlace index (e.g., k) is selected by a specific interlace (e.g., j). Alternatively, when there are a plurality of other interlace indexes, RB-sets are selected in an ascending (or descending) order of frequency bands. Accordingly, PRBs are dropped, starting from a PRB corresponding to the lowest (or highest) CRB (or PRB) index in the specific interlace index (e.g., j) according to the dropped PRB in the interlace index (e.g., j).

Then, when additional PRBs should be dropped for the same interlace index (e.g., j), the PRBs are sequentially dropped, starting from a PRB corresponding to the lowest (or highest) CRB (or PRB) index next to the previously dropped PRB. An RB set in which the dropped PRBs are located has the lowest (or highest) index. Alternatively, the RB set in which the dropped PRBs are located resides in the lowest (or highest) frequency band.

When there is no RB set including an interlace index with 11 PRBs in an RB set corresponding to the lowest (or highest) frequency band among allocated RB sets, the UE selects an RB set corresponding to the lowest (or highest) index (according to any method or a predetermined method) and drops PRBs, starting from a PRB corresponding to the lowest (or highest) CRB (or PRB) index. Alternatively, the UE selects an RB set located in the lowest (or highest)

frequency band and drops PRBs, starting from a PRB corresponding to the lowest (or highest) CRB (or PRB) index.

Subsequently, when additional PRBs should be dropped in the same interlace, the PRBs are sequentially dropped, starting from a PRB corresponding to the lowest (or highest) CRB (or PRB) index next to the previously dropped PRBs. An RB set in which the dropped PRBs are located has the lowest (or highest) index. Alternatively, the RB set in which the dropped PRBs are located resides in the lowest (or highest) frequency band.

Figure 20:
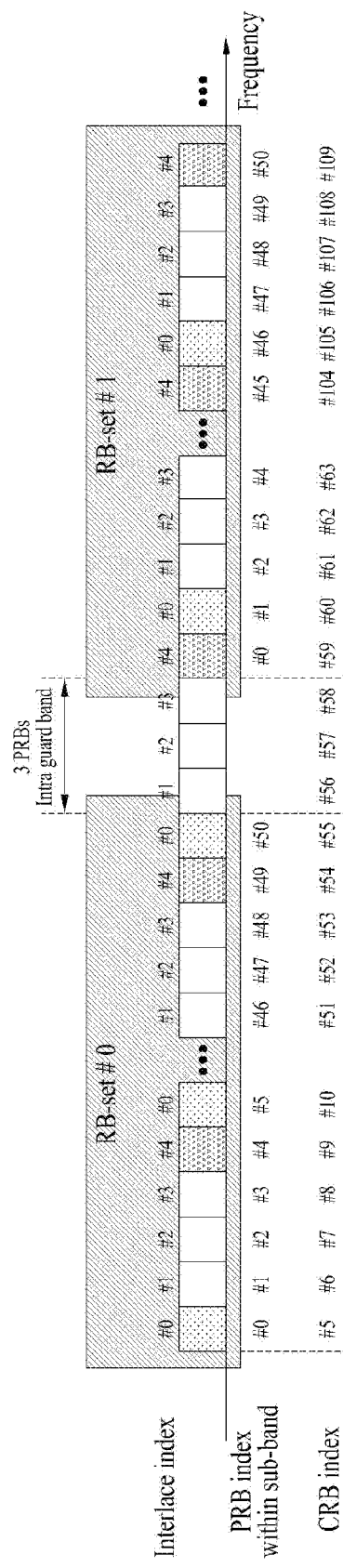

FIG. 20 is a diagram illustrating Example 1 (Example 5-3-6-A-1) according to proposed method 5-3-6-A.

In FIG. 20, it is assumed that K=10.

Referring to FIG. 20, the BS allocates interlace index #0 and interlace index #4 in RB-set #0 and RB-set #1, as resources for a DFT-s-OFDM-based PUSCH transmission to the UE.

Interlace index #0 includes a total of 21 PRBs in the allocated RB-sets. Therefore, 1 PRB should be dropped (to match K*2=20). Then, the UE selects RB set #0 including 11 PRBs from between the highest (or lowest) RB-sets, RB-set #0 and RB-set #1 and drops a PRB corresponding to the lowest PRB (or CRB) index, PRB index #0 (i.e., CRB index 5) in RB-set #0. Accordingly, the total number of PRBs corresponding to interlace index #0 is 20 and the dropping is discontinued.

Interlace index #4 includes a total of 21 PRBs in the allocated RB-sets. Therefore, 1 PRB should be dropped (to match K*2=20). Then, the UE selects RB set #1 including 11 PRBs from between the highest or lowest RB-sets, RB-set #0 and RB-set #1 and drops a PRB corresponding to the highest PRB (or CRB) index, PRB index #50 (i.e., CRB index 109) in RB-set #1. Accordingly, the total number of PRBs corresponding to interlace index #4 is 20 and the dropping is discontinued.

Finally, the number of PRBs corresponding to each interlace index is 20. Because two interlace indexes in total exist, 40(=4*10=23×5) PRBs are used as resources for the DFD-s-OFDM-based PUSCH transmission.

Figure 21:
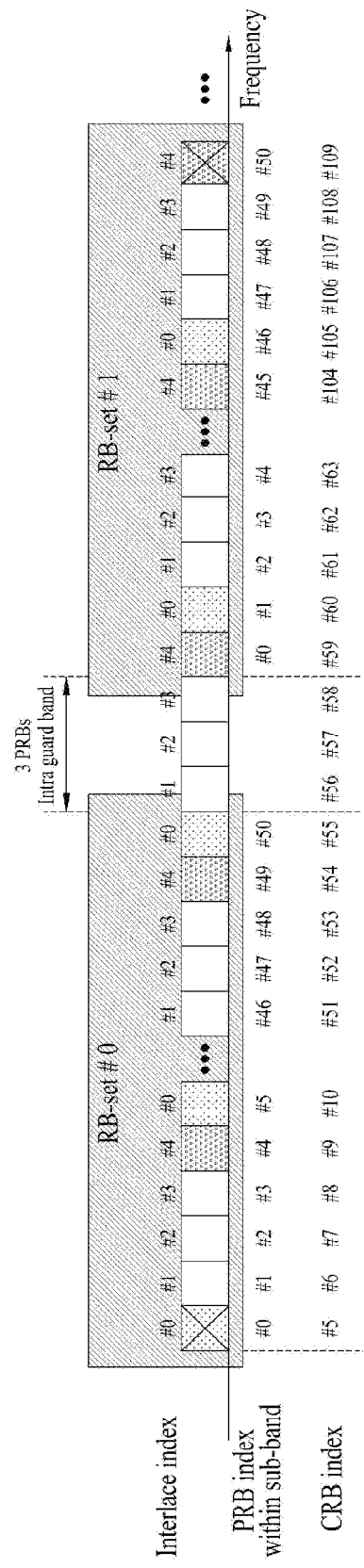

Referring to FIG. 21, the number of PRB groups (equal to the total number of allocated interlaces) is equally 2, and the interval between PRB groups is equally 3 PRBs.

Figure 22:
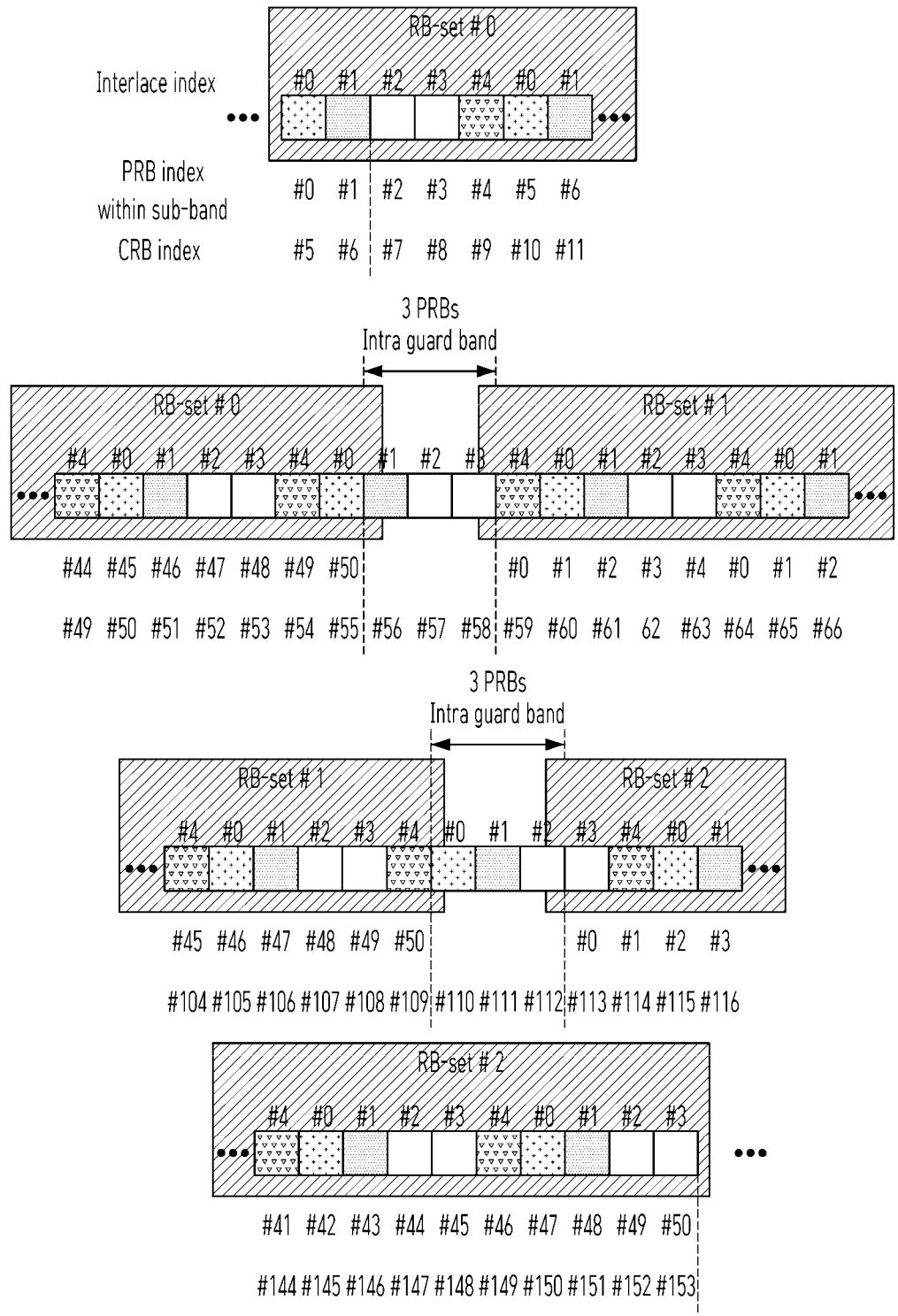

FIG. 22 is a diagram illustrating Example 2 (Example 5-3-6-A-2) according to proposed method 5-3-6-A.

In FIG. 22, it is assumed that K=10.

Referring to FIG. 22, the BS allocates interlace index #0, interlace index #1, and interlace index #4 in RB-set #0, RB-set #1, and RB-set #2, as resources for a DFT-s-OFDM-based PUSCH transmission, to the UE.

On the assumption that the PRBs of an intra guard band are included in a PUSCH transmission, interlace index #0 includes a total of 32 PRBs. 2 PRBs should be dropped (to match K*3=30). Therefore, the UE selects RB set #0 including 11 PRBs from between the highest or lowest RB-sets, RB-set #0 and RB-set #2 and drops a PRB corresponding to the lowest PRB (or CRB) index, PRB index #0 (i.e., CRB index 5) in RB-set #0.

Interlace index #0 still includes 31 PRBs. The UE selects the same RB-set as an RB-set including the previously dropped RPB, RB-set #0 again, and drops a PRB corresponding to the lowest PRB (or CRB) index, PRB index #5 (i.e., CRB index 10) in RB-set #0, among PRBs (which have not been dropped) corresponding to interlace index #0.

Then, the total number of PRBs corresponding to interlace index #0 is 30 and the dropping is discontinued.

Interlace index #1 includes a total of 32 PRBs. 2 PRBs should be dropped (to match K*3=30). Therefore, even though the UE intends to select an RB-set including 11 PRBs from between the highest or lowest RB-sets, RB-set #0 and RB-set #2, each of the two RB-sets includes only 10 PRBs. Therefore, the UE selects the same RB-set as the RB-set RB-set #0 in which a PRB has been dropped in interlace index #0, and drops a PRB corresponding to the lowest PRB (or CRB) index, PRB index #1 (i.e., CRB index 6) in RB-set #0.

Interlace index #1 still includes 31 PRBs. The UE selects the same RB set as an RB set including the previously dropped RPB, RB-set #0 again, and drops a PRB corresponding to the lowest PRB (or CRB) index, PRB index #6 (i.e., CRB index 11) among PRBs (which have not been dropped) corresponding to interlace index #1 in RB-set #0. Then, the total number of PRBs corresponding to interlace index #1 is 30 and no more PRB is dropped.

Interlace index #4 includes a total of 31 PRBs. 1 PRB should be dropped (to match K*3=30). Therefore, even though the UE intends to select an RB-set including 11 PRBs from between the highest or lowest RB-sets, RB-set #0 and RB-set #2, each of the two RB-sets includes only 10 PRBs. Therefore, the UE selects the same RB-set as the RB-set in which a PRB has been dropped in interlace index #0, RB-set #0, and drops a PRB corresponding to the lowest PRB (or CRB) index, PRB index #4 (i.e., CRB index 9) in RB-set #0. Then, the total number of PRBs corresponding to interlace index #4 is 30 and no more PRB is dropped.

Finally, the number of PRBs corresponding to each interlace index is 30. Because three interlace indexes in total exist, 90(=9*10=32×2×5) PRBs are used as resources for the DFD-s-OFDM-based PUSCH transmission, as illustrated in FIG. 23.

Figure 23:
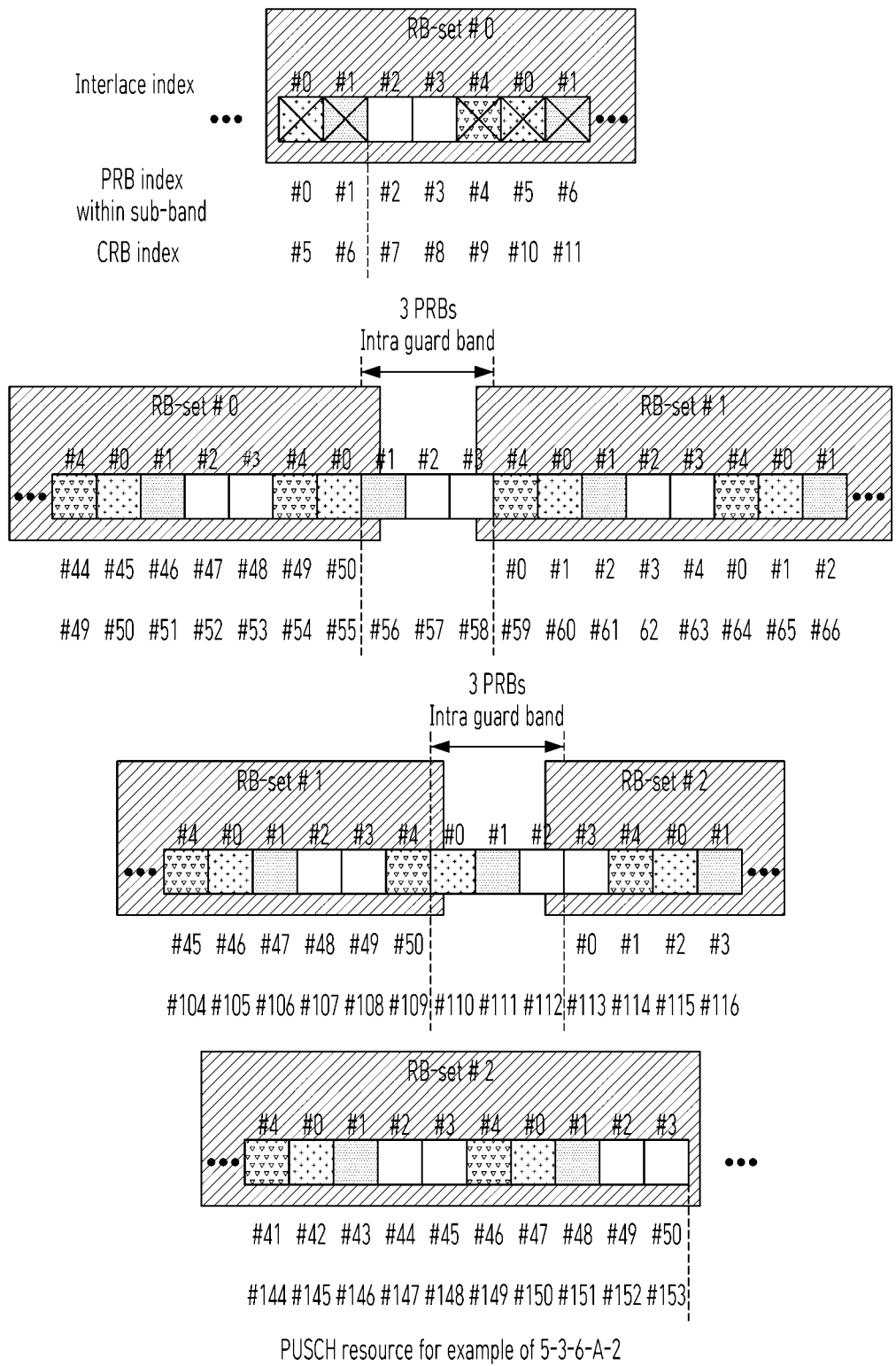

Referring to FIG. 23, the number of PRB groups (equal to the total number of allocated interlaces) is equally 3, and the interval between PRB groups is equally 2 PRBs.

Additionally, the UE may calculate the total number of PRBs including a PRB in an intra guard band (or a guard band between LBT sub-bands) for each allocated interlace index. Alternatively, the UE may calculate the total number of PRBs except for a PRB in an intra guard band.

5-3-6-B: Alternatively, when a UE is allocated one or more interlace indexes over one or more RB sets, the UE calculates the total number of PRBs for total interlace indexes. Then, the UE may drop PRB(s) in total (allocated) PUSCH resources such that the number of PUSCH resources is a multiple of 2, 3, and/or 5 in the following proposed method.

The position of a PRB to be dropped and the position of an RB set may be determined in the following manner.

Specifically, the UE is configured to select an RB-set including 11*x+10*y PRBs, corresponding to the lowest (or highest) frequency band and, when the selected RB-set has a lowest (or highest) index (or resides in a lowest (or highest) frequency band) among allocated RB-sets, start to drop a PRB corresponding to the lowest (or highest) CRB (or PRB) index in the selected RB-set. When a plurality of RB-sets are selected, one of RB-sets corresponding to the lowest (or highest) index (or frequency band) is selected according to any or predetermined information. Herein, x>0, y>=0, and x+y is the total number of interlace indexes allocated to the UE.

When PRBs are to be additionally dropped in the same RB-set, the PRBs corresponding to the lowest (or highest) CRB (or PRB) index next to the previously dropped PRB are sequentially dropped. An RB-set in which the dropped PRBs are located has the lowest (or highest) index. Alternatively, RB-set in which the dropped PRB are located resides in the lowest (or highest) frequency band.

In the absence of an RB-set including 11*x+10*y PRBs, corresponding to the lowest (or highest) frequency band among RB-sets allocated to the UE, the UE is configured to select one of RB-sets corresponding to a lowest (or highest) index (or residing in the lowest (or highest) frequency band) (according to any or predetermined information) and starts to drop a PRB corresponding to the lowest (or highest) CRB (or PRB) index in the selected RB-set.

When PRBs are to be additionally dropped in the same RB-set, the PRBs corresponding to the lowest (or highest) CRB (or PRB) index next to the previously dropped PRB are sequentially dropped. An RB-set in which the dropped PRB are located has the lowest (or highest) index. Alternatively, the RB-set in which the dropped PRBs are located resides in the lowest (or highest) frequency band.

Figure 24:
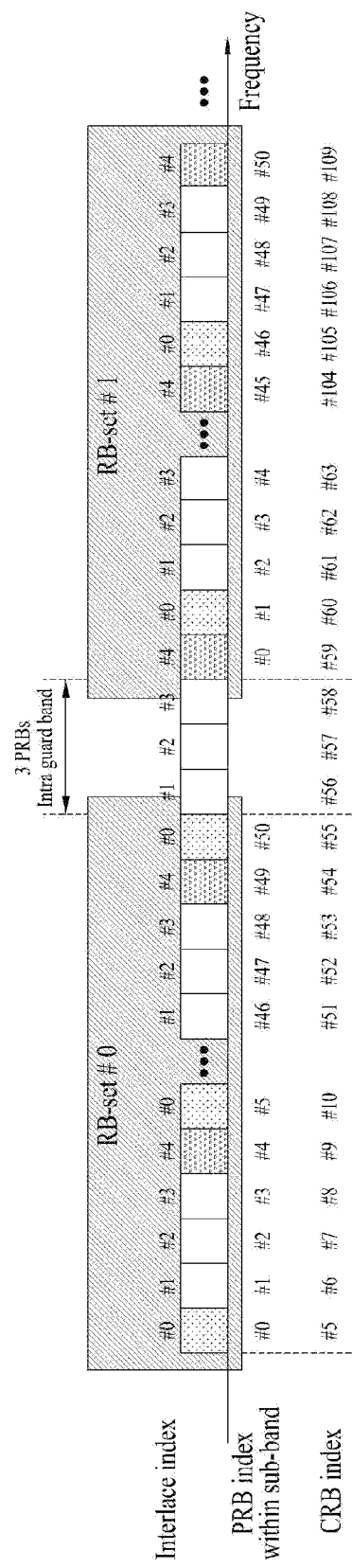

FIG. 24 is a diagram illustrating Example 1 (Example 5-3-6-B-1) according to proposed method 5-3-6-B.

In FIG. 24, it is assumed that K=10.

Referring to FIG. 24, the BS allocates interlace index #0 and interlace index #4 in RB-set #0 and RB-set #1, as resources for a DFT-s-OFDM-based PUSCH transmission to the UE.

Since the number of PRBs corresponding to total interlace indexes is 42, 2 PRBs should be dropped (to match K*4=40). Accordingly, the UE should select an RB-set having 11*x+10*y PRBs from between RB-set #0 and RB-set #1, which are the highest or lowest RB-sets. Since each of both RB-sets has 21 PRBs, the UE (arbitrarily) selects RB-set #0, which is the lowest RB-set. Then, the UE drops a PRB corresponding to PRB index #0 (i.e., CRB index 5), which is the lowest PRB (or CRB) index in RB-set #0.

Subsequently, since the number of PRBs corresponding to the total interlace indexes is 41, the UE selects once again RB-set #0, which is the same RB-set as the RB-set to which the previously dropped PRB belongs, and drop a PRB corresponding to PRB index #4 (i.e., CRB index 9), which is the lowest PRB (or CRB) index (which has not been dropped yet) in RB-set #0.

Then, the number of PRBs corresponding to the total interlace indexes becomes 40, and no more PRB is dropped.

Figure 25:
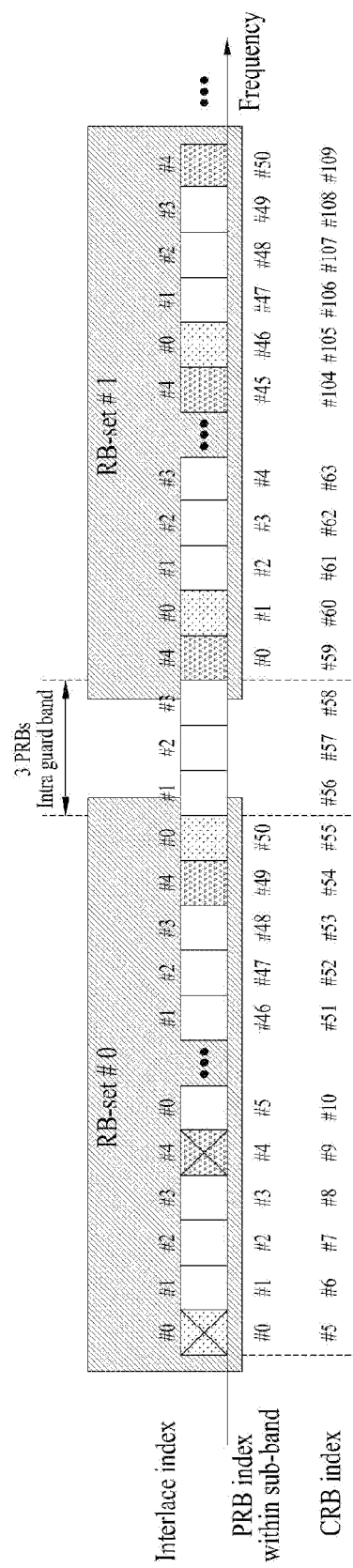

Finally, the number of PRBs corresponding to the interlace indexes becomes 40. As illustrated in FIG. 25, 40 (=4*10=23×5) PRBs are used as resources for the DFD-s-OFDM based PUSCH transmission.

Referring to FIG. 25, the interval between PRB groups (the number of PRB groups is equal to the total number of allocated interlaces) is equally 3. However, the number of PRB groups is 1 or 2. Therefore, in this case, it may be preferable to apply proposed method 5-3-5-A.

Figure 26:
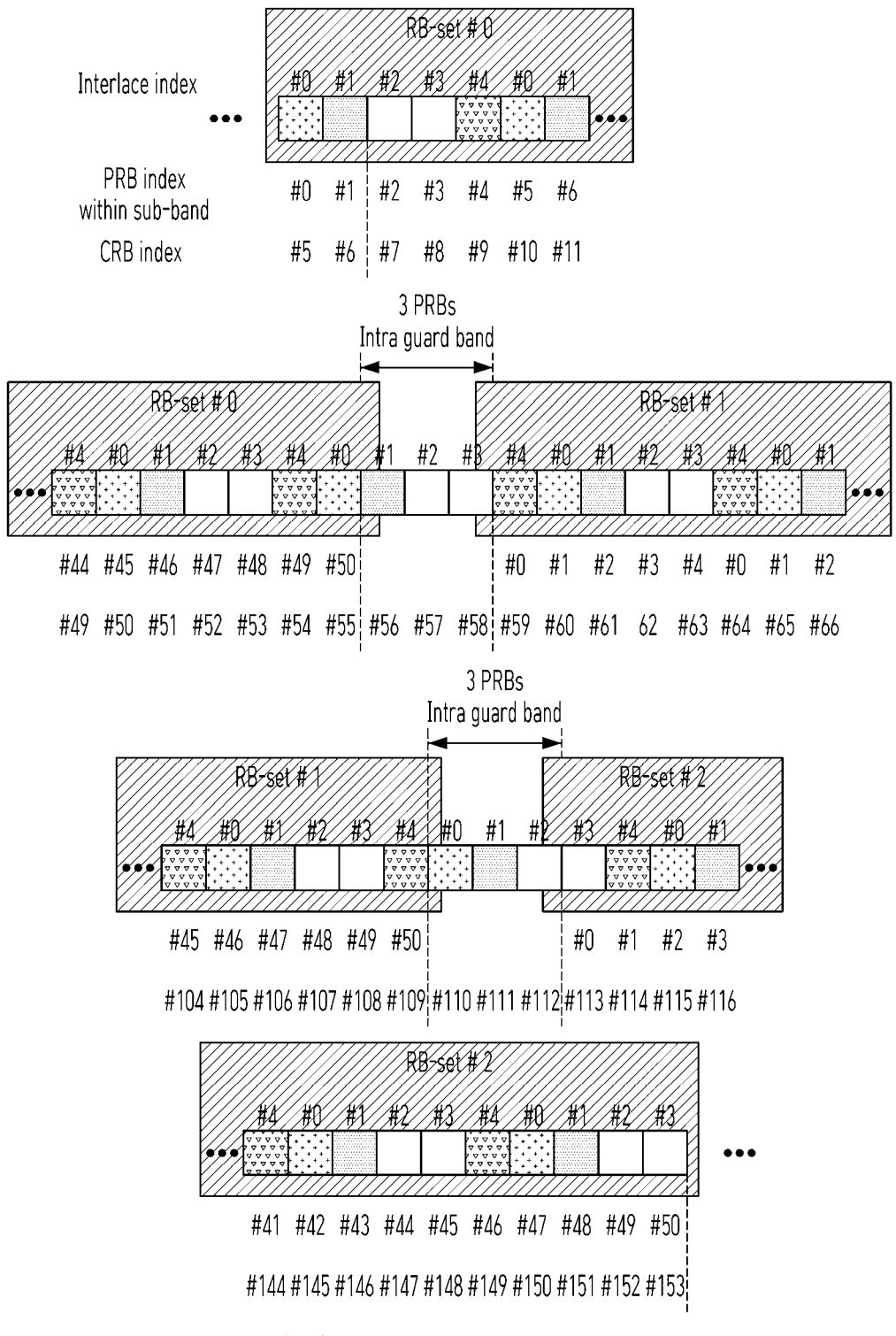

FIG. 26 is a diagram illustrating Example 2 (Example 5-3-6-B-2) according to proposed method 5-3-6-B.

In FIG. 26, it is assumed that K=10.

Referring to FIG. 26, the BS allocates interlace indexes #0, #1, and #4 in RB-set #0, RB-set #1, and RB-set #2, as resources for a DFT-s-OFDM-based PUSCH transmission to the UE.

On the assumption that a PRB in an intra guard band is also included in a PUSCH transmission, the total number of PRBs corresponding to three interlace indexes is 95=(32+32+31). Therefore, 5 PRBs should be dropped (to match K*9=90). Accordingly, the UE may select RB-set #0 having 11*x+10*y PRBs (31=11*1+10*2) from between RB-set #0 and RB-set #2 which are the highest or lowest RB-sets.

Then, the UE drops a PRB corresponding to PRB index #0 (i.e., CRB index 5), which is the lowest PRB (or CRB) index in the selected RB-set #0.

Subsequently, since the number of PRBs corresponding to the total interlace indexes is 94, the UE selects once again RB-set #0, which is the same RB-set as the RB-set to which the previously dropped PRB belongs, and drops a PRB corresponding to PRB index #1 (i.e., CRB index 6), which is the lowest PRB (or CRB) index (which has not been dropped yet) in the selected RB-set #0.

The UE repeats the above process three more times to additionally drop three PRBs corresponding to PRB indexes #4, #5, and #6 (i.e., CRB indexes 9, #10, and #11) in the selected RB-set #0.

Then, the number of PRBs corresponding to the total interlace indexes becomes 90, and no more PRB is dropped.

Figure 27:
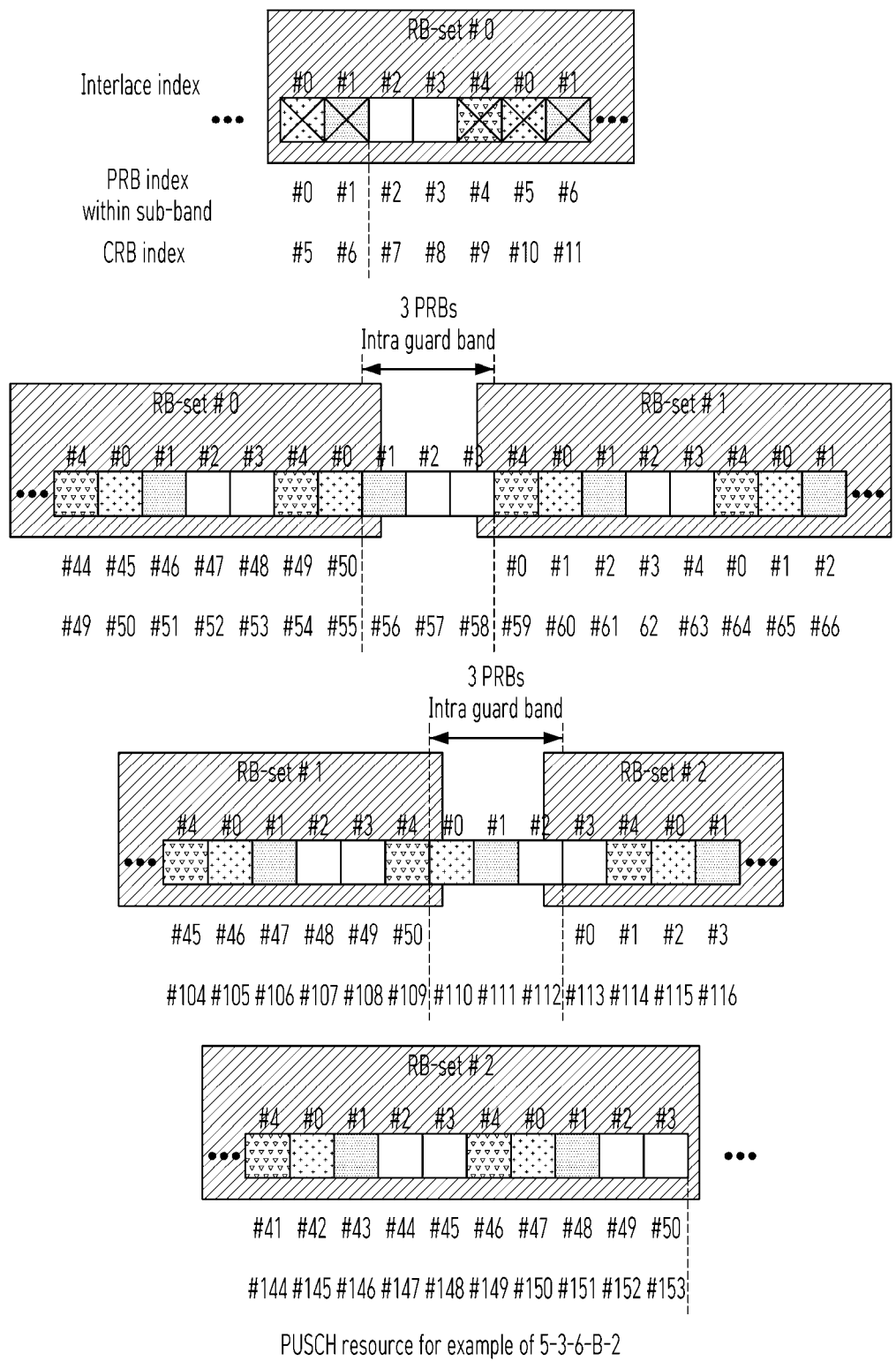

Finally, since the number of PRBs corresponding to the total interlace indexes is 90, 90 (=9*10=32×2×5) PRBs are used as resources for the DFD-s-OFDM-based PUSCH transmission, as illustrated in FIG. 27.

Referring to FIG. 27, the number of PRB groups (i.e., equal to the total number of allocated interlaces) is equally 3, and the number of PRBs between PRB groups is equally 2.

Additionally, the UE may calculate the total number of PRBs including even the PRB(s) of the intra guard band, for the total allocated interlace indexes or calculate the total number of PRBs except for the PRB(s) of the intra guard band, for the total allocated interlace indexes.

Proposed method 5-3-7:

Case 5-3-7-1: When the UE is allocated one or more RB-sets, the UE calculates the total number of PRBs for total allocated UL resources (i.e., in consideration of all RB-sets and interlace indexes), and then when the total number of PRBs is a multiple of 2 and/or 3 and/or 5, the UE transmits a PUSCH in the corresponding UL resources.

Case 5-3-7-2: When the total number of PRBs of all UL resources allocated to the UE is not a multiple of 2 and/or 3 and/or 5, the UE performs the following PRB drop method sequentially until the total number of PRBs of all allocated UL resources is a multiple of 2 and/or 3 and/or 5.

Step 0: Only when a plurality of RB-sets are allocated to the UE, the UE drops PRBs belonging to an intra-guard band first.

Step 1: The UE first drops a PRB close to the intra-guard band or PRBs located at both ends of each RB-set.

Characteristically, after the UE performs only step 0 of the PRB drop method, the UE may not expect that a UL resource allocation combination in which the total number of PRBs of all UL resources is not a multiple of 2 and/or 3 and/or 5 will be allocated to the UE.

Proposed Method 5-3-8:

In the case where the UE is allocated one or more interlace indexes over one or more RB-sets (or LBT subbands), when the total number of PRBs of all allocated UL resources is 2 and/or 3 and/or 5, the UE sequentially performs the following PRB drop method sequentially for all of the allocated UL resources until the reduced number of PRBs becomes a multiple of 2 and/or 3 and/or 5.

Step 0: Only when the UE is allocated a plurality of RB-sets, the UE first drops PRBs belonging to an intra-RB-set guard band. When the number of PRBs excluding the dropped PRBs is a multiple of 2 and/or 3 and/or 5, the UE transmits a PUSCH in the number of PRBs counted by excluding the dropped PRBs. Otherwise, the UE performs the next step, step 1.

Step 1: The UE is configured to use only 10 PRBs except for the lowest (or highest) one PRB in an interlace including 11 PRBs among interlaces in each LBT sub-band, for a PUSCH transmission.

Proposed method 5-3-9:

5-3-9-A. When the UE is allocated one or more interlace indexes over one or more RB-sets (or LBT sub-bands), the UE calculates the number of PRBs for each interlace index. Then, the UE performs dropping for each interlace index. Specifically, the UE may drop some of allocated PUSCH resources so that the number of resources to be used for a PUSCH transmission in one interlace index is a specific largest number equal to or less than the number of PRBs for the corresponding interlace index. The specific number may be a multiple of K. For example, K may be 2 and/or 3 and/or 5. The dropped PUSCH resources may be sequentially selected, starting from the lowest (or highest) CRB (or PRB) index for each interlace index. Alternatively, the dropped PUSCH resources may be sequentially selected, starting from a PRB located in the lowest (or highest) frequency band. Alternatively, the dropped PUSCH resource may be selected alternately from the lowest CRB (or PRB) index and the highest CRB (or PRB) index. Alternatively, the dropped PUSCH resource may be selected alternately from a PRB located in the lowest frequency band and a PRB located in the highest frequency band.

Additionally, the UE may calculate the total number of PRBs including even the PRB(s) of an intra guard band (i.e., a guard band between LBT sub-bands), for each allocated interlace index, or calculate the total number of PRBs except for even the PRB(s) of the intra guard band, for each allocated interlace index.

5-3-9-B. Characteristically, in the case where the number of PRBs per interlace in 5-3-9-A is 32 (=25), even though 32 is a multiple of 2, the number of total PRBs for the total interlace indexes may not be suitable for a DFT operation. Therefore, the case where the number of PRBs per interlace is 32 may not be allowed.

Additionally, the UL interlace configuration methods proposed in Embodiments 1 to 5 are not limited when PUCCH signals and PUSCH channels are configured. The principles/methods proposed in the present disclosure may be applied equally/similarly when other UL channels/signals are configured.

In addition, the principles/operations/methods proposed in Embodiments 1 to 5 of the present disclosure may be equally/similarly applied when a sequence used for communication between UEs (e.g., device-to-device (D2D) communication) and/or communication between vehicles (e.g., vehicle-to-everything (V2X) communication) through sidelink (SL) or a channel (e.g., feedback channel) and/or signal (e.g., DMRS) consisting of sequences is configured/mapped/transmitted.

It is obvious that each of the examples of the proposed methods may also be included as one implementation method, and thus each example may be regarded as a kind of proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE or from a transmitting UE to a receiving UE through a predefined signal (e.g., a physical layer signal, a higher layer signal, etc.).

Network Initial Access and Communication Processes

The UE may perform a network access process to perform the above-described/proposed procedures and/or methods. For example, the UE may receive and store system information and configuration information required to perform the above-described/proposed procedures and/or methods in a memory while accessing the network (e.g., BS). The configuration information required for the present disclosure may be received through higher layer signaling (e.g., RRC layer signaling, MAC layer signaling, etc.).

Figure 28:
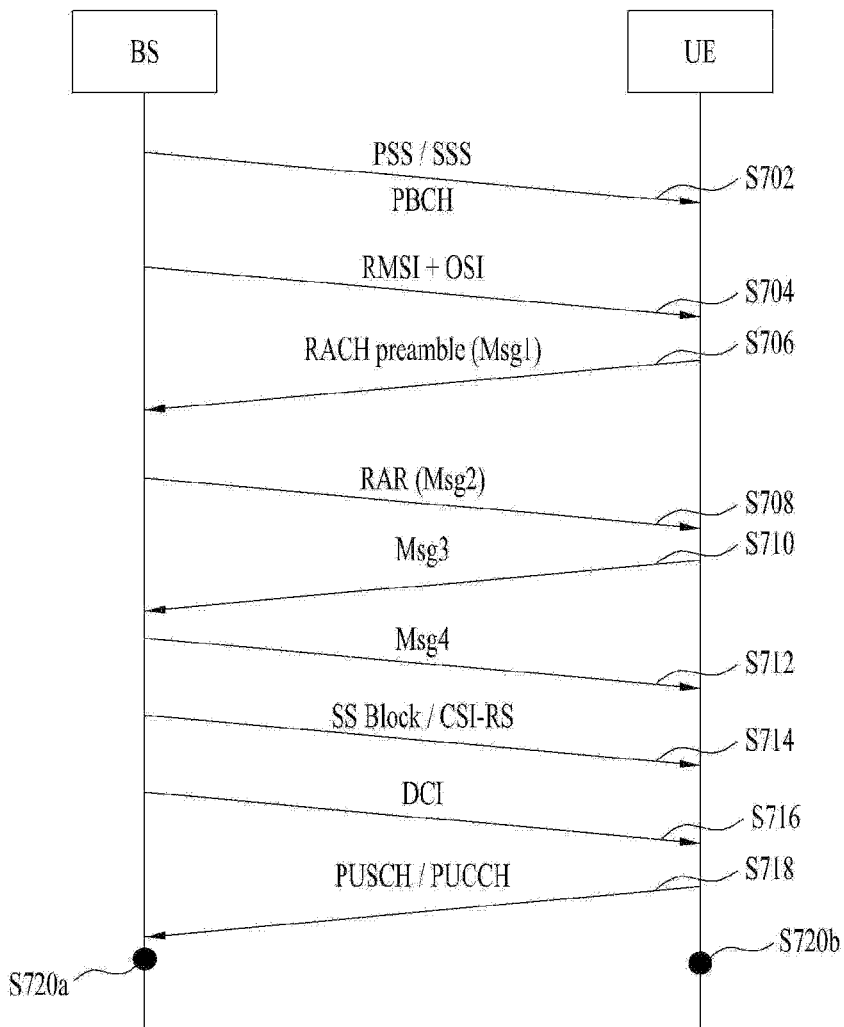

FIG. 28 is a diagram illustrating an initial network access process and subsequent communication processes. In NR, a physical channel and a reference signal may be transmitted by beamforming. When beamforming-based signal transmission is supported, a beam management process may be performed to align beams between the BS and UE. Further, a signal proposed in the present disclosure may be transmitted/received by beamforming. In the RRC IDLE mode, beam alignment may be performed based on a synchronization signal block (SSB), whereas in the RRC CONNECTED mode, beam alignment may be performed based on a CSI-RS (in DL) and an SRS (in UL). When beamforming-based signal transmission is not supported, beam-related operations may be skipped in the following description.

Referring to FIG. 28, the BS may periodically transmit an SSB (S702). The SSB may include a PSS/SSS/PBCH. The SSB may be transmitted by beam sweeping. Subsequently, the BS may transmit RMSI and other system information (OSI) (S704). The RMSI may include information (e.g., PRACH configuration information) required for the UE to initially access the BS. The UE may identify the best SSB after performing SSB detection. The UE may transmit a random access channel (RACH) preamble (Message 1 (Msg1)) to the BS on a PRACH resource linked/corresponding to the index (i.e., beam) of the best SSB (S706). The beam direction of the RACH preamble is associated with the PRACH resource. The association between the SSB (index) and the PRACH resource (and/or RACH preamble) may be configured by system information (e.g., RMSI). Thereafter, as a part of a RACH procedure, the BS may transmit a random access response (RAR) (Msg2) in response to the RACH preamble (S708), and the UE may transmit Msg3 (e.g., RRC Connection Request) using a UL grant in the RAR (S710). The BS may transmit a contention resolution message (Msg4) (S712). Msg4 may include an RRC Connection Setup message.

When the BS and UE establish an RRC connection through the RACH procedure, the BS and UE may perform subsequent beam alignment based on an SSB/CSI-RS (in DL) and an SRS (in UL). For example, the UE may receive the SSB/CSI-RS (S714). The UE may use the SSB/CSI-RS to generate a beam/CSI report. The BS may request the beam/CSI report from the UE through DCI (S716). In this case, the UE may generate the beam/CSI report based on the SSB/CSI-RS and transmit the generated beam/CSI report to the BS on a PUSCH/PUCCH (S718). The beam/CSI report may include a beam measurement result, information about a preferred beam, and so on. The BS and UE may switch beams based on the beam/CSI report (S720a and S720b).

Thereafter, the UE and BS may perform the above-described/proposed procedures and/or methods. For example, each of the UE and BS may transmit a radio signal by processing information stored in a memory or store a received radio signal in the memory after processing the radio signal according to the proposals of the present disclosure, based on configuration information obtained from the network access process (e.g., system information acquisition process, RRC connection process based on an RACH, and so on). In the case of DL, the radio signal may include at least one of a PDCCH, a PDSCH, or an RS, and in the case of UL, the radio signal may include at least one of a PUCCH, a PUSCH, or an SRS on UL.

Discontinuous Reception (DRX) Operation

The UE may perform a DRX operation, while performing the afore-described/proposed procedures and/or methods. A UE configured with DRX may reduce power consumption by discontinuously receiving a DL signal. DRX may be performed in an RRC_IDLE state, an RRC_INACTIVE state, and an RRC_CONNECTED stated. DRX is used for discontinuous reception of a paging signal in the RRC_IDLE state and the RRC_INACTIVE state. Now, DRX performed in the RRC_CONNECTED state (RRC_CONNECTED DRX) will be described below.

Figure 29:
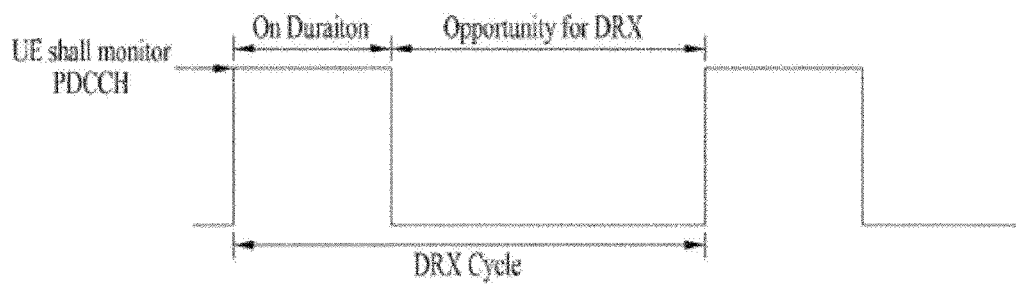

FIG. 29 is a diagram illustrating a DRX cycle (RRC_CONNECTED state).

Referring to FIG. 29, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 36 describes a UE operation related to DRX (in the RRC_CONNECTED state). Referring to Table 11, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 29.

TABLE 36

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |

TABLE 36-continued

| | Type of signals | UE procedure |
|---|---|---|
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the length of the starting duration of a DRX cycle.

Value of drx-InactivityTimer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

Before performing the operations described in each embodiment of the present disclosure, the UE may perform the above-described DRX related operation. If the UE performs PDCCH monitoring during the On Duration and successfully detects a PDCCH while performing the PDCCH monitoring, the UE may perform at least one of the PUSCH scheduling related operations according to embodiments of the present disclosure.

Implementation Examples

Figure 30:
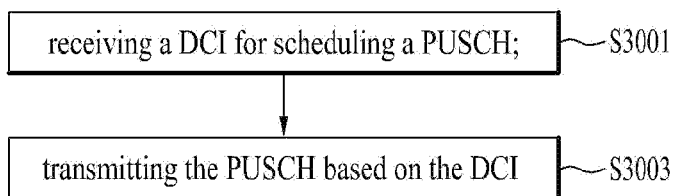

FIG. 30 is a flowchart illustrating a signal transmission/reception method according to embodiments of the present disclosure.

Referring to FIG. 30, embodiments of the present disclosure may be performed by a UE and include receiving DCI for PUSCH scheduling (S3001) and transmitting a PUSCH based on the DCI (S3003).

Specifically, resources in which the PUSCH is transmitted may be determined in one of the proposed methods described in Embodiment 4 and/or Embodiment 5.

For example, the PUSCH transmission resources may be determined based on proposed method 5-3-5-B of Embodiment 5. Specifically, the UE may transmit the PUSCH in a specific number of RBs. The specific number is equal to or less than the total number of PRBs corresponding to an allocated interlace index. Additionally, the specific number may be a multiple of K where K may be 2, 3, and/or 5. Therefore, the specific number may be a largest number which is equal to or less than the number of RBs allocated by DCI and is a multiple of 2, 3, and/or 5.

Further, according to proposed method 5-3-5-B, PRBs may be dropped sequentially, starting from a PRB having a highest index. Accordingly, the specific number of RBs may have relatively low indexes among the RBs allocated by the DCI.

Because the RBs in which the PUSCH is transmitted are selected from one or more interlaces allocated by the DCI, the RBs may still form one or more interlaces.

In an additional example, the PUSCH transmission resources may be determined based on Opt 4-1-3-3 of Embodiment 4. Specifically, in the case where a BWP for a UL transmission includes a plurality of LBT sub-bands, that is, a plurality of RB-sets, when a UL fallback DCI format is based on a CSS, the PUSCH may be transmitted in a UL RB-set overlapping in the frequency domain with a DL RB set configured with a CCR in which the DCI is detected. Preferably, the UL RB-set in which the PUSCH is transmitted may overlap with one or X CCEs having the lowest index among CCEs in which the DCI is detected. Further, the UL RB-set in which the PUSCH is transmitted may be preferable a lowest specific single UL RB-set among UL RB-sets overlapping in the frequency domain with the CCEs.

In summary, when the UE receives DCI in a CSS, the UE may transmit a PUSCH in a single UL RB-set with a lowest index among UL RB-sets overlapping in the frequency domain with a CCE having a lowest index among detected CCEs. Further, according to Opt 4-1-3-3 of Embodiment 4, in the absence of a UL RB-set overlapping with a DL RB-set to which the CCEs are mapped and/or for which the CCEs are configured, the UE may transmit the PUSCH in an RB-set having a lowest index in a BWP for the UL transmission. The UL fallback DCI format may be DCI format 0_0.

Proposed method 5-3-5-B of Embodiment 5 and Opt 4-1-3-3 of Embodiment 4 may be performed in combination or independently. The operations of Embodiment 1 to Embodiment 5 may also be performed in combination or independently.

One or more of the operations described with reference to FIGS. 1 to 29 and/or the operations described with reference to Embodiment 1 to Embodiment 5 may be additionally performed in combination with the operation described in relation to FIG. 30.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 31:
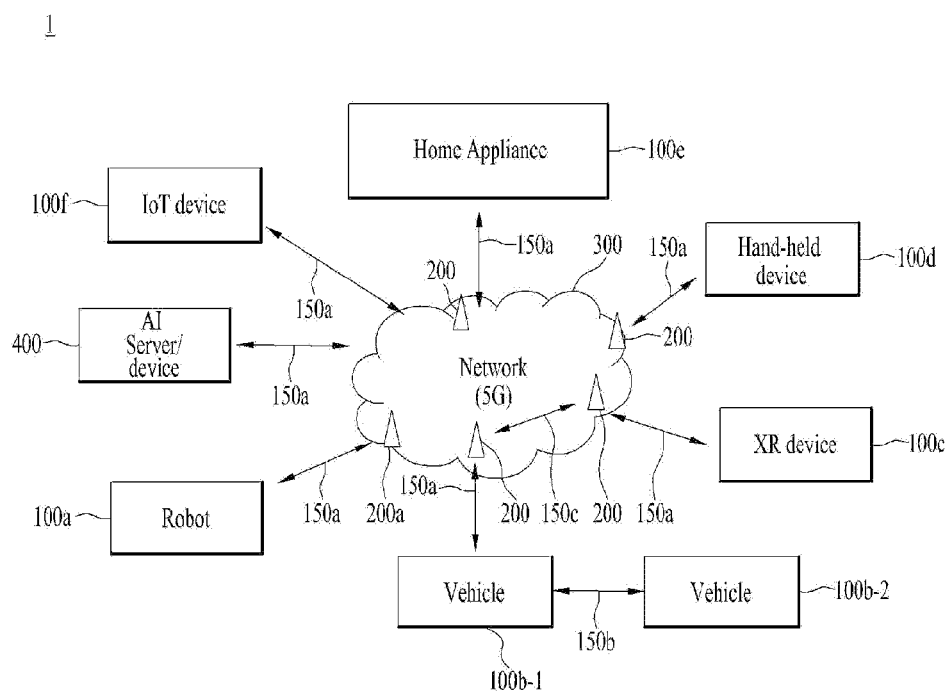
FIGS. 31 to 34 illustrate devices according to an embodiment of the present disclosure.

FIG. 31 illustrates a communication system 1 applied to the present disclosure.

Referring to FIG. 31, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 32:
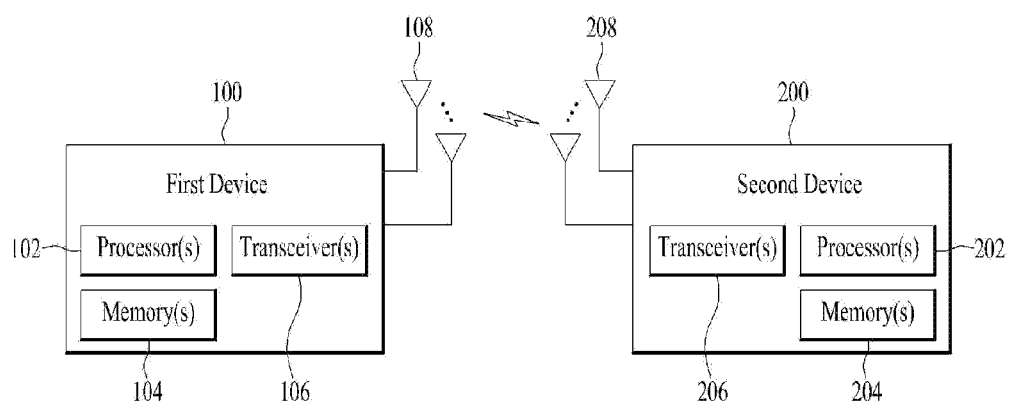

FIG. 32 illustrates wireless devices applicable to the present disclosure.

Referring to FIG. 32, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 31.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 33:
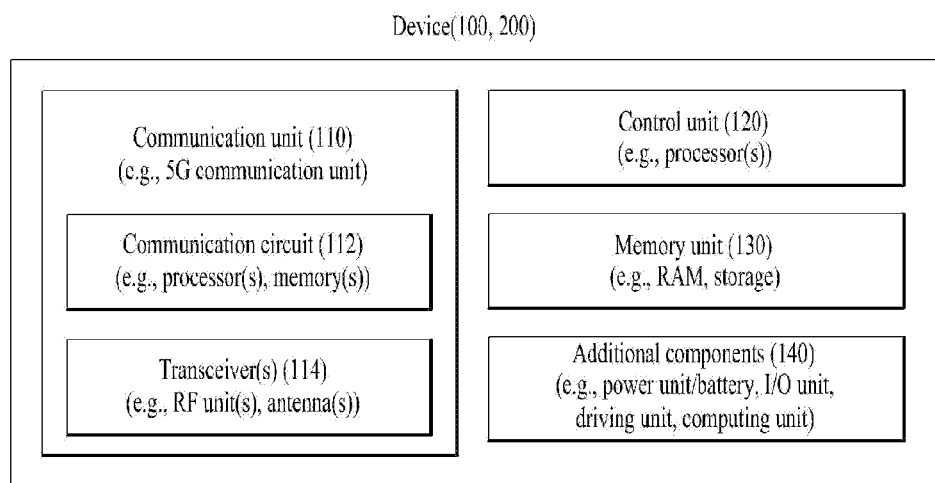

FIG. 33 illustrates another example of a wireless device applied to the present disclosure. The wireless device may be implemented in various forms according to a use case/service (refer to FIG. 31).

Referring to FIG. 33, wireless devices 100 and 200 may correspond to the wireless devices 100 and 200 of FIG. 32 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 32. For example, the transceiver(s) 114 may include the one or more transceivers 106 and 206 and/or the one or more antennas 108 and 208 of FIG. 32. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 31), the XR device (100c of FIG. 31), the hand-held device (100d of FIG. 31), the home appliance (100e of FIG. 31), the IoT device (100f of FIG. 31), a digital broadcasting terminal, a hologram device, a public safety device, an MTC device, a medical device, a FinTech device (or a finance device), a security device, a climate/environment device, the AI server/device (400 of FIG. 31), the BSs (200 of FIG. 31), a network node, or the like. The wireless device may be mobile or fixed according to a use case/service.

In FIG. 33, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 34:
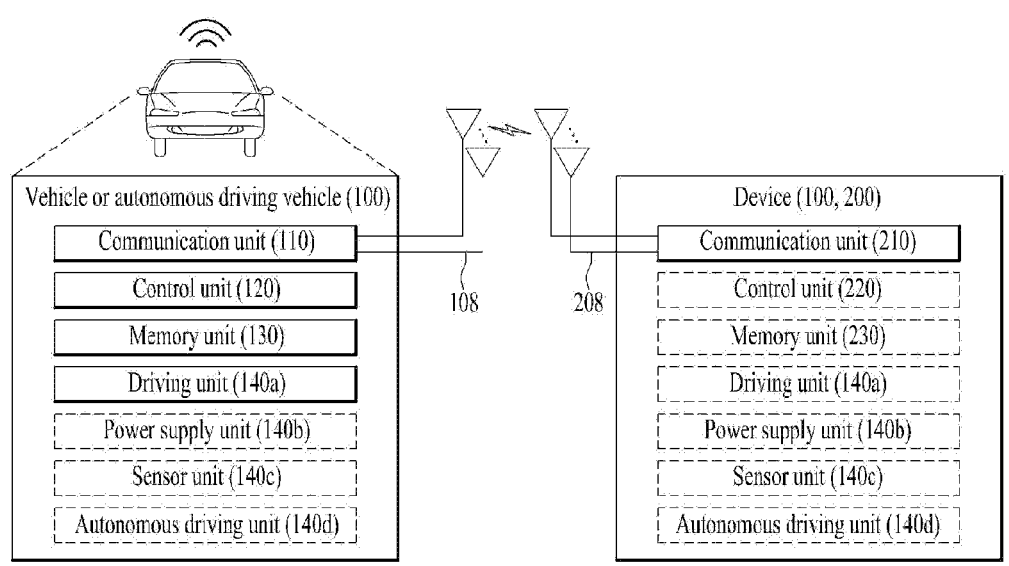

Example of Vehicle or Autonomous Driving Vehicle to which the Present Disclosure is Applied FIG. 34 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 34, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 33, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method of transmitting an uplink channel by a user equipment (UE) in a wireless communication system, the method comprising:
   monitoring, in a common search space (CSS), a physical uplink control channel (PDCCH) candidates for a downlink control information (DCI) format used for scheduling of a physical uplink shared channel (PUSCH); and
   transmitting the PUSCH based on detecting a PDCCH with the DCI format,
   wherein the PUSCH is transmitted within an uplink resource block set (uplink RB-set), and
   wherein the uplink RB-set is a lowest indexed one among uplink RB-set(s) that intersects a lowest indexed control channel element (CCE) of a physical downlink control channel(PDCCH) in which the DCI format is detected, and
   wherein, if there is no uplink RB-set that intersects the lowest indexed CCE of the PDCCH, the uplink RB-set is an uplink RB-set with a lowest index in an uplink bandwidth part (BWP).

2. The method according to claim 1, wherein the DCI format is DCI format 0_0.

3. The method according to claim 1, wherein the PUSCH is transmitted on lowest-indexed M RBs among RBs indicated by the DCI format, where M is a largest integer not greater than a number of RBs indicated by the DCI format and is a multiple of 2, 3 and/or 5.

4. The method according to claim 1, wherein the M RBs are in one or more interlaces.

5. A user equipment (UE) configured to transmit an uplink channel in a wireless communication system, the UE comprising:
   at least one transceiver;
   at least one processor; and
   at least one memory storing instructions that, when executed, cause the at least one processor to perform operations comprising:
   monitoring, in a common search space (CSS), a physical uplink control channel (PDCCH) candidates for a downlink control information (DCI) format used for scheduling of a physical uplink shared channel (PUSCH); and
   transmitting the PUSCH based on detecting a PDCCH with the DCI format,
   wherein the PUSCH is transmitted based on an uplink resource block set (uplink RB-set), and
   wherein the uplink RB-set is a lowest indexed one among uplink RB-set(s) that intersects a lowest indexed control channel element (CCE) of a physical downlink control channel(PDCCH) in which the DCI format is detected, and
   wherein, if there is no uplink RB-set that intersects the lowest indexed CCE of the PDCCH, the uplink RB-set is an uplink RB-set with a lowest index in an uplink bandwidth part (BWP).

6. The UE according to claim 5, wherein the DCI format is DCI format 0_0.

7. The UE according to claim 5, wherein the PUSCH is transmitted on lowest-indexed M RBs among RBs indicated by the DCI format, where M is a largest integer not greater than a number of RBs indicated by the DCI format and is a multiple of 2, 3 and/or 5.

8. The UE according to claim 5, wherein the M RBs are in one or more interlaces.

9. A base station (BS) configured to receive an uplink channel in a wireless communication system, the BS comprising:
   at least one transceiver;
   at least one processor; and at least one memory storing instructions that, when executed, cause the at least one processor to perform operations comprising:

transmitting, in a common search space (CSS), a physical uplink control channel (PDCCH) candidates for a downlink control information (DCI) format used for scheduling of a physical uplink shared channel (PUSCH); and receiving the PUSCH based on transmitting a PDCCH with the DCI format, wherein the PUSCH is received based on an uplink resource block set (uplink RB-set), and wherein the uplink RB-set is a lowest indexed one among uplink RB-set(s) that intersects a lowest indexed control channel element (CCE) of a physical downlink control channel(PDCCH) in which the DCI format is transmitted, and wherein, if there is no uplink RB-set that intersects the lowest indexed CCE of the PDCCH, the uplink RB-set is an uplink RB-set with a lowest index in an uplink bandwidth part (BWP).

10. The BS according to claim 9, wherein the DCI format is DCI format 0_0.

11. The BS according to claim 9, wherein the PUSCH is received on lowest-indexed M RBs among RBs indicated by the DCI format, where M is a largest integer not greater than a number of RBs indicated by the DCI format and is a multiple of 2, 3 and/or 5.

12. The BS according to claim 9, wherein the M RBs are in one or more interlaces.

* * * * *

UNITED STATES PATENT AND TRADEMARK OFFICE
CERTIFICATE OF CORRECTION

PATENT NO. : 11,856,574 B2
APPLICATION NO. : 17/984767
DATED : December 26, 2023
INVENTOR(S) : Seokmin Shin et al.

It is certified that error appears in the above-identified patent and that said Letters Patent is hereby corrected as shown below:

In the Claims

Column 69, Line 66; In Claim 1, after "(CSS)," delete "a" therefor.

Column 69, Line 66-67; In Claim 1, after "physical" delete "uplink" and insert -- "downlink" -- therefor.

Column 70, Line 36; In Claim 5, after "(CSS)," delete "a" therefor.

Column 70, Line 36-37; In Claim 5, after "physical" delete "uplink" and insert -- "downlink" -- therefor.

Column 71, Line 4; In Claim 9, after "(CSS)," delete "a" therefor.

Column 71, Line 4-5; In Claim 9, after "physical" delete "uplink" and insert -- "downlink" -- therefor.

Signed and Sealed this
First Day of October, 2024

Katherine Kelly Vidal
*Director of the United States Patent and Trademark Office*